(12) United States Patent
Hirota et al.

(10) Patent No.: US 12,269,942 B2
(45) Date of Patent: Apr. 8, 2025

(54) TRANSPARENT THERMOPLASTIC RESIN COMPOSITION, PRODUCTION METHOD THEREFOR, MOLDED ARTICLE OBTAINED BY MOLDING TRANSPARENT THERMOPLASTIC RESIN COMPOSITION, AND PRODUCTION METHOD FOR MOLDED ARTICLE

(71) Applicant: Toray Industries, Inc., Tokyo (JP)

(72) Inventors: Kazuaki Hirota, Ichihara (JP); Takuya Shibata, Ichihara (JP); Taku Shimozawa, Ichihara (JP); Takayuki Hase, Ichihara (JP); Takanori Suga, Ichihara (JP)

(73) Assignee: Toray Industries, Inc., Tokyo (JP)

( * ) Notice: Subject to any disclaimer, the term of this patent is extended or adjusted under 35 U.S.C. 154(b) by 580 days.

(21) Appl. No.: 17/635,932

(22) PCT Filed: Aug. 7, 2020

(86) PCT No.: PCT/JP2020/030449
§ 371 (c)(1),
(2) Date: Feb. 16, 2022

(87) PCT Pub. No.: WO2021/039368
PCT Pub. Date: Mar. 4, 2021

(65) Prior Publication Data
US 2022/0348705 A1 Nov. 3, 2022

(30) Foreign Application Priority Data

Aug. 30, 2019 (JP) .................................. 2019-158069
Aug. 30, 2019 (JP) .................................. 2019-158070

(51) Int. Cl.
| | | |
|---|---|---|
| C08L 51/04 | (2006.01) |
| C08F 212/08 | (2006.01) |
| C08F 220/14 | (2006.01) |
| C08F 220/44 | (2006.01) |
| C08F 279/02 | (2006.01) |
| C08F 279/06 | (2006.01) |
| C08J 3/12 | (2006.01) |
| C08K 5/13 | (2006.01) |
| C08K 5/5373 | (2006.01) |
| C08L 33/10 | (2006.01) |
| C08L 51/00 | (2006.01) |

(52) U.S. Cl.
CPC ............ *C08L 51/04* (2013.01); *C08F 212/08* (2013.01); *C08F 220/14* (2013.01); *C08F 220/44* (2013.01); *C08F 279/02* (2013.01); *C08F 279/06* (2013.01); *C08J 3/12* (2013.01); *C08K 5/13* (2013.01); *C08K 5/5373* (2013.01); *C08L 33/10* (2013.01); *C08L 51/003* (2013.01)

(58) Field of Classification Search
CPC combination set(s) only.
See application file for complete search history.

(56) References Cited

U.S. PATENT DOCUMENTS

| | | |
|---|---|---|
| 5,804,621 A | 9/1998 | Kimura et al. |
| 10,730,981 B2 | 8/2020 | Shibata et al. |
| 2009/0209707 A1 | 8/2009 | Okunaka et al. |

FOREIGN PATENT DOCUMENTS

| | | |
|---|---|---|
| JP | H5-86253 A | 4/1993 |
| JP | H7-324153 A | 12/1995 |
| JP | H8-73685 A | 3/1996 |
| JP | H9-143303 A | 6/1997 |
| JP | H9-235410 A | 9/1997 |
| JP | H11-228765 A | 8/1999 |
| JP | 2001-192565 A | 7/2001 |
| JP | 2002-128848 A | 5/2002 |
| JP | 2002-212439 A | 7/2002 |
| JP | 2004-250524 A | 9/2004 |
| JP | 2007-16192 A | 1/2007 |
| JP | 2009-67996 A | 4/2009 |
| JP | 2011-1526 A | 1/2011 |
| JP | 2012-207074 A | 10/2012 |
| JP | 2016-94505 A | 5/2016 |
| JP | 2016-216632 A | 12/2016 |
| WO | 2008/026626 A1 | 3/2008 |
| WO | 2018/220961 A1 | 12/2018 |

*Primary Examiner* — Marc S Zimmer
(74) *Attorney, Agent, or Firm* — DLA Piper LLP (US)

(57) ABSTRACT

A transparent thermoplastic resin composition containing: based on 100 parts by mass of the transparent thermoplastic resin composition, 10 to 60 parts by mass of a graft copolymer (A) obtained by graft copolymerizing a monomer mixture (a) containing at least an aromatic vinyl-based monomer (a1) and a (meth)acrylic acid ester-based monomer (a2) in the presence of a rubbery polymer (R); 40 to 90 parts by mass of a vinyl copolymer (B) obtained by copolymerizing a monomer mixture (b) containing at least an aromatic vinyl-based monomer (b1) and a (meth)acrylic acid ester-based monomer (b2); 100 to 1,000 ppm of a phenolic compound (C); and a dihydrooxaphosphaphenanthrene-based phosphorus compound (D), wherein a molar ratio (P/OH) of a phosphorus atom (P) of the dihydrooxaphosphaphenanthrene-based phosphorus compound (D) to a hydroxyl group (OH) of the phenolic compound (C) is 0.2 to 5.0.

12 Claims, 3 Drawing Sheets

TRANSPARENT THERMOPLASTIC RESIN COMPOSITION, PRODUCTION METHOD THEREFOR, MOLDED ARTICLE OBTAINED BY MOLDING TRANSPARENT THERMOPLASTIC RESIN COMPOSITION, AND PRODUCTION METHOD FOR MOLDED ARTICLE

TECHNICAL FIELD

This disclosure relates to a transparent thermoplastic resin composition having both a high total light transmittance and a good color tone, and further having a good reduction rate of total light transmittance after irradiation with γ-rays and a good recovery rate therefrom.

BACKGROUND

Transparent ABS resin obtained by blending a graft copolymer prepared by copolymerizing (i) an aromatic vinyl compound such as styrene or α-methylstyrene, (ii) a vinyl cyanide compound such as acrylonitrile or methacrylonitrile, and (iii) an unsaturated carboxylic acid alkyl ester compound such as methyl methacrylate or methyl acrylate in a rubbery polymer such as a diene rubber is known. This transparent ABS resin is excellent in (i) transparency represented by total light transmittance, (ii) balance of mechanical strength such as color tone and rigidity, fluidity, cost performance, and the like, and thus is widely used in applications such as home electric appliances, general goods for communication-related devices, and medical devices. Among such applications, in medical device applications, properties with (iii) a good reduction rate of total light transmittance after irradiation with γ-rays and (iv) a good recovery rate therefrom are required.

As a background art having characteristics in additives, the methods of Japanese Patent Laid-open Publication Nos. 2016-216632, 2001-192565, 9-143303 and 11-228765 have been proposed.

As a method of imparting resistance to yellowing due to irradiation with γ-rays, to a transparent resin, for example, JP '632 proposes a polycarbonate resin composition containing a polycarbonate-containing resin, a thioether-based stabilizer, and an amide-based stabilizer.

In addition, as a method of exhibiting heat resistance, flame retardancy, and molding processability by using a dihydrooxaphosphaphenanthrene-based phosphorus compound, for example, JP '565 proposes a flame-retardant thermoplastic resin composition containing 100 parts by weight of a thermoplastic resin and 5 to 30 parts by weight of a dihydrooxaphosphaphenanthrene-based phosphorus compound.

Furthermore, as a method of exhibiting discoloration resistance using a dihydrooxaphosphaphenanthrene-based phosphorus compound, the following methods have been proposed. For example, JP '303 proposes a polymer composition obtained by blending (B) a dihydrooxaphosphaphenanthrene-based phosphorus compound in (A) a polymer compound. For example, JP '765 proposes a thermoplastic resin composition containing 0.005 to 5 parts by weight of a dihydrooxaphosphaphenanthrene-based phosphorus compound (II) with respect to 100 parts by weight of a rubber-reinforced thermoplastic resin (I) containing: 15 to 60 parts by weight of a graft copolymer (A) obtained by graft-polymerizing 65 to 15 wt % of a monomer component (b) composed of an aromatic vinyl compound or another vinyl-based monomer copolymerizable with an aromatic vinyl compound in the presence of 35 to 85 wt % of a rubbery polymer (a) and having an intrinsic viscosity [η] of an acetone-soluble component of 0.1 to 2.0 dl/g and a graft ratio of 5 to 120 wt %; and 85 to 40 parts by weight of an aromatic vinyl compound resin (B) obtained by (co)polymerizing a monomer component composed of an aromatic vinyl compound or another vinyl-based monomer copolymerizable with an aromatic vinyl compound and having an intrinsic viscosity [η] of a methyl ethyl ketone-soluble component of 0.1 to 2.0 dl/g.

Furthermore, as a method of remarkably suppressing yellowing during molding and retaining the suppressing effect for a long period of time as well as exhibiting a good color tone of the molded article, transparency, impact strength, and moldability, by using a specific phenolic antioxidant, for example, Japanese Patent Laid-open Publication No. 7-324153 proposes a transparent STYRENE resin composition obtained by blending 0.05 to 1 parts by weight of 2,2'-methylenebis(4-alkyl-6-t-butylphenol) (wherein the alkyl group has one or two carbon atoms) and 0.1 to 1 parts by weight of one or more dipropionic acid ester compounds selected from dilauryl thiodipropionate, dimyristyl thiodipropionate, and distearyl thiodipropionate with respect to 100 parts by weight of a transparent styrene resin composition containing: 40 to 80 parts by weight of a copolymer (A) composed of 50 to 90 wt % of methyl methacrylate, 0 to 20 wt % of acrylonitrile, and 10 to 40 wt % of styrene and having a reduced viscosity ηsp/c of 0.3 to 0.4 dl/g; and 20 to 60 parts by weight of a graft copolymer (B) that is obtained by grafting 40 to 70 parts by weight of a copolymer having a composition of 50 to 90 wt % of methyl methacrylate, 0 to 20 wt % of acrylonitrile, and 10 to 40 wt % of styrene onto 30 to 60 parts by weight of polybutadiene having a gel content of 70 to 90 wt % and a weight average particle size of 0.1 to 0.5 μm and that has a reduced viscosity ηsp/c of 0.2 to 0.4 dl/g.

As a background having characteristics in the resin composition, the methods of International Patent Publication No. 2018/220961, Japanese Patent Laid-open Publication Nos. 2002-128848 and 2012-207074, International Patent Publication No. 2008/026626 and Japanese Patent Laid-open Publication No. 8-73685 have been proposed.

As a method of exhibiting impact resistance, transparency, and a good color tone in a transparent thermoplastic resin composition, for example, WO '961 proposes a thermoplastic resin composition containing a graft copolymer (A) obtained by graft copolymerizing a monomer mixture (a) substantially not containing a vinyl cyanide-based monomer (a3) in the presence of a rubbery polymer (r) having a refractive index of 1.510 or more and 1.520 or less, and a vinyl copolymer (B), wherein an acetone-insoluble component (C) of the thermoplastic resin composition does not substantially contain a vinyl cyanide-based monomer-derived unit, and an acetone-soluble component (D) of the thermoplastic resin composition contains a vinyl cyanide-based monomer-derived unit, and the content of the vinyl cyanide-based monomer-derived unit is 2 mass % or more and 20 mass % or less based on 100 mass % of the acetone-soluble component (D), a dimethyl sulfoxide-soluble component (E) of the thermoplastic resin composition contains a vinyl cyanide-based monomer-derived unit, and in the dimethyl sulfoxide-soluble component (E), the proportion of a triad where all monomer-derived units of the triad are vinyl cyanide-based monomer-derived units is less than 1% relative to the total number of triads where the center of each of the triads is a vinyl cyanide-based monomer-derived unit.

As a method of exhibiting extrusion moldability, tear strength, scratch resistance, and transparency in a transparent thermoplastic resin composition, for example, JP '848 proposes a rubber-reinforced styrene resin composition composed of a rubbery polymer, and an aromatic vinyl-based monomer or another vinyl-based monomer copolymerizable therewith, the rubber-reinforced styrene resin composition being transparent and excellent in extrusion moldability, wherein (1) the weight average particle size of the rubbery polymer is 0.05 to 0.20 μm, (2) the weight average molecular weight of the acetone-soluble portion in the composition is 10 to 300,000, and (3) the difference in the refractive index between the insoluble portion and the soluble portion in the composition is less than 0.02.

In addition, the following thermoplastic resin compositions using styrene-butadiene rubber have been proposed. For example, as a method of exhibiting transparency, color tone stability, impact resistance, and fluidity, JP '074 proposes a transparent styrene thermoplastic resin composition containing: a graft copolymer (A) characterized by a styrene-butadiene rubbery polymer (r) having a weight average particle size of 0.30 to 0.70 μm and having a particle size distribution where the amount of particles having a particle size of 1 μm or more is 2 to 10 wt % of the entire particles and the amount of particles having a particle size of 0.1 μm or less is 20 wt % or less of the entire particles; and a vinyl copolymer (B), wherein the proportion of the rubbery polymer (r) in the weight of the resin composition is 3 to 25 wt %. For example, as an impact resistance modifier to maintain high transparency, WO '626 proposes an impact resistance improver containing a graft copolymer obtained by polymerizing a vinyl-based monomer component (b) in the presence of a polymer mixture (A) containing a polymer (A1) containing a butadiene unit as a main component and a polymer (A2) containing a styrene unit as a main component, wherein the butadiene unit content is 45 to 65 wt % and the styrene unit content is 35 to 55 wt % in the polymer mixture (A). For example, as a method of exhibiting fluidity, transparency, and impact resistance, JP '685 proposes a thermoplastic molding material containing a mixture of: (A) a methyl methacrylate polymer; (B) a copolymer; 20 to 50 wt % of a graft copolymer (C) that is composed of 50 to 80 wt % of a core (C1) obtained by polymerizing a monomer mixture consisting essentially of 50 to 100 wt % of 1,3-diene (C11) and up to 50 wt % or less of a vinyl aromatic monomer (C12), and 20 to 50 wt % of a graft outer shell (C2) obtained by polymerizing a monomer mixture containing 40 to 100 wt % of methacrylic acid or acrylic acid C1 to C8-alkyl ester (C21) and 0 to 60 wt % of a vinyl aromatic monomer (C22) in the presence of (C1), and that is obtained by copolymerization under the condition of selecting an average particle size (d50) of 40 to 500 nm; and up to 20 wt % of a common additive (D).

However, in these methods, the balance among the total light transmittance, the color tone, the reduction rate of total light transmittance after irradiation with γ-rays, and the recovery rate therefrom is insufficient, and the application to a wide range of uses may be limited.

It could therefore be helpful to provide a transparent thermoplastic resin composition having both a high total light transmittance and a good color tone, and further having a high reduction rate of total light transmittance after irradiation with γ-rays and a good recovery rate therefrom.

SUMMARY

We found that when specific amounts of a phenolic compound and a dihydrooxaphosphaphenanthrene-based phosphorus compound are blended in a transparent thermoplastic resin composition in which a rubbery polymer-containing graft copolymer is dispersed in a vinyl copolymer obtained by copolymerizing a vinyl-based monomer mixture, a transparent thermoplastic resin composition having both a high total light transmittance and a good color tone, and further having a good reduction rate of total light transmittance after irradiation with γ-rays and a recovery rate therefrom can be obtained.

We further found that, when the rubbery polymer contained in the graft copolymer of the transparent thermoplastic resin composition described above is a rubbery polymer containing a specific amount of a diene-based monomer and a specific amount of an aromatic vinyl-based monomer, and the number average particle size of graft copolymer particles in the transparent thermoplastic resin composition is within a specific range, a transparent thermoplastic resin composition particularly having both a high total light transmittance and a good color tone, and further having a good reduction rate of total light transmittance after irradiation with γ-rays, a good recovery rate therefrom, and a good impact resistance can be obtained.

We thus provide:

(1) A transparent thermoplastic resin composition containing: based on 100 parts by mass of the transparent thermoplastic resin composition, 10 to 60 parts by mass of a graft copolymer (A) obtained by graft copolymerizing a monomer mixture (a) containing at least an aromatic vinyl-based monomer (a1) and a (meth)acrylic acid ester-based monomer (a2) in the presence of a rubbery polymer (R); 40 to 90 parts by mass of a vinyl copolymer (B) obtained by copolymerizing a monomer mixture (b) containing at least an aromatic vinyl-based monomer (b1) and a (meth)acrylic acid ester-based monomer (b2); 100 to 1,000 ppm of a phenolic compound (C); and a dihydrooxaphosphaphenanthrene-based phosphorus compound (D), wherein a molar ratio (P/OH) of a phosphorus atom (P) of the dihydrooxaphosphaphenanthrene-based phosphorus compound (D) to a hydroxyl group (OH) of the phenolic compound (C) is 0.2 to 5.0.

(2) The transparent thermoplastic resin composition according to (1), wherein the monomer mixture (a) contains at least 20 to 40 mass % of the aromatic vinyl-based monomer (a1) and 60 to 80 mass % of the (meth)acrylic acid ester-based monomer (a2) based on 100 mass % of the monomer mixture (a); the rubbery polymer (R) is polybutadiene rubber (R1); the graft copolymer (A) is a graft copolymer (A1) obtained by graft copolymerizing 60 to 40 mass % of the monomer mixture (a) based on 100 mass % of a total amount of the rubbery polymer (R1) and the monomer mixture (a) in the presence of 40 to 60 mass % of the rubbery polymer (R1); the vinyl copolymer (B) is a vinyl copolymer (B1) obtained by copolymerizing the monomer mixture (b) containing at least 20 to 40 mass % of the aromatic vinyl-based monomer (b1) and 60 to 80 mass % of the (meth)acrylic acid ester-based monomer (b2) based on 100 mass % of the monomer mixture (b); and the transparent thermoplastic resin composition contains 10 to 60 parts by mass of the graft copolymer (A1) and 40 to 90 parts by mass of the vinyl copolymer (B1) based on 100 parts by mass of a total of the graft copolymer (A1) and the vinyl copolymer (B1).

(3) The transparent thermoplastic resin composition according to (1), wherein the rubbery polymer (R) is a rubbery polymer (R2) containing more than 65 mass % and less than 80 mass % of a diene-based monomer (r1) and more than 20 mass % and less than 35 mass % of an aromatic vinyl-based monomer (r2) based on 100 mass % of a total of the diene-based monomer (r1) and the aromatic vinyl-based monomer (r2); the transparent thermoplastic resin composition is obtained by blending, in the presence of the rubbery polymer (R2), a graft copolymer (A2) obtained by graft copolymerizing the monomer mixture (a) containing at least the (meth)acrylic acid ester-based monomer (a2) and the aromatic vinyl-based monomer (a1), and a vinyl copolymer (B2) obtained by copolymerizing the monomer mixture (b) containing at least the (meth)acrylic acid ester-based monomer (b2) and the aromatic vinyl-based monomer (b1); and a number average particle size of particles of the graft copolymer (A2) in the thermoplastic resin composition is 0.15 to 0.30 μm.

(4) The transparent thermoplastic resin composition according to any one of (1) to (3), wherein a content of a (meth)acrylic acid ester-based monomer-derived unit is 75 mass % or less, and a content of a vinyl cyanide-based monomer-derived unit is 5 mass % or less based on 100 mass % of a total of a diene-based monomer-derived unit, a (meth)acrylic acid ester-based monomer-derived unit, an aromatic vinyl-based monomer-derived unit, a vinyl cyanide-based monomer-derived unit, and another vinyl-based monomer-derived unit contained in the transparent thermoplastic resin composition.

(5) The transparent thermoplastic resin composition according to any one of (1) to (4), wherein the graft copolymer (A) does not substantially contain a vinyl cyanide-based monomer-derived unit.

(6) The transparent thermoplastic resin composition according to any one of (1) to (5), wherein a dimethyl sulfoxide-soluble component of the thermoplastic resin composition contains a vinyl cyanide-based monomer-derived unit; and in the dimethyl sulfoxide-soluble component, a proportion of a triad where all monomer-derived units of the triad are vinyl cyanide-based monomer-derived units is less than 1 mol % relative to a total number of triads where the center of each of the triads is a vinyl cyanide-based monomer-derived unit.

(7) The transparent thermoplastic resin composition according to any one of (1) to (6), wherein in the thermoplastic resin composition, an amount of radicals generated after irradiation with γ-rays is less than $1.3 \times 10^{18}$/g.

(8) The transparent thermoplastic resin composition according to any one of (1) to (7), further containing a hindered amine-based compound (E).

(9) A method of producing a transparent thermoplastic resin composition, including the steps of: obtaining 10 to 60 parts by mass of a graft copolymer (A) obtained by graft copolymerizing a monomer mixture (a) containing at least an aromatic vinyl-based monomer (a1) and a (meth)acrylic acid ester-based monomer (a2) in the presence of a rubbery polymer (R); obtaining 40 to 90 parts by mass of a vinyl copolymer (B) obtained by copolymerizing a monomer mixture (b) containing at least an aromatic vinyl-based monomer (b1) and a (meth)acrylic acid ester-based monomer (b2); where a total of the graft copolymer (A) and the vinyl copolymer (B) is 100 parts by mass, and mixing at least the graft copolymer (A), the vinyl copolymer (B), a phenolic compound (C), and a dihydrooxaphosphaphenanthrene-based phosphorus compound (D).

(10) The method of producing a transparent thermoplastic resin composition according to (9), including the step of mixing the graft copolymer (A) and the phenolic compound (C) in advance.

(11) A molded article obtained by molding the transparent thermoplastic resin composition according to any one of 1 to 8.

(12) A method of producing a molded article, including molding the transparent thermoplastic resin composition obtained by the production method according to (9) or (10).

It is thus possible to obtain a transparent thermoplastic resin composition having both a high total light transmittance and a good color tone, and further having a good reduction rate of total light transmittance after irradiation with γ-rays and a good recovery rate therefrom.

DESCRIPTION OF REFERENCE SIGNS

Figure 1:
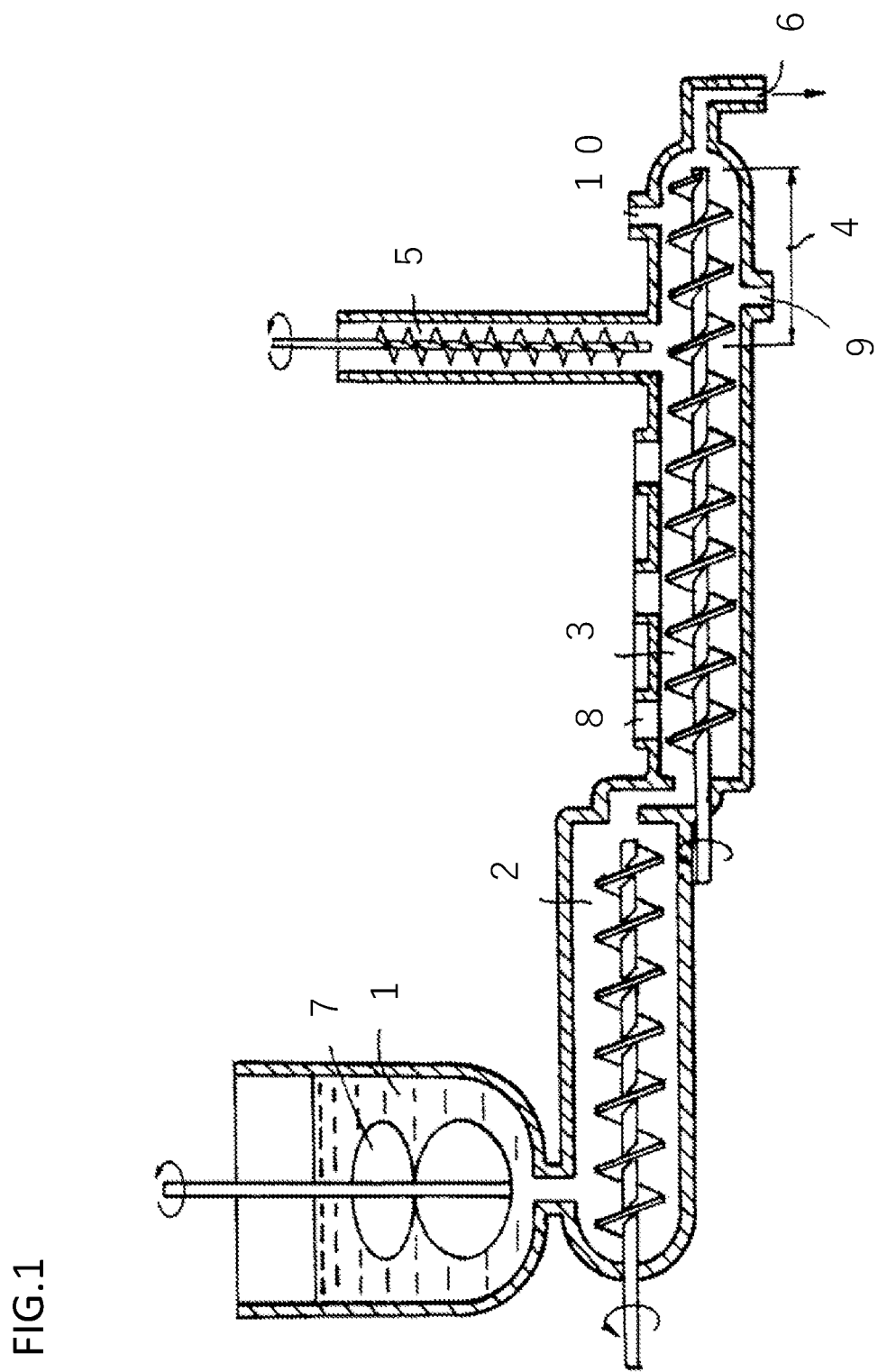
FIG. 1 is a schematic view of one example of an apparatus for producing a transparent thermoplastic resin composition.

1: Reaction tank
2: Preheater
3: Twin screw extruder-type monomer remover
4: Melt-kneading region
5: Twin screw extruder-type feeder
6: Discharge port
7: Stirrer (helical ribbon impeller)
8: Vent port
9: Water injection port
10: Final vent port

DETAILED DESCRIPTION

The transparent thermoplastic resin composition in one example is formed by blending a later-described graft copolymer (A) and with a later-described vinyl copolymer (B), and contains a phenolic compound (C) and a dihydrooxaphosphaphenanthrene-based phosphorus compound (D). By blending the graft copolymer (A), the moldability of the transparent thermoplastic resin composition can be improved, and the impact resistance, the total light transmittance, and the color tone of the molded article can be improved. By blending the vinyl copolymer (B), the moldability of the transparent thermoplastic resin composition is improved, and the total light transmittance and the color tone of the molded article can be improved. Further, when the transparent thermoplastic resin composition contains the phenolic compound (C), the color tone of the molded article can be improved, and when the transparent thermoplastic resin composition contains the dihydrooxaphosphaphenanthrene-based phosphorus compound (D), the total light transmittance, color tone, reduction rate of total light transmittance after irradiation with γ-rays, and recovery rate therefrom of the molded article can be improved.

The graft copolymer (A) constituting the transparent thermoplastic resin composition is obtained by graft copolymerizing a monomer mixture (a) containing at least an aromatic vinyl-based monomer (a1) and a (meth)acrylic acid ester-based monomer (a2) in the presence of a rubbery polymer (R). The monomer mixture (a) may further contain another monomer copolymerizable with (a1) and (a2) described later.

Examples of the rubbery polymer (R) include polybutadiene, poly(butadiene-styrene) (SBR), poly(butadiene-butyl acrylate), poly(butadiene-methyl methacrylate), poly(butyl acrylate-methyl methacrylate), poly(butadiene-ethyl acrylate), and natural rubber. Two or more of the above materials may be used as the rubbery polymer (R). Among the rubbery polymers (R), polybutadiene, SBR, and natural rubber are preferable, and polybutadiene and SBR are most preferable, from the viewpoint of further improving impact resistance, total light transmittance, and color tone.

When the rubbery polymer (R) is polybutadiene rubber (R1), the graft copolymer (A1) constituting the transparent thermoplastic resin composition is preferably obtained by graft copolymerizing 60 to 40 mass % of the monomer mixture (a) containing at least 20 to 40 mass % of the aromatic vinyl-based monomer (a1) and 60 to 80 mass % of the (meth)acrylic acid ester-based monomer (a2) in the presence of 40 to 60 mass % of the rubbery polymer (R1).

The content (mass %) of the rubbery polymer (R1) is a proportion when the total amount of the rubbery polymer (R1) and the monomer mixture (a) constituting the graft copolymer (A1) is 100 mass %. The content of the rubbery polymer (R1) is preferably 40 mass % or more and 60 mass % or less. When the content of the rubbery polymer (R1) is 40 mass % or more, the impact resistance of the molded article can be further improved. The content of the rubbery polymer (R1) is more preferably 45 mass % or more. On the other hand, when the content of the rubbery polymer (R1) is 60 mass % or less, the fluidity of the transparent thermoplastic resin composition, the impact resistance and total light transmittance of the molded article can be further improved. The content of the rubbery polymer (R1) is more preferably 55 mass % or less.

The mass average particle size of the rubbery polymer (R1) is preferably 0.15 µm or more, and more preferably 0.25 µm or more, but preferably 0.4 µm or less, and more preferably 0.35 µm or less. When the mass average particle size of the rubbery polymer (R1) is 0.15 µm or more, deterioration of impact resistance of the molded article can be suppressed. When the mass average particle size of the rubbery polymer (R1) is 0.4 µm or less, it is possible to suppress deterioration of the fluidity of the transparent thermoplastic resin composition and deterioration of the total light transmittance and color tone of the molded article.

Examples of the aromatic vinyl-based monomer (a1) in the monomer mixture (a) include styrene, α-methylstyrene, p-methylstyrene, m-methylstyrene, o-methylstyrene, vinyltoluene, and t-butylstyrene. Two or more of these may be contained as the aromatic vinyl-based monomer (a1). Among the aromatic vinyl-based monomers (a1), styrene is preferable from the viewpoint of further improving the fluidity of the transparent thermoplastic resin composition, the total light transmittance, reduction rate of total light transmittance after irradiation with γ-rays, recovery rate therefrom, and rigidity of the molded article.

The content of the aromatic vinyl-based monomer (a1) in the monomer mixture (a) is preferably 20 mass % or more, and more preferably 23 mass % or more, with respect to 100 mass % of the total of the monomer mixture (a), from the viewpoint of further improving the fluidity of the transparent thermoplastic resin composition, the total light transmittance, reduction rate of total light transmittance after irradiation with γ-rays, recovery rate therefrom, and rigidity of the molded article. On the other hand, the content of the aromatic vinyl-based monomer (a1) in the monomer mixture (a) is preferably 40 mass % or less, more preferably 35 mass % or less, and still more preferably 30 mass % or less, with respect to 100 mass % of the total of the monomer mixture (a), from the viewpoint of improving the impact resistance and total light transmittance of the molded article.

As the (meth)acrylic acid ester-based monomer (a2) in the monomer mixture (a), for example, an ester of an alcohol having 1 to 6 carbon atoms and acrylic acid or methacrylic acid is preferable. The ester of an alcohol having 1 to 6 carbon atoms and acrylic acid or methacrylic acid may further have a substituent such as a hydroxyl group or a halogen group. Examples of the ester of an alcohol having 1 to 6 carbon atoms and acrylic acid or methacrylic acid include methyl (meth)acrylate, ethyl (meth)acrylate, n-propyl (meth)acrylate, n-butyl (meth)acrylate, t-butyl (meth)acrylate, n-hexyl (meth)acrylate, cyclohexyl (meth)acrylate, chloromethyl (meth)acrylate, 3-hydroxypropyl (meth)acrylate, 2,3,4,5,6-pentahydroxyhexyl (meth)acrylate, and 2,3,4,5-tetrahydroxypentyl (meth)acrylate. Two or more of these may be contained as the (meth)acrylic acid ester-based monomer (a2). Among the (meth)acrylic acid ester-based monomers (a2), methyl (meth)acrylate is preferable from the viewpoint of improving the transparency of the molded article. The term "(meth)" indicates that there may be or may not be "meth." For example, the term "(meth)acrylic acid" refers to acrylic acid or methacrylic acid.

The content of the (meth)acrylic acid ester-based monomer (a2) in the monomer mixture (a) is preferably 60 mass % or more, more preferably 65 mass % or more, and still more preferably 70 mass % or more, with respect to 100 mass % of the total of the monomer mixture (a), from the viewpoint of improving the total light transmittance and color tone of the molded article. On the other hand, the content of the (meth)acrylic acid ester-based monomer (a2) in the monomer mixture (a) is preferably 80 mass % or less, more preferably 78 mass % or less, and still more preferably 75 mass % or less, with respect to 100 mass % of the total of the monomer mixture (a), from the viewpoint of further improving the total light transmittance, color tone, reduction rate of total light transmittance after irradiation with γ-rays, and recovery rate therefrom of the molded article.

The other monomer copolymerizable with the aromatic vinyl-based monomer (a1) and the (meth)acrylic acid ester-based monomer (a2) is not particularly limited as long as it is a vinyl-based monomer other than the above-described (a1) and (a2) and does not impair our desired effect. Specific examples of the other monomer include a vinyl cyanide-based monomer (a3), an unsaturated fatty acid, an acrylamide-based monomer, and a maleimide-based monomer, and two or more of these monomers may be contained.

Examples of the vinyl cyanide-based monomer (a3) in the monomer mixture (a) include acrylonitrile, methacrylonitrile, and ethacrylonitrile. Two or more of these may be contained as the vinyl cyanide-based monomer (a3). Among the vinyl cyanide-based monomers (a3), acrylonitrile is preferable from the viewpoint of further improving the impact resistance of the molded article.

The content of the vinyl cyanide-based monomer (a3) in the monomer mixture (a) is preferably 15 mass % or less, more preferably 5 mass % or less, and still more preferably 0 mass %, with respect to 100 mass % of the total of the monomer mixture (a), from the viewpoint of improving the reduction rate of total light transmittance after irradiation with γ-rays, recovery rate therefrom, and color tone of the molded article.

Examples of the unsaturated fatty acid include itaconic acid, maleic acid, fumaric acid, butenoic acid, acrylic acid, and methacrylic acid. Examples of the acrylamide-based monomer include acrylamide, methacrylamide, and N-methylacrylamide. Examples of the maleimide-based monomer include N-methylmaleimide, N-ethylmaleimide, N-isopropylmaleimide, N-butylmaleimide, N-hexylmaleimide, N-octylmaleimide, N-dodecylmaleimide, N-cyclohexylmaleimide, and N-phenylmaleimide.

When the rubbery polymer (R) is a rubbery polymer (R2) containing more than 65 mass % and less than 80 mass % of the diene-based monomer (r1) and more than 20 mass % and less than 35 mass % of the aromatic vinyl-based monomer (r2) with respect to 100 mass % of the total of the diene-based monomer (r1) and the aromatic vinyl-based monomer (r2), the graft copolymer (A2) constituting the transparent thermoplastic resin composition is preferably obtained by graft copolymerizing the monomer mixture (a) containing at least the (meth)acrylic acid ester-based monomer (a2) and the aromatic vinyl-based monomer (a1) in the presence of the rubbery polymer (R2).

The rubbery polymer (R2) is preferably obtained by copolymerizing more than 65 mass % and less than 80 mass % of the diene-based monomer (r1) and more than 20 mass % and less than 35 mass % of the aromatic vinyl-based monomer (r2) with respect to 100 mass % of the total of the diene-based monomer (r1) and the aromatic vinyl-based monomer (r2). When the content of the diene-based monomer (r1) is 65 mass % or less and the content of the aromatic vinyl-based monomer (r2) is 35 mass % or more, the glass transition temperature of the rubbery polymer (R2) increases so that the impact resistance of the molded article is deteriorated, which is not preferable. It is preferable that the content of the diene-based monomer (r1) is more than 67 mass %, and the content of the aromatic vinyl-based monomer (r2) is less than 33 mass % with respect to 100 mass % of the total of the diene-based monomer (r1) and the aromatic vinyl-based monomer (r2). On the other hand, when the content of the diene-based monomer (r1) is 80 mass % or more, and the content of the aromatic vinyl-based monomer (r2) is less than 20 mass % with respect to 100 mass % of the total of the diene-based monomer (r1) and the aromatic vinyl-based monomer (r2) to obtain the transparency of the thermoplastic resin, the content of the (meth) acrylic acid ester-based monomer or the vinyl cyanide-based monomer in the monomer mixture (a) and the vinyl copolymer (B2) to be described later increases. As a result, the reduction rate of total light transmittance after irradiation with γ-rays and change in color tone after irradiation with γ-rays of the molded article increase. It is preferable that the content of the diene-based monomer (r1) is less than 77 mass %, and the content of the aromatic vinyl-based monomer (r2) is more than 23 mass % with respect to 100 mass % of the total of the diene-based monomer (r1) and the aromatic vinyl-based monomer (r2).

Examples of the diene-based monomer (r1) constituting the rubbery polymer (R2) include 1,3-butadiene, 2-methyl-1,3-butadiene, 2,3-dimethyl-1,3-butadiene, 1,3-pentadiene, and 1,3-hexadiene, and two or more of these may be used. Among them, 1,3-butadiene is preferable from the viewpoint of further improving the impact resistance of the transparent thermoplastic resin composition.

Examples of the aromatic vinyl-based monomer (r2) constituting the rubbery polymer (R2) include styrene, α-methylstyrene, p-methylstyrene, m-methylstyrene, o-methylstyrene, vinyltoluene, and t-butylstyrene, and two or more of these may be used. Among them, styrene is preferable from the viewpoint of further improving the fluidity of the transparent thermoplastic resin composition and the total light transmittance and rigidity of the molded article.

The volume average particle size of the rubbery polymer (R2) is preferably 0.15 μm or more from the viewpoint of further improving the impact resistance of the molded article. The volume average particle size of the rubbery polymer (R2) is preferably 0.30 μm or less from the viewpoint of improving the fluidity of the transparent thermoplastic resin composition, the total light transmittance and color tone of the molded article. The volume average particle size of the rubbery polymer (R2) can be obtained by dispersing a latex of the rubbery polymer (R2) in water and performing measurement using a laser scattering diffraction particle size distribution measurement apparatus.

As a method of polymerizing the rubbery polymer (R2), any method such as an emulsion polymerization method, a suspension polymerization method, a continuous bulk polymerization method, or a solution continuous polymerization method can be used. Among them, the emulsion polymerization method is more preferable because the particle size of the rubbery polymer (R2) can be easily adjusted to a desired range, and the polymerization stability thereof can be easily adjusted by heat removal during polymerization.

The content of the rubbery polymer (R2) is preferably 30 mass % or more, and more preferably 40 mass % or more, with respect to 100 mass % of the total of the rubbery polymer (R2) and the monomer mixture (a) constituting the graft copolymer (A2), from the viewpoint of further improving the impact resistance of the molded article. On the other hand, the content of the rubbery polymer (R2) is preferably 70 mass % or less, and more preferably 60 mass % or less, with respect to 100 mass % of the total of the rubbery polymer (R2) and the monomer mixture (a) constituting the graft copolymer (A2), from the viewpoint of further improving the fluidity of the transparent thermoplastic resin composition, the impact resistance and total light transmittance of the molded article.

As the aromatic vinyl-based monomer (a1) and the (meth) acrylic acid ester-based monomer (a2) in the monomer mixture (a), monomers similar to those exemplified in using polybutadiene rubber can be used. The other monomer copolymerizable with the aromatic vinyl-based monomer (a1) and the (meth)acrylic acid ester-based monomer (a2) is not particularly limited as long as it is a vinyl-based monomer other than the above-described (a1) and (a2) and does not impair the desired effect. The other monomers such as the vinyl cyanide-based monomer (a3) exemplified in using polybutadiene rubber can be similarly used.

The content of the aromatic vinyl-based monomer (a1) in the monomer mixture (a) is preferably 35 mass % or more, and more preferably 40 mass % or more, with respect to 100 mass % of the total of the monomer mixture (a), from the viewpoint of further improving the fluidity of the transparent thermoplastic resin composition, the total light transmittance, reduction rate of total light transmittance after irradiation with γ-rays, change in color tone after irradiation with γ-rays, and rigidity of the molded article. On the other hand, the content of the aromatic vinyl-based monomer (a1) in the monomer mixture (a) is preferably 55 mass % or less, and more preferably 50 mass % or less, with respect to 100 mass % of the total of the monomer mixture (a), from the viewpoint of improving the impact resistance and total light transmittance of the molded article.

The content of the (meth)acrylic acid ester-based monomer (a2) in the monomer mixture (a) is preferably 40 mass % or more, and more preferably 45 mass % or more, with respect to 100 mass % of the total of the monomer mixture (a), from the viewpoint of improving the total light transmittance and color tone of the molded article. On the other hand, the content of the (meth)acrylic acid ester-based monomer (a2) in the monomer mixture (a) is preferably 60 mass % or less, and more preferably 55 mass % or less, with respect to 100 mass % of the total of the monomer mixture (a), from the viewpoint of further improving the total light transmittance, color tone, reduction rate of total light transmittance after irradiation with γ-rays, and change in color tone after irradiation with γ-rays of the molded article.

The content of the vinyl cyanide-based monomer (a3) in the monomer mixture (a) is preferably 15 mass % or less, more preferably 5 mass % or less, and still more preferably 0 mass %, with respect to 100 mass % of the total of the monomer mixture (a), from the viewpoint of improving the reduction rate of total light transmittance after irradiation with γ-rays, change in color tone after irradiation with γ-rays, and color tone of the molded article.

The graft copolymer (A) preferably does not substantially contain a vinyl cyanide-based monomer-derived unit. The term "vinyl cyanide-based monomer-derived unit" refers to a unit represented by Formula (1). The vinyl cyanide-based monomer-derived unit is a portion that has been introduced into a copolymer through polymerization of the vinyl cyanide-based monomer.

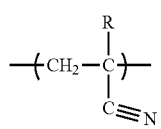

(1)

R represents a hydrogen atom or an alkyl group.

In Formula (1), R represents a hydrogen atom or an alkyl group.

In addition, the phrase "not substantially contain a vinyl cyanide-based monomer-derived unit" means that when the resulting graft copolymer (A) is heated and pressurized by a hot press set at 230° C. to prepare a film having a thickness of 30±5 μm, and the resulting film is subjected to FT-IR analysis, there is no peak at 2,240 cm$^{-1}$ corresponding to C≡N stretching derived from a vinyl cyanide-based monomer. In addition, when the acetone-insoluble component of the transparent thermoplastic resin composition is heated and pressurized by a hot press set at 230° C. to prepare a film having a thickness of 30±5 μm, and the resulting film is subjected to FT-IR analysis, and there is no peak at 2,240 cm$^{-1}$ corresponding to C≡N stretching derived from a vinyl cyanide-based monomer, it can be determined that the graft copolymer (A) does not substantially contain a vinyl cyanide-based monomer-derived unit. When the graft copolymer (A) does not substantially contain a vinyl cyanide-based monomer-derived unit, the reduction rate of total light transmittance after irradiation with γ-rays, recovery rate therefrom, and color tone of the molded article can be further improved.

The weight average molecular weight of the acetone-soluble component of the graft copolymer (A) is not particularly limited, but is preferably 50,000 or more, and more preferably 60,000 or more. When the weight average molecular weight of the acetone-soluble component of the graft copolymer (A) is 50,000 or more, the impact resistance of the molded article can be further improved. On the other hand, the weight average molecular weight of the acetone-soluble component of the graft copolymer (A) is preferably 120,000 or less, and more preferably 100,000 or less. When the weight average molecular weight of the acetone-soluble component of the graft copolymer (A) is 120,000 or less, the fluidity of the transparent thermoplastic resin composition can be further improved.

The weight average molecular weight of the acetone-soluble component of the graft copolymer (A) can be determined by the following procedure. An acetone-insoluble component is separated from the graft copolymer (A) by filtration to obtain a filtrate. The filtrate was concentrated with a rotary evaporator to collect an acetone-soluble component. About 0.03 g of the collected acetone-soluble component is dissolved in about 15 g of tetrahydrofuran to prepare an about 0.2 mass % solution. The weight average molecular weight can be determined from the GPC chromatogram measured using this solution and using polymethyl methacrylate as a standard substance. The GPC measurement can be performed under the following conditions:

Measurement apparatus: Waters 2695
Column temperature: 40° C.
Detector: RI 2414 (differential refractive index detector)
Flow rate of carrier eluent: 0.3 ml/min (solvent: tetrahydrofuran)
Column: TSKgel Super HZM-M (6.0 mm I.D.×15 cm), TSKgel Super HZM-N (6.0 mm I.D.×15 cm) connected in series (both manufactured by Tosoh Corporation).

The graft ratio of the graft copolymer (A) is not particularly limited, but is preferably 10% or more and 100% or less from the viewpoint of improving the impact resistance and total light transmittance of the molded article.

The graft ratio of the graft copolymer (A) can be determined by the following method. First, 80 ml of acetone is added to about 1 g of the graft copolymer (A), and the mixture is refluxed in a hot water bath at 70° C. for 3 hours. This solution is centrifuged at 8,000 r.p.m. (10,000 G) for 40 minutes, and then the insoluble component is separated by filtration to obtain an acetone-insoluble component. The resulting acetone-insoluble component is dried under reduced pressure at 80° C. for 5 hours, and then the mass thereof (denoted as n in the equation below) is measured, and the graft ratio is calculated from the following equation. m is the mass of sample of the graft copolymer (A) used, and X is the rubbery polymer content (mass %) of the graft copolymer (A).

Graft ratio (%)={[(n)−((m)×X/100)]/[(m)×X/100]}×100.

The difference in refractive index between the graft component (acetone-insoluble component) and the rubbery polymer (R) in the graft copolymer (A) is preferably 0.03 or less, and more preferably 0.01 or less. When the difference in refractive index between the graft component (acetone-insoluble component) and the rubbery polymer (R) in the graft copolymer (A) is suppressed to 0.03 or less, the transparency and color tone of the molded article can be improved.

The refractive index of the rubbery polymer (R) can be measured by the following method.

While 150 ml of methanol was stirred at 300 rpm, 10 ml of an emulsified rubber latex was added to the methanol, and then 20 ml of sulfuric acid adjusted to 10 mass % was added to the mixture, thus obtaining a precipitate of a rubbery polymer (R). The precipitate of the rubbery polymer (R) was dried under reduced pressure at 60° C. for 5 hours, and then heated and pressurized by a hot press set at 230° C. to prepare a film having a thickness of 30±5 km. A small amount of 1-bromonaphthalene was dropped onto the resulting film as a measurement sample. The refractive index of the sample was measured using an Abbe refractometer under the condition of a measurement temperature of 23° C. using D line from a sodium lamp as a light source.

Since the refractive index of the graft component of the graft copolymer (A) mainly depends on the composition of the vinyl-based monomer as a raw material, the refractive index can be set in a desired range by appropriately selecting the type and composition ratio of the vinyl-based monomer. In particular, when the polymer conversion is made 95% or more by the emulsion polymerization method, the composition of the graft component is almost the same as the composition of the monomer mixture (a).

The refractive index of the graft component of the graft copolymer (A) can be estimated from the refractive index and content of the vinyl-based monomer. For example, in a copolymer of styrene, methyl methacrylate, and acrylonitrile, the refractive index of the graft component of the graft copolymer (A) can be estimated by the equation below:

$$nD(G)=(1.595\times MS/100)+(1.490\times MM/100)+(1.510\times MA/100).$$

nD (G) represents the refractive index of the graft component of the graft copolymer (A), MS represents the styrene content (mass %), MM represents the methyl methacrylate content (mass %), and MA represents the acrylonitrile content (mass %). In the equation, 1.595 represents the refractive index of polystyrene, 1.490 represents the refractive index of polymethyl methacrylate, and 1.510 represents the refractive index of polyacrylonitrile. The refractive indices of polystyrene, polymethyl methacrylate, and polyacrylonitrile can be measured with an Abbe refractometer.

The refractive index of the graft component of the graft copolymer (A) can be measured by dissolving the graft copolymer (A) in acetone, separating the acetone-soluble component by filtration to obtain the residue, drying the residue, and then conducting measurement of the dried residue as a graft component with an Abbe refractometer.

As a method of polymerizing the rubbery polymer (R) in a method of producing the graft copolymer (A), any method such as an emulsion polymerization method, a suspension polymerization method, a continuous bulk polymerization method, or a solution continuous polymerization method can be used. Among them, the emulsion polymerization method is more preferable because the particle size of the rubbery polymer (R) can be easily adjusted to a desired range, and the polymerization stability thereof can be easily adjusted by heat removal during polymerization.

When the graft copolymer (A) is produced by an emulsion polymerization method, the method of introducing the rubbery polymer (R) and the monomer mixture (a) is not particularly limited. For example, all of these components may be introduced at once at an initial stage, or alternatively, a part of the monomer mixture (a) may be introduced continuously, or a part or all of the monomer mixture (a) may be introduced in a divided manner to adjust the distribution of the copolymer composition. The phrase "continuously introducing a part of the monomer mixture (a)" means that a part of the monomer mixture (a) is introduced at the initial stage, and the rest is continuously introduced over time. The phrase "introducing the monomer mixture (a) in a divided manner" means that the monomer mixture (a) is introduced at a time point after the initial introduction.

When the graft copolymer (A) is produced by an emulsion polymerization method, various surfactants may be added as an emulsifier. As the various surfactants, anionic surfactants such as a carboxylate salt surfactant, a sulfate ester surfactant, and a sulfonate salt surfactant are particularly preferable, and two or more anionic surfactants may be combined. Examples of the salt herein include alkali metal salts such as a sodium salt, a lithium salt, and a potassium salt, and ammonium salts.

Examples of the carboxylate salt emulsifier include a caprylate salt, a caprate salt, a laurylate salt, a myristate salt, a palmitate salt, a stearate salt, an oleate salt, a linoleate salt, a linolenate salt, a rosinate salt, a behenate salt, and a dialkylsulfosccinate salt.

Examples of the sulfate ester salt emulsifier include castor oil sulfates, lauryl alcohol sulfates, polyoxyethylene lauryl sulfates, polyoxyethylene alkyl ether sulfates, and polyoxyethylene alkyl phenyl ether sulfates.

Examples of the sulfonate salt emulsifier include dodecyl benzene sulfonate salt, alkyl naphthalene sulfonate salt, alkyl diphenyl ether disulfonate salt, and naphthalene sulfonate salt condensate.

When the graft copolymer (A) is produced by an emulsion polymerization method, an initiator may be added as necessary. Examples of the initiator include peroxides, azo compounds, and water-soluble potassium persulfate, and two or more of these may be combined. In addition, a redox polymerization initiator may be used as the initiator.

Examples of the peroxide include benzoyl peroxide, cumene hydroperoxide, dicumyl peroxide, diisopropylbenzene hydroperoxide, t-butyl hydroperoxide, t-butyl peroxyacetate, t-butyl peroxybenzoate, t-butyl isopropylcarbonate, di-t-butyl peroxide, t-butyl peroxyoctate, 1,1-bis(t-butylperoxy)3,3,5-trimethylcyclohexane, 1,1-bis(t-butylperoxy)cyclohexane, and t-butylperoxy-2-ethyl hexanoate. Among the peroxides, cumene hydroperoxide, 1,1-bis(t-butylperoxy)3,3,5-trimethylcyclohexane, and 1,1-bis(t-butylperoxy)cyclohexane are particularly preferably used.

Examples of the azo compound include azobisisobutyronitrile, azobis(2,4-dimethylvaleronitrile), 2-phenylazo-2,4-dimethyl-4-methoxyvaleronitrile, 2-cyano-2-propylazoform-amide, 1,1'-azobiscyclohexane-1-carbonitrile, azobis(4-methoxy-2,4-dimethylvaleronitrile), dimethyl2,2'-azobisisobutyrate, 1-t-butylazo-2-cyanobutane, and 2-t-butylazo-2-cyano-4-methoxy-4-methylpentane. Among the azo compounds, 1,1'-azobiscyclohexane-1-carbonitrile is particularly preferably used.

The added amount of the initiator used for producing the graft copolymer (A) is not particularly limited, but is preferably 0.1 parts by mass or more and 0.5 parts by mass or less, with respect to 100 parts by mass of the total of the rubbery polymer (R) and the monomer mixture (a), from the viewpoint of easily adjusting the weight average molecular weight of the graft copolymer (A) to the above-described range.

When the graft copolymer (A) is produced, a chain transfer agent may be used. Use of the chain transfer agent facilitates adjustment of the weight average molecular weight and graft ratio of the graft copolymer (A) to desired ranges. Examples of the chain transfer agent include (i) mercaptans such as n-octyl mercaptan, t-dodecyl mercaptan, n-dodecyl mercaptan, n-tetradecyl mercaptan, and n-octadecyl mercaptan, (ii) terpenes such as terpinolene, and two or more of these may be combined. Among the chain transfer agents, n-octyl mercaptan and t-dodecyl mercaptan are preferably used.

The added amount of the chain transfer agent used to produce the graft copolymer (A) is not particularly limited. The added amount of the chain transfer agent used for producing the graft copolymer (A) is preferably 0.1 parts by mass or more, more preferably 0.2 parts by mass or more, and still more preferably 0.4 parts by mass or more, but preferably 0.7 parts by mass or less, more preferably 0.6 parts by mass or less, and still more preferably 0.4 parts by mass or less, with respect to 100 parts by mass of the total of the rubbery polymer (R) and the monomer mixture (a), from the viewpoint of easily adjusting the weight average molecular weight, dispersity, and graft ratio of the graft copolymer (A) to the above-described ranges.

When the graft copolymer (A) is produced by emulsion polymerization, the polymerization temperature is not particularly limited. The polymerization temperature is preferably 40° C. or higher and 70° C. or lower from the viewpoint of easily adjusting the weight average molecular weight and dispersity of the graft copolymer (A) to the above-described ranges and from the viewpoint of emulsion stability.

When the graft copolymer (A) is produced by an emulsion polymerization method, a coagulant is commonly added to a graft copolymer latex to recover the graft copolymer (A). As the coagulant, an acid or a water-soluble salt is preferably used.

Examples of the acid used as the coagulant include sulfuric acid, hydrochloric acid, phosphoric acid, and acetic acid. Examples of the water-soluble salt used as the coagulant include calcium chloride, magnesium chloride, barium chloride, aluminum chloride, magnesium sulfate, aluminum sulfate, aluminum ammonium sulfate, aluminum potassium sulfate, and aluminum sodium sulfate, and two or more of these may be combined. From the viewpoint of improving the color tone of the molded article, it is preferable that the emulsifier is not left in the transparent thermoplastic resin composition. Therefore, it is preferable to cause coagulation with an alkali fatty acid salt as the emulsifier, and then remove the emulsifier by neutralizing with an alkali such as sodium hydroxide, for example.

The vinyl copolymer (B) constituting the transparent thermoplastic resin composition is obtained by copolymerizing a monomer mixture (b) containing at least an aromatic vinyl-based monomer (b1) and a (meth)acrylic acid ester-based monomer (b2). The monomer mixture (b) may further contain another monomer copolymerizable with the above-described (b1) and (b2).

When the rubbery polymer (R) is the polybutadiene rubber (R1), the vinyl copolymer (B1) constituting the transparent thermoplastic resin composition is preferably obtained by copolymerizing the monomer mixture (b) containing at least 20 to 40 mass % of the aromatic vinyl-based monomer (b1) and 60 to 80 mass % of the (meth)acrylic acid ester-based monomer (b2) when the total of the monomer mixture (b) is 100 mass %.

Examples of the aromatic vinyl-based monomer (b1) include those exemplified as the aromatic vinyl-based monomer (a1), and styrene is preferable.

The content of the aromatic vinyl-based monomer (b1) in the monomer mixture (b) is 20 mass % or more, and preferably 23 mass % or more, with respect to 100 mass % of the total of the monomer mixture (b), from the viewpoint of further improving the fluidity of the transparent thermoplastic resin composition, the total light transmittance, reduction rate of total light transmittance after irradiation with γ-rays, recovery rate therefrom, and rigidity of the molded article. On the other hand, the content of the aromatic vinyl-based monomer (b1) in the monomer mixture (b) is 40 mass % or less, preferably 30 mass % or less, and more preferably 25 mass % or less, with respect to 100 mass % of the total of the monomer mixture (b), from the viewpoint of improving the impact resistance and total light transmittance of the molded article.

Examples of the (meth)acrylic acid ester-based monomer (b2) in the monomer mixture (b) include those exemplified as the (meth)acrylic acid ester-based monomer (a2), and methyl (meth)acrylate is preferable.

The content of the (meth)acrylic acid ester-based monomer (b2) in the monomer mixture (b) is 60 mass % or more, preferably 65 mass % or more, and more preferably 70 mass % or more, with respect to 100 mass % of the total of the monomer mixture (b), from the viewpoint of improving the total light transmittance and color tone of the molded article. On the other hand, the content of the (meth)acrylic acid ester-based monomer (b2) in the monomer mixture (b) is 80 mass % or less, preferably 78 mass % or less, and more preferably 75 mass % or less, with respect to 100 mass % of the total of the monomer mixture (b), from the viewpoint of further improving the total light transmittance, color tone, reduction rate of total light transmittance after irradiation with γ-rays, and recovery rate therefrom of the molded article.

The other monomer copolymerizable with the aromatic vinyl-based monomer (b1) and the (meth)acrylic acid ester-based monomer (b2) are not particularly limited as long as it is a vinyl-based monomer other than the above-described (b1) and (b2) and does not impair the desired effect. Specific examples of the other monomer include an unsaturated fatty acid, an acrylamide-based monomer, and a maleimide-based monomer, and two or more of these monomers may be contained.

Examples of the vinyl cyanide-based monomer (b3) in the monomer mixture (b) include acrylonitrile, methacrylonitrile, and ethacrylonitrile, and two or more of these may be contained as the vinyl cyanide-based monomer (b3). Among the vinyl cyanide-based monomers (b3), acrylonitrile is preferable from the viewpoint of further improving the impact resistance of the molded article.

The content of the vinyl cyanide-based monomer (b3) in the monomer mixture (b) is preferably 2 mass % or more, and more preferably 3 mass % or more, with respect to 100 mass % of the total of the monomer mixture (b), from the viewpoint of further improving the impact resistance of the molded article. On the other hand, the content of the vinyl cyanide-based monomer (b3) in the monomer mixture (b) is preferably 15 mass % or less, more preferably 10 mass % or less, and still more preferably 5 mass % or less, with respect to 100 mass % of the total of the monomer mixture (b), from the viewpoint of improving the reduction rate of total light transmittance after irradiation with γ-rays, recovery rate therefrom, and color tone of the molded article.

Examples of the unsaturated fatty acid include itaconic acid, maleic acid, fumaric acid, butenoic acid, acrylic acid, and methacrylic acid. Examples of the acrylamide-based monomer include acrylamide, methacrylamide, and N-methylacrylamide. Examples of the male-imide-based monomer include N-methylmaleimide, N-ethylmaleimide, N-isopropylmaleimide, N-butylmaleimide, N-hexylmaleimide, N-octylmaleimide, N-dodecylmaleimide, N-cyclohexylmaleimide, and N-phenylmaleimide.

When the rubbery polymer (R) is a rubbery polymer (R2) containing more than 65 mass % and less than 80 mass % of the diene-based monomer (r1) and more than 20 mass % and less than 35 mass % of the aromatic vinyl-based monomer (r2) with respect to 100 mass % of the total of the diene-based monomer (r1) and the aromatic vinyl-based monomer (r2), the vinyl copolymer (B2) constituting the transparent thermoplastic resin composition is preferably obtained by copolymerizing the monomer mixture (b) containing at least the (meth)acrylic acid ester-based monomer (b2) and the aromatic vinyl-based monomer (b1). The monomer mixture (b) may further contain another monomer copolymerizable with the above-described (b1) and (b2).

As the aromatic vinyl-based monomer (b1) and the (meth) acrylic acid ester-based monomer (b2) in the monomer mixture (b), monomers similar to those exemplified in using polybutadiene rubber can be used.

The other monomer copolymerizable with the aromatic vinyl-based monomer (b1) and the (meth)acrylic acid ester-based monomer (b2) is not particularly limited as long as it is a vinyl-based monomer other than the above-described (b1) and (b2) and does not impair the desired effect. The other monomers such as the vinyl cyanide-based monomer (b3) exemplified in using polybutadiene rubber can be similarly used.

The content of the aromatic vinyl-based monomer (b1) in the monomer mixture (b) is 35 mass % or more, and preferably 40 mass % or more, with respect to 100 mass % of the total of the monomer mixture (b) constituting the vinyl copolymer (B2), from the viewpoint of further improving the fluidity of the transparent thermoplastic resin composition, the total light transmittance, reduction rate of total light transmittance after irradiation with γ-rays, change in color tone after irradiation with γ-rays, and rigidity of the molded article. On the other hand, the content of the aromatic vinyl-based monomer (b1) in the monomer mixture (b) is preferably 55 mass % or less, and more preferably 50 mass % or less, with respect to 100 mass % of the total of the monomer mixture (b), from the viewpoint of improving the impact resistance and total light transmittance of the molded article.

The content of the (meth)acrylic acid ester-based monomer (b2) in the monomer mixture (b) is preferably 40 mass % or more, and more preferably 45 mass % or more, with respect to 100 mass % of the total of the monomer mixtures (b) constituting the vinyl copolymer (B2), from the viewpoint of improving the total light transmittance and color tone of the molded article. On the other hand, the content of the (meth)acrylic acid ester-based monomer (b2) in the monomer mixture (b) is preferably 60 mass % or less, and more preferably 55 mass % or less, with respect to 100 mass % of the total of the monomer mixture (b), from the viewpoint of further improving the total light transmittance, color tone, reduction rate of total light transmittance after irradiation with γ-rays, and change in color tone after irradiation with γ-rays of the molded article.

The content of the vinyl cyanide-based monomer (b3) in the monomer mixture (b) is preferably 2 mass % or more, and more preferably 3 mass % or more, with respect to 100 mass % of the total of the monomer mixture (b), from the viewpoint of further improving the impact resistance of the molded article. On the other hand, the content of the vinyl cyanide-based monomer (b3) in the monomer mixture constituting the vinyl copolymer (B2) is preferably 15 mass % or less, more preferably 10 mass % or less, and still more preferably 5 mass % or less, with respect to 100 mass % of the total of the monomer mixture (b), from the viewpoint of improving the reduction rate of total light transmittance after irradiation with γ-rays, change in color tone after irradiation with γ-rays, and color tone of the molded article.

Examples of the unsaturated fatty acid include itaconic acid, maleic acid, fumaric acid, butenoic acid, acrylic acid, and methacrylic acid. Examples of the acrylamide-based monomer include acrylamide, methacrylamide, and N-methylacrylamide. Examples of the maleimide-based monomer include N-methylmaleimide, N-ethylmaleimide, N-isopropylmaleimide, N-butylmaleimide, N-hexylmaleimide, N-octylmaleimide, N-dodecylmaleimide, N-cyclohexylmaleimide, and N-phenylmaleimide.

The weight average molecular weight of the vinyl copolymer (B) is preferably 70,000 or more, and more preferably 80,000 or more. When the weight average molecular weight of the vinyl copolymer (B) is 70,000 or more, the impact resistance of the molded article can be further improved. Meanwhile, the weight average molecular weight of the vinyl copolymer (B) is preferably 250,000 or less, and more preferably 200,000 or less. When the weight average molecular weight of the vinyl copolymer (B) is 250,000 or less, the moldability of the transparent thermoplastic resin composition can be further improved. The vinyl copolymer (B) having a weight average molecular weight in the range of 70,000 or more and 250,000 or less can be easily produced, for example, by using an initiator or a chain transfer agent described later, or by setting the polymerization temperature to a preferable range described later.

The weight average molecular weight of the vinyl copolymer (B) can be determined from a GPC chromatogram measured using an about 0.2 mass % solution obtained by dissolving about 0.03 g of the vinyl copolymer (B) in about 15 g of tetrahydrofuran and using polymethyl methacrylate as a standard substance. The GPC measurement can be performed under the following conditions:

Measurement apparatus: Waters 2695
Column temperature: 40° C.
Detector: RI 2414 (differential refractive index detector)
Flow rate of carrier eluent: 0.3 ml/min (solvent: tetrahydrofuran)
Column: TSKgel Super HZM-M (6.0 mm I.D.×15 cm), TSKgel Super HZM-N (6.0
mm I.D.×15 cm) connected in series (both manufactured by Tosoh Corporation).

The difference in refractive index between the vinyl copolymer (B) and the rubbery polymer (R) described later is preferably 0.03 or less, and more preferably 0.01 or less. When the difference between the refractive index of the vinyl copolymer (B) and the refractive index of the rubbery polymer (R) is suppressed to 0.03 or less, the total light transmittance and color tone of the molded article can be improved.

Since the refractive index of the vinyl copolymer (B) mainly depends on the composition of the vinyl-based monomer as a raw material, the refractive index can be set in a desired range by appropriately selecting the type and composition ratio of the vinyl-based monomer. The refractive index of the vinyl copolymer (B) can be estimated from the refractive index and content of the vinyl-based monomer. For example, in a copolymer of styrene, methyl methacrylate, and acrylonitrile, the refractive index of the vinyl copolymer (B) can be estimated by the equation below:

$$nD(B)=(1.595 \times MS/100)+(1.490 \times MM/100)+(1.510 \times MA/100).$$

nD (B) represents the refractive index of the vinyl copolymer (B), MS represents the styrene content (mass %), MM represents the methyl methacrylate content (mass %), and MA represents the acrylonitrile content (mass %). In the equation, 1.595 indicates the refractive index of polystyrene, 1.490 indicates the refractive index of polymethyl methacrylate, and 1.510 indicates the refractive index of polyacrylonitrile. The refractive indices of polystyrene, polymethyl methacrylate, and polyacrylonitrile can be measured with an Abbe refractometer. The refractive index of the vinyl copolymer (B) can be measured with an Abbe refractometer.

The method of producing the vinyl copolymer (B) is not particularly limited, but a continuous bulk polymerization method or a continuous solution polymerization method is preferably used from the viewpoint of the moldability of the resulting transparent thermoplastic resin composition and the transparency and color tone of the molded article. The continuous bulk polymerization method is a method in which a monomer mixture is continuously introduced over time and the vinyl copolymer subjected to bulk polymerization is continuously discharged over time. The continuous solution polymerization method is a method in which a monomer mixture and a solvent are continuously introduced over time and a solution containing the vinyl copolymer subjected to solution polymerization and the solvent is continuously discharged over time. In addition, a suspension polymerization method is also preferably used in consideration of ease of polymerization control and ease of post-treatment.

In producing the vinyl copolymer (B) by a continuous bulk polymerization method or a continuous solution polymerization method, any method can be employed. Examples thereof include a method in which the monomer mixture (b) is polymerized in a polymerization tank, and then the monomer is removed (desolvation/devolatilization).

Examples of the polymerization tank that can be used include mixing polymerization tanks having a stirring impeller such as a paddle impeller, a turbine impeller, a propeller impeller, a Brumargin impeller, a multistage impeller, an anchor impeller, a max blend impeller, or a double helical impeller, and various tower reactors. A multi-tube reactor, a kneader reactor, a twin screw extruder and the like can also be used as a polymerization reactor (see, for example, Assessment of polymer production process 10 "Assessment of impact-resistant polystyrene," The Society of Polymer Science, Japan, published on Jan. 26, 1989).

When the vinyl copolymer (B) is produced, two or more polymerization tanks or polymerization reactors described above may be used. Alternatively, two or more types of polymerization tanks or polymerization reactors may be combined as necessary. From the viewpoint of reducing the dispersity of the vinyl copolymer (B), the number of polymerization tanks or polymerization reactors is preferably 2 or less, and a single-tank complete mixing polymerization tank is more preferable.

The reaction mixture obtained by polymerization in the polymerization tank or polymerization reactor described above is then typically subjected to a monomer removal step, whereby the monomer, the solvent, and other volatile components are removed. Examples of the method of removing the monomer include a method of removing volatile components from a vent hole under heating with a single or twin screw extruder having a vent under normal or reduced pressure, a method of removing volatile components with an evaporator having a plate fin type heater such as a centrifuge-type heater in a drum, a method of removing volatile components with a thin film evaporator such as a centrifuge-type thin film evaporator, and a method of removing volatile components by preheating, foaming, and flushing into a vacuum tank by using a multi-tube type heat exchanger. Among the methods of removing the monomer, particularly, a method of removing volatile components with a single or twin screw extruder having a vent is preferably used.

In producing the vinyl copolymer (B), an initiator or a chain transfer agent may be appropriately used. Examples of the initiator and the chain transfer agent include the same initiators and chain transfer agents as those exemplified in the method of producing the graft copolymer (A).

The added amount of the initiator used for producing the vinyl copolymer (B) is not particularly limited. The amount is preferably 0.01 parts by mass or more and 0.03 parts by mass or less, with respect to 100 parts by mass of the total of the monomer mixture (b), from the viewpoint of easily adjusting the weight average molecular weight of the vinyl copolymer (B) to the above-described range.

The added amount of the chain transfer agent used to produce the vinyl copolymer (B) is not particularly limited. The amount is preferably 0.05 parts by mass or more and 0.40 parts by mass or less, with respect to 100 parts by mass of the total of the monomer mixture (b), from the viewpoint of easily adjusting the weight average molecular weight of the vinyl copolymer (B) to the above-described range.

When the vinyl copolymer (B) is produced by a continuous bulk polymerization method or a continuous solution polymerization method, the polymerization temperature is not particularly limited. The polymerization temperature is preferably 120° C. or higher and 140° C. or lower from the viewpoint of easily adjusting the weight average molecular weight of the vinyl copolymer (B) to the above-described range.

When the vinyl copolymer (B) is produced by a continuous solution polymerization method, the amount of the solvent in the polymerization solution is preferably 30 mass % or less, and more preferably 20 mass % or less from the viewpoint of productivity. The solvent is preferably ethylbenzene or methyl ethyl ketone from the viewpoint of polymerization stability, and ethylbenzene is particularly preferably used.

When the vinyl copolymer (B) is produced by a suspension polymerization method, examples of the suspension stabilizer used for suspension polymerization include inorganic suspension stabilizers such as barium sulfate and magnesium hydroxide, and organic suspension stabilizers such as polyvinyl alcohol, carboxymethyl cellulose, hydroxyethyl cellulose, polyacrylamide, and a copolymer of methyl methacrylate and acrylamide. Two or more of these may be used. Among them, an organic suspension stabilizer is preferable from the viewpoint of color tone stability.

Examples of the initiator used for suspension polymerization of the vinyl copolymer (B) include those exemplified as the initiator for the graft copolymer (A). In addition, for the purpose of adjusting the weight average molecular weight of the vinyl copolymer (B), it is also possible to use a chain transfer agent such as mercaptan or terpene exemplified as the chain transfer agent used for the graft copolymer (A). In suspension polymerization, a slurry of the vinyl copolymer (B) is obtained, and then the vinyl copolymer (B) in the form of a bead is obtained through water removal and drying.

In producing the vinyl copolymer (B), an initiator or a chain transfer agent may be appropriately used. Examples of the initiator and the chain transfer agent include the same initiators and chain transfer agents as those exemplified in the method of producing the graft copolymer (A).

The added amount of the initiator used to produce the vinyl copolymer (B) is not particularly limited. The amount is preferably 0.01 parts by mass or more and 0.05 parts by mass or less, with respect to 100 parts by mass of the total of monomer mixture constituting the vinyl copolymer (B), from the viewpoint of easily adjusting the weight average molecular weight of the vinyl copolymer (B) to the above-described range.

The added amount of the chain transfer agent used to produce the vinyl copolymer (B) is not particularly limited. The amount is preferably 0.01 parts by mass or more and 0.40 parts by mass or less, with respect to 100 parts by mass of the total of the monomer mixture (b), from the viewpoint of easily adjusting the weight average molecular weight of the vinyl copolymer (B) to the above-described range.

The term "transparent" of the transparent thermoplastic resin composition means that a rectangular plate molded article (length: 50 mm, width: 40 mm, thickness: 3 mm) measured using a direct-reading haze meter manufactured by Toyo Seiki Seisaku-sho, Ltd. has a total light transmittance of 80% or more. The total light transmittance is preferably 85% or more.

The transparent thermoplastic resin composition is formed by blending 10 parts by mass or more and 60 parts by mass or less of the graft copolymer (A) and 40 parts by mass or more and 90 parts by mass or less of the vinyl copolymer (B) with respect to 100 parts by mass of the total of the graft copolymer (A) and the vinyl copolymer (B). When the content of the graft copolymer (A) is 10 parts by mass or more and the content of the vinyl copolymer (B) is 90 parts by mass or less, deterioration of impact resistance of the molded article can be suppressed. The content of the graft copolymer (A) is 20 parts by mass or more, and the content of the vinyl copolymer (B) is more preferably 80 parts by mass or less with respect to 100 parts by mass of the total of the graft copolymer (A) and the vinyl copolymer (B). When the content of the graft copolymer (A) is 60 parts by mass or less and the content of the vinyl copolymer (B) is 40 parts by mass or more, it is possible to suppress increase in the melt viscosity of the transparent thermoplastic resin composition, suppress deterioration of the moldability, and suppress deterioration of the total light transmittance and color tone of the molded article. More preferably, 50 parts by mass or less of the graft copolymer (A) and 50 parts by mass or more of the vinyl copolymer (B) are blended with respect to 100 parts by mass of the total of the graft copolymer (A) and the vinyl copolymer (B).

When the rubbery polymer (R) is a rubbery polymer (R2) containing more than 65 mass % and less than 80 mass % of the diene-based monomer (r1) and more than 20 mass % and less than 35 mass % of the aromatic vinyl-based monomer (r2) with respect to 100 mass % of the total of the diene-based monomer (r1) and the aromatic vinyl-based monomer (r2), the number average particle size of particles of the graft copolymer (A2) in the transparent thermoplastic resin composition is preferably 0.15 to 0.30 μm. When the number average particle size of particles of the graft copolymer (A2) is less than 0.15 μm, the impact resistance of the molded article may be deteriorated. On the other hand, when the number average particle size of particles of the graft copolymer (A2) is more than 0.30 μm, the total light transmittance of the molded article may be deteriorated. The number average particle size is more preferably 0.15 to 0.25 μm.

The number average particle size of particles of the graft copolymer (A2) in the transparent thermoplastic resin composition is determined by the following procedure. A narrow portion of a multi-purpose A-type test piece (total length: 150 mm, width of test portion: 10 mm, thickness: 4 mm) specified by ISO 3167:2002 is sliced into a piece with a thickness of about 60 nm, and the sliced piece is stained with osmium tetroxide to prepare a sample. The sample is observed with a transmission electron microscope (magnification: 15,000 times, observation range: 5 m×5 m). The maximum size and minimum size of 100 graft copolymer particles randomly selected are measured, and the number average value thereof is calculated.

In the transparent thermoplastic resin composition, the content of the (meth)acrylic acid ester-based monomer-derived unit is preferably 75 mass % or less, more preferably 70 mass % or less, still more preferably 65 mass % or less, and most preferably 45 mass % or less with respect to 100 mass % of the total of the diene-based monomer-derived unit, the (meth)acrylic acid ester-based monomer-derived unit, the aromatic vinyl-based monomer-derived unit, the vinyl cyanide-based monomer-derived unit, and the other vinyl-based monomer-derived unit. The content of the (meth)acrylic acid ester-based monomer-derived unit is preferably 30 mass % or more. In addition, the content of the vinyl cyanide-based monomer-derived unit is preferably 5 mass % or less, and more preferably 4 mass % or less. The vinyl cyanide-based monomer-derived unit need not be contained, but a preferable lower limit thereof when it is contained is 2 mass %.

When the content of the (meth)acrylic acid ester-based monomer-derived unit is 75 mass % or less with respect to 100 mass % of the total of the diene-based monomer-derived unit, the (meth)acrylic acid ester-based monomer-derived unit, the aromatic vinyl-based monomer-derived unit, the vinyl cyanide-based monomer-derived unit, and the other vinyl-based monomer-derived unit in the transparent thermoplastic resin composition, the amount of radicals generated from the (meth)acrylic acid ester-based monomer in irradiation with γ-rays can be suppressed, and the reduction rate of total light transmittance after irradiation with γ-rays and recovery rate therefrom of the molded article can be further improved. When the content of the vinyl cyanide-based monomer-derived unit is 5 mass % or less, radicals derived from the vinyl cyanide-based monomer can be suppressed, and the reduction rate of total light transmittance after irradiation with γ-rays and recovery rate therefrom of the molded article can be further improved. The amount of radicals generated can be measured by an electron spin resonance apparatus (ESR). The amount of radicals generated is proportional to the content of the (meth)acrylic acid ester-based monomer-derived unit, and increases the reduction rate of total light transmittance after irradiation with γ-rays, but the radicals almost disappear in a few days. Thereafter, a temporal change where radicals generated are changed to radicals derived from a vinyl cyanide-based monomer, and then the radicals derived from a vinyl cyanide-based monomer reduces the recovery rate of the total light transmittance is observed. The "diene-based monomer-derived unit" is a portion that has been introduced into the rubbery polymer (R) through polymerization of the monomer described in the diene-based monomer (r1).

The "(meth)acrylic acid ester-based monomer-derived unit" refers to a unit represented by Formula (2) below. The (meth)acrylic acid ester-based monomer-derived unit is a portion that has been introduced into the copolymer through polymerization of the (meth)acrylic acid ester-based monomer.

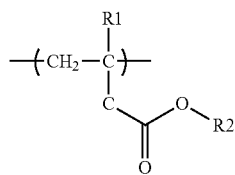

(2)

R1 and R2 each represent a hydrogen atom or an alkyl group. Furthermore, the alkyl group may have a substituent such as a hydroxyl group or a halogen group.

The term "aromatic vinyl-based monomer-derived unit" refers to a unit represented by Formula (3) below. The aromatic vinyl-based monomer-derived unit is a portion that has been introduced into the copolymer through polymerization of the aromatic vinyl-based monomer.

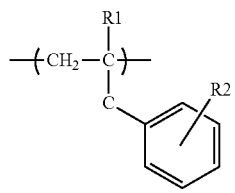

(3)

R1 and R2 each represent a hydrogen atom or an alkyl group.

The term "vinyl cyanide-based monomer-derived unit" refers to a unit represented by Formula (1).

The content of the (meth)acrylic acid ester-based monomer-derived unit and the content of the vinyl cyanide-based monomer-derived unit with respect to 100 mass % of the total of the diene-based monomer-derived unit, the (meth) acrylic acid ester-based monomer-derived unit, the aromatic vinyl-based monomer-derived unit, the vinyl cyanide-based monomer-derived unit, and the other vinyl-based monomer-derived unit in the transparent thermoplastic resin composition can be determined by the following method.

A film having a thickness of 30±5 μm prepared by a hot press set at 230° C. is subjected to FT-IR analysis for the transparent thermoplastic resin composition. The presence of the peak of a vinyl cyanide-based monomer-derived unit and the content of the vinyl cyanide-based monomer-derived unit can be determined from a calibration curve prepared in advance from the intensity ratio of the following peaks appearing on the FT-IR spectrum chart. The relationship between the unit and the peak is described below:

Diene-based monomer-derived unit: the peak at 960 $cm^{-1}$ corresponding to C=C.
(Meth)acrylic acid ester-based monomer-derived unit: the peak at 3,460 $cm^{-1}$ which is the overtone of the peak at 1,730 $cm^{-1}$ corresponding to stretching vibration of the carbonyl group C=O of the ester.
Aromatic vinyl-based monomer-derived unit: the peak at 1,605 $cm^{-1}$ corresponding to vibration of the benzene nucleus.
Vinyl cyanide-based monomer-derived unit: the peak at 2,240 $cm^{-1}$ corresponding to C≡N stretching.

In the transparent thermoplastic resin composition, it is preferable that the dimethyl sulfoxide-soluble component contains a vinyl cyanide-based monomer-derived unit, and in the dimethyl sulfoxide-soluble component, the proportion of a triad where all monomer-derived units of the triad are vinyl cyanide-based monomer-derived units is less than 1 mol % relative to the total number of triads where the center of each of the triads is a vinyl cyanide-based monomer-derived unit. The phrase "the dimethyl sulfoxide-soluble component contains a vinyl cyanide-based monomer-derived unit" means that when the dimethyl sulfoxide-soluble component described later is subjected to $^{13}$C-NMR analysis, a peak exists at 122 ppm corresponding to the carbon of C≡N derived from the vinyl cyanide-based monomer. When the dimethyl sulfoxide-soluble component contains a vinyl cyanide-based monomer-derived unit, the impact resistance of the molded article is improved, which is preferable.

The term "triad" refers to three consecutive monomer-derived units in the copolymer when the monomer is copolymerized. The phrase "triad of vinyl cyanide-based monomer-derived units indicates that three vinyl cyanide-based monomer-derived units have been continuously introduced into the copolymer. The general formula of the triad of vinyl cyanide-based monomer-derived units can be expressed by Formula (4) below:

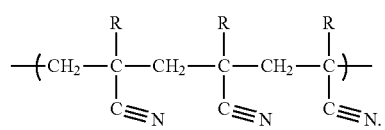

(4)

R represents a hydrogen atom or an alkyl group having 1 to 6 carbon atoms.

In addition, the phrase "in the dimethyl sulfoxide-soluble component, the proportion of a triad where all monomer-derived units of the triad are vinyl cyanide-based monomer-derived units is less than 1 mol % relative to the total number of triads where the center of each of the triads is a vinyl cyanide-based monomer-derived unit" means that in the triads present in the dimethyl sulfoxide-soluble component, the proportion of a triad where monomer-derived units in the center and both sides thereof in the triad are vinyl cyanide-based monomer-derived units is less than 1 mol % relative to the total number of triads where the center of each of the triads is a vinyl cyanide-based monomer-derived unit.

When the dimethyl sulfoxide-soluble component contains a vinyl cyanide-based monomer-derived unit, the impact resistance of the molded article is improved. In addition, when in the dimethyl sulfoxide-soluble component, the proportion of a triad where all monomer-derived units of the triad are vinyl cyanide-based monomer-derived units is less than 1 mol % relative to the total number of triads where the center of each of the triads is a vinyl cyanide-based monomer-derived unit, the transparency and color tone of the molded article are improved.

The triad of vinyl cyanide-based monomer-derived units is a segment represented by Formula (4) above. When a copolymer having such a segment is exposed to high temperature, intramolecular cyclization reaction represented by Formula (5) below that causes coloring is likely to proceed. Therefore, coloring can be suppressed by setting the proportion of the triad where all monomer-derived units of the triad are vinyl cyanide-based monomer-derived units to less than 1 mol % relative to the total number of triads where the center of each of the triads is a vinyl cyanide-based monomer-derived unit in the dimethyl sulfoxide-soluble component.

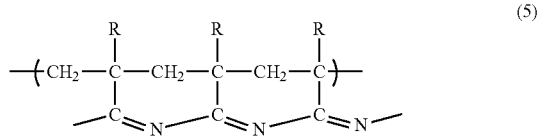

(5)

R represents a hydrogen atom or an alkyl group having 1 to 6 carbon atoms.

The presence of the peak in NMR of the vinyl cyanide-based monomer-derived unit and the proportion of the triad of vinyl cyanide-based monomer-derived units in the dimethyl sulfoxide-soluble component can be determined by the following method. First, 50 ml of deuterated dimethyl sulfoxide (DMSO-$d_6$) is added to about 10 g of the transparent thermoplastic resin composition, and the mixture is refluxed in a hot water bath at 70° C. for 3 hours. This solution is centrifuged at 8,000 r/min (10,000 G) for 40 minutes, and then the insoluble component is separated by filtration to obtain a dimethyl sulfoxide-soluble component. The presence of the peak at 122 ppm corresponding to the carbon of C≡N of the vinyl cyanide-based monomer-derived unit appearing on the NMR spectrum chart obtained by using the dimethyl sulfoxide-soluble component as a sample was confirmed. In addition, by utilizing the phenomenon that the signal shift of the carbon of C≡N of the vinyl cyanide-based monomer-derived unit appearing in $^{13}$C-NMR is slightly different depending on the difference in the adjacent monomer type, the proportion of the triad of the carbon of C≡N of the vinyl cyanide-based monomer-derived unit is quantitated from the integrated value of the signal. The proportion of the triad of vinyl cyanide-based monomer-derived units in the total number of triads where the center of each of the triads is a vinyl cyanide-based monomer-derived unit is calculated in mol %. An example of the triad where the center of the triad is a vinyl cyanide-based monomer-derived unit includes -A-A-A-, -A-A-S-, -A-A-M-, -S-A-S-, -M-A-M-, and -S-A-M-. "S" represents a styrene monomer-derived unit, "M" represents a methyl methacrylate monomer-derived unit, and "A" represents an acrylonitrile monomer-derived unit.

The proportion (mol %) of the triad of vinyl cyanide-based monomer-derived units in the total number of triads where the center of each of the triads is a vinyl cyanide-based monomer-derived unit is defined as [peak intensity of -A-A-A-]/[peak intensities of -A-A-A-, -A-A-S-, -A-A-M-, -S-A-S-, -M-A-M-, and -S-A-M-]×100.

The combination of the triad and the peak position thereof are as follows:
A-A-A-: 119.4 to 120.0 ppm
A-A-S-, -A-A-M-, -S-A-S-, -M-A-M-, -S-A-M-: 120.0 to 123.8 ppm The measurement conditions of $^{13}$C-NMR are as follows:
Apparatus: ECZR-600 manufactured by JEOL Ltd.
Measurement method: single $^{13}$C pulse with inverse gated $^1$H decoupling
Probe: SuperCOOL open type
Observation frequency: 150.9 MHz
Solvent: DMSO-$d_6$
Concentration: 100 mg/0.6 ml (sample/DMSO-$d_6$)
Standard for the chemical shift: Me$_4$Si
Temperature: 110° C.
Observation width: 37,900 Hz
Data point: 32768
Flip angle: 450 (5.25 s)
pulse delay time: 5.0 s
Number of scans: 12,988 times.

The amount of radicals generated in the transparent thermoplastic resin composition after irradiation with γ-rays is preferably less than $1.3 \times 10^{18}$/g from the viewpoint of further improving the reduction rate of total light transmittance after irradiation with γ-rays and change in color tone after irradiation with γ-rays of the molded article. The amount of radicals generated can be measured by ESR (electron spin resonance apparatus).

The measurement conditions of ESR are as follows:
Apparatus: EMXplus manufactured by Bruker
Measurement temperature: room temperature
Central magnetic field: 351.6 mT
Magnetic field sweep range: 40 mT)
Modulation: 100 kHz, 0.2 mT
Microwave: 9.86 GHZ, 0.1 mW
Sweep time: 80 s×4 times
Time constant: 163.84 ms
Number of data points: 2,000 points
Cavity: Super-high-Q.

The amount of radicals generated is proportional to the content of the (meth)acrylic acid ester-based monomer-derived unit, and increases the reduction rate of total light transmittance after irradiation with γ-rays, but the radicals almost disappear in a few days. Thereafter, a temporal change where radicals generated are changed to radicals derived from a vinyl cyanide-based monomer, and then the radicals derived from a vinyl cyanide-based monomer reduces the recovery rate of the total light transmittance is observed.

In particular, when the graft copolymer (A) substantially not containing a vinyl cyanide-based monomer-derived unit is used in the transparent thermoplastic resin composition, and/or when in the dimethyl sulfoxide-soluble component, the proportion of a triad where all monomer-derived units of the triad are vinyl cyanide-based monomer-derived units is less than 1 mol % relative to the total number of triads where the center of each of the triads is a vinyl cyanide-based monomer-derived unit, radicals derived from the vinyl cyanide-based monomer are reduced. As a result, the reduction rate of total light transmittance after irradiation with γ-rays and the recovery rate therefrom can be remarkably improved.

The transparent thermoplastic resin composition may contain a phenolic compound (C) and a dihydrooxaphosphaphenanthrene-based phosphorus compound (D).

The parentheses indicate (molecular weight, number of hydroxyl groups (OH groups) in one molecule). Since a reaction product of p-cresol, dicyclopentadiene, and isobutylene is a mixture, the average molecular weight and the average number of hydroxyl groups (OH groups) in one molecule are shown in the parentheses.

Examples of the phenolic compound (C) include 2,2'-methylenebis(4-methyl-6-t-butylphenol) (369, 2), 2,6-di-t-butyl-4-methylphenol (220.4, 1), triethylene glycol-bis-[3-(3-t-butyl-5-methyl-4-hydroxyphenyl)propionate](586.8, 2), pentaerythritol tetrakis[3-(3,5-di-butyl-4-hydroxyphenyl)propionate](1177.6, 4), n-octadecyl-3-(3,5-di-t-butyl-4-hydroxyphenyl)propionate (530.9, 1), 1,3,5-trimethyl-2,4,6-tris(3,5-di-t-butyl-4-hydroxybenzyl)benzene (775.2, 3), 2-t-butyl-6-(3-t-butyl-2-hydroxy-5-methylbenzyl)-4-methylphenyl acrylate (394.5, 1), 2-[1-(2-hydroxy-3,5-di-t-pentylphenyl)]-4,6-di-t-pentylphenyl acrylate (548.9, 1), 3,9-bis[2-{3-(t-butyl-4-hydroxy-5-methylphenyl)propionyloxy}-1,1-dimethylethyl]-2,4,8,10-tetraoxa[5,5]undecane (741, 2), 1,3,5-tris(3',5')-di-t-butyl-4'-hydroxybenzyl-s-triazine2,4,6(1H,2H,3H)-trione (784.1, 3), 1,1,4-tris(2- methyl-4-hydroxy-5-t-butylphenyl)butane (544.8, 3), 4,4'-butylidenebis(3-methyl-6-t-butylphenol) (382.6, 2) and other 2,4,5- or 2,4,6-3 phenols, and a reaction product of p-cresol, dicyclopentadiene, and isobutylene (650, 2.7). Among them, a reaction product of p-cresol, dicyclopentadiene, and isobutylene, and octadecyl-3-(3,5-di-t-butyl-4-hydroxyphenyl)propionate are preferably used.

The reaction product of p-cresol, dicyclopentadiene, and isobutylene is a compound represented by Formula (6) below:

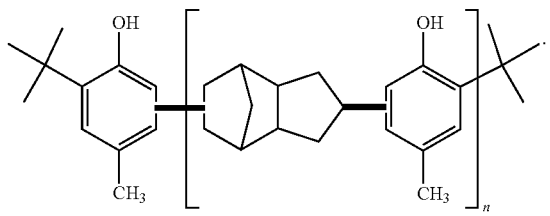

Among them, the phenolic compound (C) in which a value obtained by dividing the molecular weight of the phenolic compound (C) by the number of hydroxyl groups (OH groups) in one molecule is 200 or more is preferably used from the viewpoint of the reduction rate of total light transmittance after irradiation with γ-rays and the recovery rate therefrom.

The content of the phenolic compound (C) is 100 to 1,000 ppm with respect to 100 parts by mass of the transparent thermoplastic resin composition. When the content of the phenolic compound (C) is less than 100 ppm with respect to 100 parts by mass of the transparent thermoplastic resin composition, the color tone of the molded article is deteriorated. On the other hand, when the content of the phenolic compound (C) is more than 1,000 ppm, the reduction rate of total light transmittance after irradiation with γ-rays and recovery rate therefrom of the molded article is deteriorated.

The dihydrooxaphosphaphenanthrene-based phosphorus compound (D) is a compound represented by General Formula (7) below. Examples thereof include 9,10-dihydro-9-oxa-10-phosphaphenanthrene-10-oxide, 8-chloro-9,10-dihydro-9-oxa-10-phosphaphenanthrene-10-oxide, and 8-t-butyl-9,10-dihydro-9-oxa-10-phosphaphenanthrene-10-oxide. Among them, 9,10-dihydro-9-oxa-10-phosphaphenanthrene-10-oxide is preferably used.

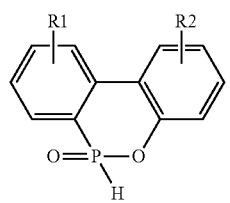

(7)

R1 and R2 each represent a hydrogen atom, a halogen group, or an alkyl group.

The content of the dihydrooxaphosphaphenanthrene-based phosphorus compound (D) is such that the molar ratio (P/OH) of the phosphorus atom (P) of the dihydrooxaphosphaphenanthrene-based phosphorus compound (D) to the hydroxyl group (OH) of the phenolic compound (C) is 0.2 to 5.0, and preferably 0.6 to 2.0. When the molar ratio of the phosphorus atom (P) of the dihydrooxaphospha- phenanthrene-based phosphorus compound (D) to the hydroxyl group (OH) of the phenolic compound (C) is 0.2 or more, the total light transmittance, reduction rate of total light transmittance after irradiation with γ-rays, recovery rate therefrom, and color tone of the molded article can be improved. On the other hand, when the molar ratio of the phosphorus atom (P) of the dihydrooxaphosphaphenanthrene-based phosphorus compound (D) to the hydroxyl group (OH) of the phenolic compound (C) is 5.0 or less, the reduction rate of total light transmittance after irradiation with γ-rays of the molded article can be suppressed.

The molar ratio (P/OH) of the phosphorus atom (P) of the dihydrooxaphosphaphenanthrene-based phosphorus compound (D) to the hydroxyl group (OH) of the phenolic compound (C) in the transparent thermoplastic resin composition is measured by the method described in Examples described later.

The dihydrooxaphosphaphenanthrene-based phosphorus compound (D) reacts with the phenolic compound (C) and the quinone structure of the phenolic compound (C) generated by irradiation with γ-rays, to suppress discoloration and deterioration of the total light transmittance of the phenolic compound (C) caused by irradiation with γ-rays. When the amount of the dihydrooxaphosphaphenanthrene-based phosphorus compound (D) is too small, the reaction of the dihydrooxaphosphaphenanthrene-based phosphorus compound (D) with the phenolic compound (C) and the quinone structure of the phenolic compound (C) generated by irradiation with γ-rays is insufficient. As a result, discoloration and deterioration of total light transmittance of the phenolic compound (C) caused by irradiation with γ-rays cannot be suppressed. On the other hand, when the amount is excessive, it is considered that the dihydrooxaphosphaphenanthrene-based phosphorus compound (D) itself becomes a coloring substance, resulting in deteriorated color tone of the molded article.

Figure 2:
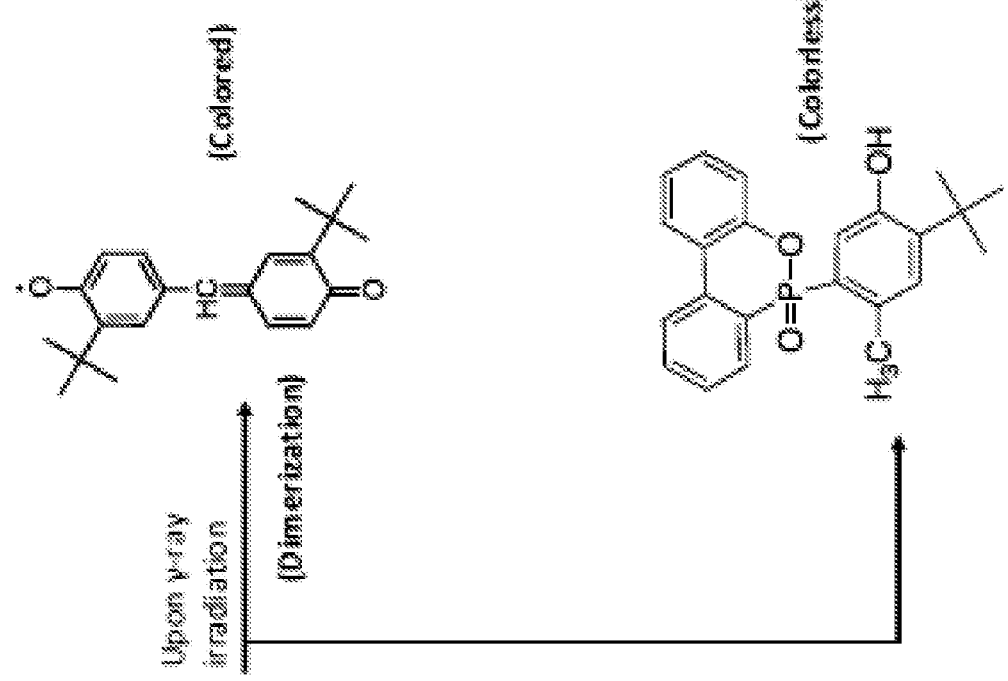
FIG. 2 is a view showing a discoloring reaction of a phenolic compound (C) and a decoloring reaction by a dihydrooxaphosphaphenanthrene-based phosphorus compound (D).
Figure 2:
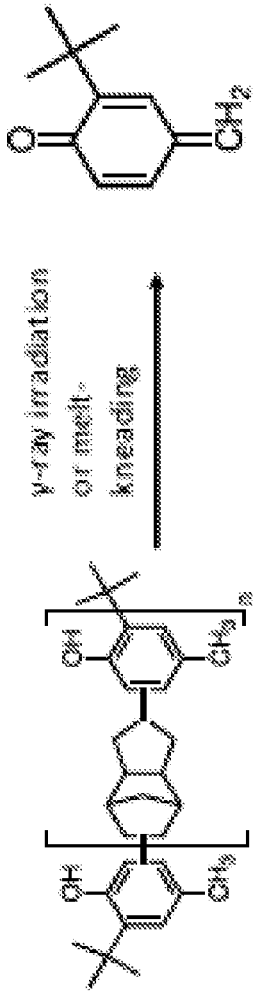

In particular, as shown the reaction in FIG. 2, when the reaction product of p-cresol, dicyclopentadiene, and isobutylene is used as the phenolic compound (C), and 9,10-dihydro-9-oxa-10-phosphaphenanthrene-10-oxide is used as the dihydrooxaphosphaphenanthrene-based phosphorus compound (D), the dihydrooxaphosphaphenanthrene-based phosphorus compound (D) suppresses a substance that is generated in the production of the transparent thermoplastic resin composition and causes discoloration and deterioration of the total light transmittance of the phenolic compound (C), and a substance that causes discoloration and deterioration of total light transmittance of the phenolic compound (C) due to irradiation with γ-rays, thereby promoting a conversion reaction to a colorless substance suppressing discoloration and deterioration of the total light transmittance.

On the other hand, when the value obtained by dividing the molecular weight of the phenolic compound (C) by the number of hydroxyl groups (OH groups) in one molecule is 200 or more, the content of the phenolic compound (C) is 100 to 500 ppm with respect to 100 parts by mass of the transparent thermoplastic resin composition, and in the transparent thermoplastic resin composition, the graft copolymer (A) constituting the transparent thermoplastic resin composition does not substantially contain a vinyl cyanide-based monomer-derived unit, and/or in the dimethyl sulfoxide-soluble component, the proportion of a triad where all monomer-derived units of the triad are vinyl cyanide-based monomer-derived units is less than 1 mol % relative to the total number of triads where the center of each of the triads is a vinyl cyanide-based monomer-derived unit, the discoloration and deterioration of total light transmittance of the phenolic compound (C) cannot be suppressed. However, the discoloration and reduction rate of total light transmittance due to irradiation with γ-rays and the recovery rate therefrom may be substantially the same as those in using the dihydrooxaphosphaphenanthrene-based phosphorus compound (D).

The transparent thermoplastic resin composition may further contain a hindered amine-based compound (E).

Examples of the hindered amine-based compound include bis(2,2,6,6-tetramethyl-4-piperidinyl)sebacate, bis(1,2,2,6,6-pentamethyl-4-piperidinyl)-2-(3,5-di-t-butyl-4-hydroxybenz-yl)-2-n-butyl malonate, polyester of 4-hydroxy-2,2,6,6-tetramethyl-1-piperidine ethanol and succinic acid, {4-(4-hydroxy-3,5-di-t-butylphenyl)propionyl}N-(4-hydroxy-3,5-di-t-butylphen-yl)methyl-2,2,6,6-tetramethylpiperidine, bis-{N-methyl-(2,2,6,6-tetramethyl-piperidinyl)}sebacate, and tetrakis(2,2,6,6-tetramethyl-4-piperidinyl)-1,2,3,4-butanetetracarboxylate. Among them, (2,2,6,6-tetramethyl-4-piperidinyl)sebacate is preferably used.

The content of the hindered amine-based compound (E) compound is not particularly limited, but is preferably 1,000 to 5,000 ppm with respect to 100 parts by mass of the transparent thermoplastic resin composition. When the content is in the range of 1,000 to 5,000 ppm with respect to 100 parts by mass of the transparent thermoplastic resin composition, the recovery rate after irradiation with γ-rays can be improved without deteriorating the total light transmittance, color tone, and reduction rate of total light transmittance after irradiation with γ-rays of the molded article.

The transparent thermoplastic resin composition may contain a phosphorus-based compound other than the dihydrooxaphosphaphenanthrene-based phosphorus compound (D) and other antioxidants as long as the desired effect is not impaired.

Examples of the phosphorus-based compound other than the dihydrooxaphosphaphenanthrene-based phosphorus compound (D) include pentaerythritol diphosphite compounds such as tris(2,4-di-t-butylphenyl)phosphite, distearyl pentaerythritol diphosphite, bis(2,4-di-t-butylphenyl)-pentaerythritol diphosphite, bis'2,6-di-t-butyl-4-methylphenyl)-pentaerythritol diphosphite, 2,2-methylenebis(4,6-di-t-butylphenyl)octyl phosphite, and dinonylphenyl pentaerythritol diphosphite. Among them, distearyl pentaerythritol diphosphite is preferably used.

Examples of the other antioxidants include sulfur-based compounds such as distearyl 3,3'-thiodipropionate, dimyristyl 3,3'-thiodipropionate, dilauryl thiodipropionate, lauryl stearyl thiodipropionate, and pentaerythritol tetrakis(3-lauryl thiopropionate).

The transparent thermoplastic resin composition may contain an inorganic filler such as glass fiber, glass powder, glass beads, glass flakes, alumina, alumina fiber, carbon fiber, graphite fiber, stainless steel fiber, whisker, potassium titanate fiber, wollastonite, asbestos, hard clay, calcined clay, talc, kaolin, mica, calcium carbonate, magnesium carbonate, aluminum oxide, and mineral; an impact modifier such as a silicone compound; an ultraviolet absorber such as a benzotriazole-based, benzophenone-based, and salicylate-based ultraviolet absorber; a lubricant or plasticizer such as higher fatty acid, acid ester, acid amide, or higher alcohol lubricant or plasticizer; a mold release agent such as montanic acid and salts thereof, esters thereof, half esters thereof, stearyl alcohol, stearamid, and an ethylene wax; various flame retardants; a flame retardant aid; an anti-coloring agent such as phosphite and hypophosphite; a neutralizer such as phosphoric acid, monosodium phosphate, maleic anhydride, and succinic anhydride; a nucleating agent; an antistatic agent such as an amine-based, sulfonic acid-based, and polyether-based antistatic agent; a colorant such as a pigment and a dye, a bluing agent, and the like, which may be blended to the extent that the effect is not impaired.

According to the transparent thermoplastic resin composition, it is possible to obtain a transparent thermoplastic resin composition in which the reduction rate of total light transmittance after irradiation with γ-rays in a rectangular plate molded article (length: 50 mm, width: 40 mm, thickness: 3 mm) is 3.0 to 7.0%. In addition, it is possible to provide a transparent thermoplastic resin composition in which the recovery rate of total light transmittance after irradiation with γ-rays is 50 to 100%, and the recovery rate of total light transmittance after aging treatment after irradiation with γ-rays is 90 to 100%.

Next, a method of producing the transparent thermoplastic resin composition will be described. This disclosure is not limited to the exemplified production method.

The transparent thermoplastic resin composition can be obtained, for example, by melt-kneading the graft copolymer (A), the vinyl copolymer (B), and other components as necessary. As the method of producing the transparent thermoplastic resin composition, a method is more preferable in which the vinyl copolymer (B) is subjected to continuous bulk polymerization, and the graft copolymer (A) and, if necessary, other components are further continuously melt-kneaded.

FIG. 1 shows a schematic view of one example of an apparatus for producing a transparent thermoplastic resin composition which is preferably used. As shown in FIG. 1, in the apparatus for producing a transparent thermoplastic resin composition, a reaction tank 1 for producing the vinyl copolymer (B), a preheater 2 for heating the resulting vinyl copolymer (B) to a predetermined temperature, and a twin screw extruder-type monomer remover 3 are connected in this order. Further, in the apparatus for producing a transparent thermoplastic resin composition, a twin screw extruder-type feeder 5 for feeding the graft copolymer (A) from the side of the twin screw extruder-type monomer remover 3 is connected to the twin screw extruder-type monomer remover 3. The reaction tank 1 has a stirrer (helical ribbon impeller) 7, and the twin screw extruder-type monomer remover 3 has a vent port 8 for removing volatile components such as unreacted monomers.

The reaction product continuously supplied from the reaction tank 1 is heated to a predetermined temperature in the preheater 2, and then supplied to the twin screw extruder-type monomer remover 3. In the twin screw extruder-type monomer remover 3, volatile components such as unreacted monomers are removed to the outside of the system through the vent port 8 generally at a temperature of about 150 to 280° C. under normal pressure or reduced pressure. This removal of the volatile components is generally performed until the content of the volatile components reaches a predetermined content, for example, 10 mass % or less, and more preferably 5 mass % or less. The removed volatile components are preferably supplied again to the reaction tank 1.

The graft copolymer (A) is supplied from the twin screw extruder-type feeder 5 through an opening provided at a position close to the downstream side in the middle of the twin screw extruder-type monomer remover 3. The twin screw extruder-type feeder 5 preferably has a heating device. The graft copolymer (A) is supplied to the twin screw extruder-type monomer remover 3 in a semi-molten or molten state, whereby a good mixing state can be achieved. The heating temperature of the graft copolymer (A) is generally 100 to 220° C. Examples of the twin screw extruder-type feeder 5 include a twin screw extruder-type feeder having a screw, a cylinder, and a screw drive unit, the cylinder having a heating and cooling function.

The content of the unreacted monomers is preferably reduced to 10 mass % or less, and more preferably 5 mass % or less at the position of the twin screw extruder-type monomer remover 3, where the twin screw extruder-type monomer remover 3 is connected to the twin screw extruder-type feeder 5, in view of suppressing thermal degradation of the rubber component in the subsequent operation of removing the unreacted monomers.

The vinyl copolymer (B) and the graft copolymer (A) are melt-kneaded in a melt-kneading region 4 of the twin screw extruder-type monomer remover 3, the melt-kneading region being located downstream of the position where the twin screw extruder-type monomer remover 3 is connected to the twin screw extruder-type feeder 5. The thermoplastic resin composition is discharged to the outside of the system through the discharge port 6. It is preferable to provide a water injection port 9 in the melt-kneading region 4, and add a predetermined amount of water. The injected water and volatile components such as unreacted monomers are removed to the outside of the system through a final vent port 10 provided further downstream.

The transparent thermoplastic resin composition further contains the phenolic compound (C), the dihydrooxaphosphaphenanthrene-based phosphorus compound (D), and the hindered amine-based compound (E) as necessary, and other additives. A method of adding these additives is not limited. For example, when the vinyl copolymer (B) is subjected to continuous bulk polymerization and the graft copolymer (A) is further continuously kneaded, these additives may be added simultaneously with the graft copolymer (A). When the graft copolymer (A) is produced, these additives may be added as an emulsion dispersion to the latex of the graft copolymer (A) after completion of polymerization.

In particular, the graft copolymer (A) and the phenolic compound (C) are preferably mixed in advance by adding the phenolic compound (C) as an emulsion dispersion to the latex of the graft copolymer (A) after completion of polymerization in the production of the graft copolymer (A). By mixing the graft copolymer (A) and the phenolic compound (C) in advance, the color tone of the molded article can be further improved. Meanwhile, the dihydrooxaphosphaphenanthrene-based phosphorus compound (D) is preferably added simultaneously with the graft copolymer (A) when the vinyl copolymer (B) is subjected to continuous bulk polymerization and the graft copolymer (A) is further continuously kneaded.

In addition, as another production method, for example, a graft copolymer (A) obtained by emulsion polymerization and a vinyl copolymer (B) obtained by suspension polymerization are each produced, and then the phenolic compound (C), the dihydrooxaphosphaphenanthrene-based phosphorus compound (D), and if necessary, other components are melt-kneaded using a general extruder, whereby the transparent thermoplastic resin composition can be produced. Also in this example, the graft copolymer (A) and the phenolic compound (C) are preferably mixed in advance by adding the phenolic compound (C) as an emulsion dispersion to the latex of the graft copolymer (A) after completion of polymerization in the production of the graft copolymer (A).

The transparent thermoplastic resin composition can be molded by any molding method. Examples of the molding method include injection molding, extrusion molding, inflation molding, blow molding, vacuum molding, compression molding, and gas assist molding, and injection molding is preferably used. The cylinder temperature during injection molding is preferably 210° C. or higher and 320° C. or lower, and the mold temperature is preferably 30° C. or higher and 80° C. or lower.

The transparent thermoplastic resin composition can be widely used as a molded article of any shape. Examples of the molded article include a film, a sheet, fibers, cloth, non-woven fabric, an injection molded article, an extrusion molded article, a vacuum pressure molded article, a blow molded article, and a composite with another material.

According to the transparent thermoplastic resin composition, it is possible to obtain a transparent thermoplastic resin composition having both a high total light transmittance and a good color tone, and further having a good reduction rate of total light transmittance after irradiation with γ-rays and a good recovery rate therefrom. Thus, the transparent thermoplastic resin composition is useful for applications such as home electric appliances, communication-related devices, general goods, and medical related devices.

EXAMPLES

Hereinafter, our compositions, methods and molded articles will be described in more detail with reference to Examples, but this disclosure is not limited to the Examples. First, an evaluation method in Examples will be described.
(1) Mass Average Particle Size of Rubbery Polymer The latex of the rubbery polymer (R) was diluted and dispersed in an aqueous medium, and then the particle size distribution thereof was measured by a laser scattering diffraction particle size distribution measurement apparatus "LS 13 320" (Beckman Coulter, Inc.). The mass average particle size of the rubbery polymer (R) was calculated from the particle size distribution.
(2) Refractive Index of Rubbery Polymer (R)

While 150 ml of methanol was stirred at 300 rpm, 10 ml of an emulsified rubber latex was added to the methanol, and then 20 ml of sulfuric acid adjusted to 10 mass % was added to the mixture, thus obtaining a precipitate of a rubbery polymer (R). The precipitate of the rubbery polymer (R) was dried under reduced pressure at 60° C. for 5 hours, and then heated and pressurized by a hot press set at 230° C. to prepare a film having a thickness of 30±5 μm. A small amount of 1-bromonaphthalene was dropped onto the resulting film as a measurement sample. The refractive index of the sample was measured using an Abbe refractometer under the condition of a measurement temperature of 23° C. using D line from a sodium lamp as a light source.
(3) Weight Average Molecular Weight of Acetone-Soluble Component of Graft Copolymer (A) and Vinyl Copolymer (B)

The weight average molecular weights of the acetone-soluble component of the graft copolymer (A) and the vinyl copolymer (B) can be determined from a GPC chromatogram measured using an about 0.2 mass % solution obtained by dissolving about 0.03 g of a sample of the acetone-soluble component of the graft copolymer (A) or the vinyl copolymer (B) in about 15 g of tetrahydrofuran, and using polymethyl methacrylate as a standard substance. The GPC measurement can be performed under the following conditions:

Measurement apparatus: Waters 2695
Column temperature: 40° C.
Detector: RI 2414 (differential refractive index detector)
Flow rate of carrier eluent: 0.3 ml/min (solvent: tetrahydrofuran)
Column: TSKgel Super HZM-M (6.0 mm I.D.×15 cm), TSKgel Super HZM-N (6.0 mm I.D.×15 cm) connected in series (both manufactured by Tosoh Corporation).

(4) Graft Ratio of Graft Copolymer (A)

To about 1 g of the graft copolymer (A) was added 80 ml of acetone, and the mixture was refluxed in a hot water bath at 70° C. for 3 hours. This solution is centrifuged at 8,000 r.p.m. (10,000 G) for 40 minutes, and then the insoluble component is separated by filtration to obtain an acetone-insoluble component. The resulting acetone-insoluble component is dried under reduced pressure at 80° C. for 5 hours, and then the mass thereof (denoted as n in the equation below) is measured, and the graft ratio is calculated from the following equation. m is the mass of sample of the graft copolymer (A) used, and X is the rubbery polymer content (mass %) of the graft copolymer (A).

$$\text{Graft ratio (\%)} = \{[(n)-((m) \times X/100)]/[(m) \times X/100]\} \times 100.$$

(5) Refractive Index of Graft Component (Acetone-Insoluble Component) of Graft Copolymer (A) and Vinyl Copolymer (B)

For the acetone-insoluble component of the graft copolymer (A) obtained by the procedure described in section (4), a film having a thickness of 30±5 μm was prepared by a hot press at 230° C. Also for the vinyl copolymer (B), a film having a thickness of 30±5 μm was prepared in the same manner. A small amount of 1-bromonaphthalene was dropped onto each of the resulting films, and the refractive index thereof was measured using an Abbe refractometer under the following conditions:

Light source: D line from sodium lamp
Measurement temperature: 23° C.

(6) Number Average Particle Size of Graft Copolymer (A) in Transparent Thermoplastic Resin Composition The number average particle size of the graft copolymer (A) in the transparent thermoplastic resin composition was determined by slicing a narrow portion of a multi-purpose A-type test piece (total length: 150 mm, width of test portion: 10 mm, thickness: 4 mm) specified by ISO 3167: 2002, which was obtained in each of Examples and Comparative Examples, into a piece with a thickness of about 60 nm and staining the sliced piece with osmium tetroxide to prepare a sample, observing the sample with a transmission electron microscope (magnification: 15,000 times, observation range: 5 m×5 m), measuring the maximum size and minimum size of 100 graft copolymer particles randomly selected, and calculating the number average value thereof.

(7) Content of (Meth)Acrylic Acid Ester-Based Monomer-Derived Unit and Vinyl Cyanide-Based monomer-derived unit in transparent thermoplastic resin composition A film having a thickness of 30±5 μm prepared using pellets of the transparent thermoplastic resin composition by a hot press set at 230° C. was subjected to FT-IR analysis. The contents of the (meth)acrylic acid ester-based monomer and the vinyl cyanide-based monomer-derived unit were determined from a calibration curve prepared in advance from the intensity ratio of the following peaks appearing on the FT-IR spectrum chart. The relationship between the unit and the peak is described below:

Diene-based monomer-derived unit: the peak at 960 cm$^{-1}$ corresponding to C=C.

(Meth)acrylic acid ester-based monomer-derived unit: the peak at 3,460 cm$^{-1}$ which is the overtone of the peak at 1,730 cm-1 corresponding to stretching vibration of the carbonyl group C=O of the ester.

Aromatic vinyl-based monomer-derived unit: the peak at 1,605 cm-1 corresponding to vibration of the benzene nucleus.

Vinyl cyanide-based monomer-derived unit: the peak at 2,240 cm-1 corresponding to C≡N stretching.

Figure 3:
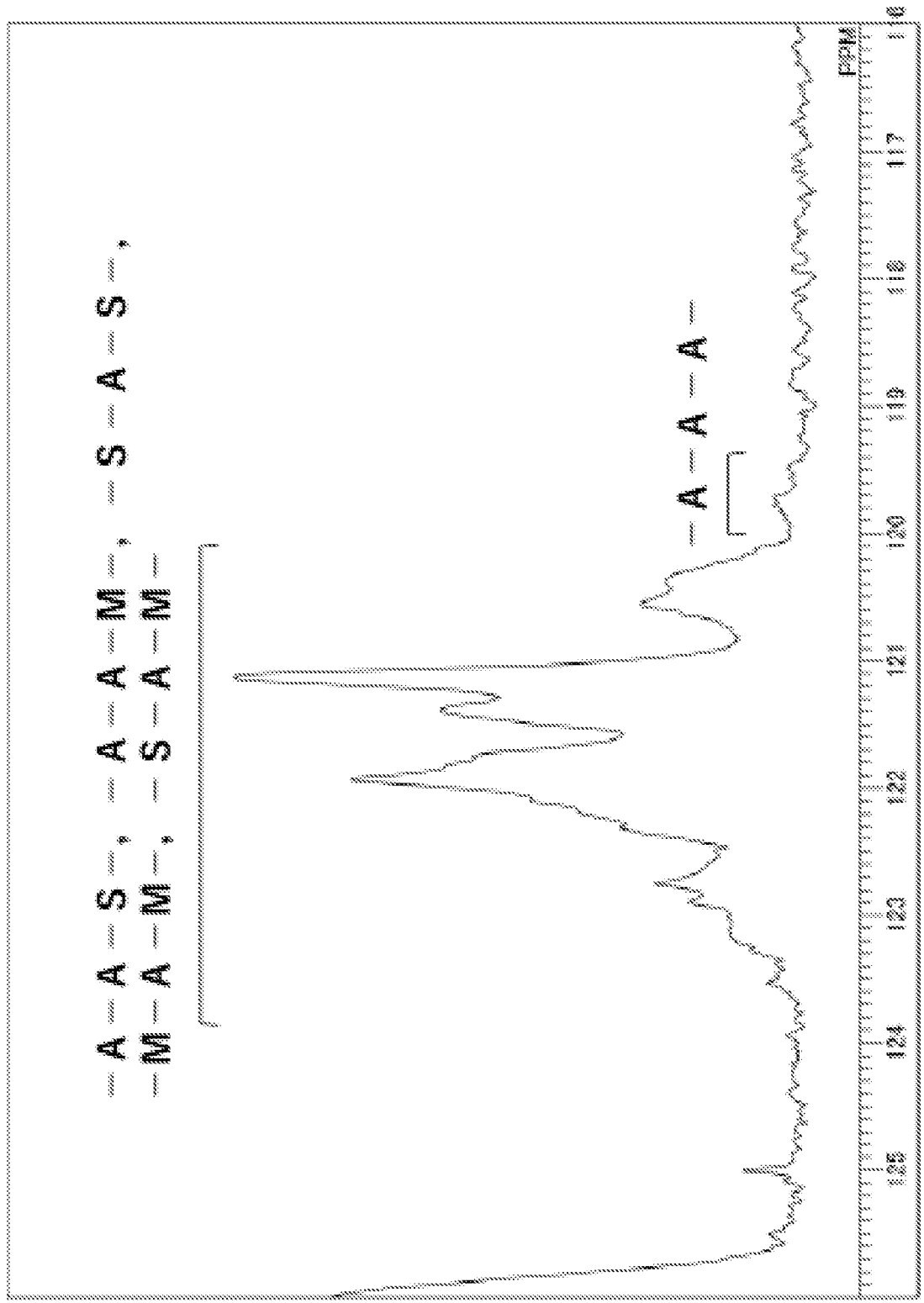
FIG. 3 is an example of an enlarged view of a signal portion corresponding to a nitrile group in a $^{13}$C-NMR spectrum chart of a methyl methacrylate-styrene-acrylonitrile copolymer.

(8) Proportion of Triad of Vinyl Cyanide-Based Monomer-Derived Units in Dimethyl Sulfoxide-Soluble Component of Transparent Thermoplastic Resin Composition To about 10 g of the transparent thermoplastic resin composition was added 50 ml of deuterated dimethyl sulfoxide (DMSO-$d_6$), and the mixture was refluxed in a hot water bath at 70° C. for 3 hours. This solution was centrifuged at 8,000 r/min (10,000 G) for 40 minutes, and then the insoluble component was separated by filtration to obtain a dimethyl sulfoxide-soluble component. The presence of the peak at 122 ppm corresponding to the carbon of C≡N of the vinyl cyanide-based monomer-derived unit appearing on the NMR spectrum chart obtained by using the dimethyl sulfoxide-soluble component as a sample was confirmed. In addition, by utilizing the phenomenon that the signal shift of the carbon of C≡N of the vinyl cyanide-based monomer-derived unit appearing in $^{13}$C-NMR is slightly different depending on the difference in the adjacent monomer type, the proportion of the triad of the carbon of C≡N of the vinyl cyanide-based monomer-derived unit was quantitated from the integrated value of the signal. The proportion of the triad of vinyl cyanide-based monomer-derived units in the total number of triads where the center of each of the triads is a vinyl cyanide-based monomer-derived unit was calculated in mol %. FIG. 3 shows an example of an enlarged view of the carbon of C≡N in the $^{13}$C-NMR spectrum chart of the styrene-methyl methacrylate-acrylonitrile copolymer. The capital letters S, M, and A shown in FIG. 3 respectively represent a styrene monomer-derived unit, a methyl methacrylate monomer-derived unit, and an acrylonitrile monomer-derived unit.

The proportion (mol %) of the triad of vinyl cyanide-based monomer-derived units in the total number of triads where the center of each of the triads is a vinyl cyanide-based monomer-derived unit is defined as [peak intensity of -A-A-A-]/[peak intensities of -A-A-A-, -A-A-S-, -A-A-M-, -S-A-S-, -M-A-M-, and -S-A-M-]×100.

The combination of the triad and the peak position thereof are as follows:

A-A-A-: 119.4 to 120.0 ppm
A-A-S-, -A-A-M-, -S-A-S-, -M-A-M-, -S-A-M-: 120.0 to 123.8 ppm.

The measurement conditions of $^{13}$C-NMR are as follows:
Apparatus: ECZR-600 manufactured by JEOL Ltd.
Measurement method: single $^{13}$C pulse with inverse gated $^1$H decoupling
Probe: SuperCOOL open type
Observation frequency: 150.9 MHz
Solvent: DMSO-$d_6$
Concentration: 100 mg/0.6 ml (sample/DMSO-$d_6$)
Standard for the chemical shift: Me$_4$Si
Temperature: 110° C.
Observation width: 37,900 Hz
Data point: 32768
Flip angle: 450 (5.25 s)
pulse delay time: 5.0 s
Number of scans: 12,988 times.

(9) Amount of Radicals Generated in Transparent Thermoplastic Resin Composition after Irradiation with γ-Rays A rectangular plate test piece having a thickness of 3 mm obtained in each of Examples and Comparative Examples was irradiated with γ-rays at a γ-ray irradiation absorbed dose of 25 kGy or 37.5 kGy by Koga Isotope, Ltd. The amount of radicals generated of the irradiated sample was measured using ESR (electron spin resonance apparatus).

The measurement conditions of ESR are as follows:
Apparatus: EMXplus manufactured by Bruker
Measurement temperature: room temperature
Central magnetic field: 351.6 mT
Magnetic field sweep range: 40 mT)
Modulation: 100 kHz, 0.2 mT
Microwave: 9.86 GHZ, 0.1 mW
Sweep time: 80 s×4 times
Time constant: 163.84 ms
Number of data points: 2,000 points
Cavity: Super-high-Q.

(10) Molar Ratio (P/OH) of Phosphorus Atom (P) of Dihydrooxaphosphaphenanthrene-Based Phosphorus Compound (D) to Hydroxyl Group (OH) of Phenolic Compound (C) in Transparent Thermoplastic Resin Composition The molar ratio can be calculated by the following calculation equation provided that a value obtained by dividing the blended amount of the dihydrooxaphosphaphenanthrene-based phosphorus compound (D) in the transparent thermoplastic resin composition by the molecular weight of the dihydrooxaphosphaphenanthrene-based phosphorus compound (D) is taken as the numerator, and a value obtained by dividing the blended amount of the phenolic compound (C), by a value obtained by dividing the molecular weight of the phenolic compound (C) by the number of hydroxyl groups (OH groups) in one molecule of the phenolic compound (C) is taken as the denominator.

Molar ratio (P/OH)=[blended amount of dihydrooxaphosphaphenanthrene-based phosphorus compound (D)/molecular weight of dihydrooxaphosphaphenanthrene-based phosphorus compound (D)]/[blended amount of phenolic compound (C)/(molecular weight of phenolic compound (C)/number of hydroxyl groups (OH groups) in one molecule of phenolic compound (C))]

(11) Haze

The pellets of the transparent thermoplastic resin composition obtained in each of Examples and Comparative Examples were dried in a hot air dryer at 80° C. for 3 hours, and charged in a molding machine, SE-50 DU, manufactured by Sumitomo Heavy Industries, Ltd. with the cylinder temperature set to 230° C. Rectangular plate molded articles (length: 50 mm, width: 40 mm, thickness: 3 mm) were formed at a mold temperature of 60° C. and a molding cycle of 20 seconds. The resulting five rectangular plate molded articles were measured for the haze by using a direct-reading haze meter manufactured by Toyo Seiki Seisaku-sho, Ltd., and the number average value thereof was calculated.

(12) Total Light Transmittance

The pellets of the transparent thermoplastic resin composition obtained in each of Examples and Comparative Examples were dried in a hot air dryer at 80° C. for 3 hours, and charged in a molding machine, SE-50 DU, manufactured by Sumitomo Heavy Industries, Ltd. with the cylinder temperature set to 230° C. Rectangular plate molded articles (length: 50 mm, width: 40 mm, thickness: 3 mm) were formed at a mold temperature of 60° C. and a molding cycle of 20 seconds. The resulting five rectangular plate molded articles were measured for the total light transmittance by using a direct-reading haze meter manufactured by Toyo Seiki Seisaku-sho, Ltd., and the number average value thereof was calculated (TO).

(13) Color Tone (YI Value)

The pellets of the transparent thermoplastic resin composition obtained in each of Examples and Comparative Examples were dried in a hot air dryer at 80° C. for 3 hours, and charged in a molding machine, SE-50 DU, manufactured by Sumitomo Heavy Industries, Ltd. with the cylinder temperature set to 230° C. Rectangular plate molded articles (length: 50 mm, width: 40 mm, thickness: 3 mm) were formed at a mold temperature of 60° C. and a molding cycle of 20 seconds. The resulting five rectangular plate molded articles were measured for the YI value in accordance with JIS K7103 (1971), and the number average value thereof was calculated.

(14) Reduction Rate of Total Light Transmittance after Irradiation with γ-Rays and Recovery Rate Therefrom The pellets of the transparent thermoplastic resin composition obtained in each of Examples and Comparative Examples were dried in a hot air dryer at 80° C. for 3 hours, and charged in a molding machine, SE-50 DU, manufactured by Sumitomo Heavy Industries, Ltd. with the cylinder temperature set to 230° C. Rectangular plate molded articles (length: 50 mm, width: 40 mm, thickness: 3 mm) were formed at a mold temperature of 60° C. and a molding cycle of 20 seconds. The resulting rectangular plate molded articles were irradiated with γ-rays at a γ-ray irradiation absorbed dose of 25 kGy or 37.5 kGy by Koga Isotope, Ltd. After a lapse of 24 hours from the irradiation with γ-rays, five rectangular plate molded articles were measured for the total light transmittance, and the number average value thereof was calculated (T24). After a lapse of 600 hours from the irradiation with γ-rays, five rectangular plate molded articles were measured for the total light transmittance, and the number average value thereof was calculated (T600). The reduction rate of total light transmittance after irradiation with γ-rays and the recovery rate therefrom were respectively calculated by the following equations.

Reduction rate (%) of total light transmittance after irradiation with γ-rays={[total light transmittance before irradiation with γ-rays (T0)]−[total light transmittance after lapse of 24 hours from irradiation with γ-rays (T24)]}/[total light transmittance before irradiation with γ-rays (T0)]×100

Recovery rate (%) of total light transmittance after irradiation with γ-rays={[total light transmittance after lapse of 600 hours from irradiation with γ-rays (T600)]−[total light transmittance after lapse of 24 hours from irradiation with γ-rays (T24)]}/[total light transmittance after lapse of 24 hours from irradiation with γ-rays (T24)]×100.

(15) Recovery Rate of Total Light Transmittance after Aging Treatment after Irradiation with γ-Rays The pellets of the transparent thermoplastic resin composition obtained in each of Examples and Comparative Examples were dried in a hot air dryer at 80° C. for 3 hours, and charged in a molding machine, SE-50 DU, manufactured by Sumitomo Heavy Industries, Ltd. with the cylinder temperature set to 230° C. Rectangular plate molded articles (length: 50 mm, width: 40 mm, thickness: 3 mm) were formed at a mold temperature of 60° C. and a molding cycle of 20 seconds. The resulting rectangular plate molded articles were irradiated with γ-rays at a γ-ray irradiation absorbed dose of 25 kGy or 37.5 kGy by Koga Isotope, Ltd.

After a lapse of 24 hours from the irradiation with γ-rays, five rectangular plate molded articles were measured for the total light transmittance, and the number average value thereof was calculated (T24). The rectangular plate molded articles were subjected to aging treatment for 7 days at a temperature of 55° C. and a humidity of 80%, for 1 day at a temperature of −20° C. and a humidity of 0%, and for 7 days at a temperature of 55° C. and a humidity of 20%, and then the conditions were set to a temperature of 23° C. and a humidity of 50%. Then, the five rectangular plate molded articles were measured for the total light transmittance, and the number average value thereof was calculated (T15).

The recovery rate of total light transmittance after aging treatment after irradiation with γ-rays was calculated by the following equation:

Recovery rate (%) of total light transmittance after aging treatment after irradiation with γ-rays={[total light transmittance after aging treatment after irradiation with γ-rays (T15)]−[total light transmittance after lapse of 24 hours from irradiation with γ-rays (T24)]}/[total light transmittance after lapse of 24 hours from irradiation with γ-rays (T24)]×100.

(16) Impact Resistance (Charpy Impact Strength)

The pellets of the transparent thermoplastic resin composition obtained in each of Examples and Comparative Examples were dried in a hot air dryer at 80° C. for 3 hours, and then charged in a molding machine, SE-50 DU, manufactured by Sumitomo Heavy Industries, Ltd., with the cylinder temperature set to 230° C. Multi-purpose A-type test pieces (total length: 150 mm, width of test portion: 10 mm, thickness: 4 mm) specified by ISO 3167:2002 were prepared. The Charpy impact strength was measured using the resulting test pieces in accordance with ISO 179-1:2010. Eight test pieces were measured for the Charpy impact strength, and the number average value thereof was calculated.

Dumbbell test pieces having a thickness of 4 mm were immediately formed. The resulting five dumbbell test pieces were measured for the Charpy impact strength by a method in accordance with ISO 179, and the number average value thereof was calculated.

Graft Copolymer (A1):

Production Example 1, Graft Copolymer (A1-1)

A reaction vessel having an internal volume of 25 m³ and equipped with a stirring impeller was charged with 50 parts by mass (in terms of solid content) of polybutadiene latex (mass average particle size of rubber: 0.30 μm, refractive index: 1.516), 130 parts by mass of pure water, 0.4 parts by mass of sodium laurate, 0.2 parts by mass of glucose, 0.2 parts by mass of sodium pyrophosphate, and 0.01 parts by mass of ferrous sulfate, and after purging with nitrogen, the temperature was adjusted to 60° C. A monomer mixture of 3.0 parts by mass of styrene, 12.0 parts by mass of methyl methacrylate, and 0.16 parts by mass of t-dodecyl mercaptan was initially added with stirring over 45 minutes.

Subsequently, an initiator mixture of 0.3 parts by mass of cumene hydroperoxide, 1.6 parts by mass of sodium laurate as an emulsifier, and 25 parts by mass of pure water was continuously added dropwise over 4 hours. At the same time, a monomer mixture of 9.5 parts by mass of styrene, 25.5 parts by mass of methyl methacrylate, and 0.36 parts by mass of t-dodecyl mercaptan was continuously added over 3 hours. After the additional dropwise addition of the monomer mixture, only the initiator mixture was continuously added for 1 hour, and the polymerization was maintained for 1 hour without adding anything, and then the polymerization was terminated. After completion of the polymerization, 395 ppm of an emulsion dispersion of a reaction product (C-1) of p-cresol, dicyclopentadiene, and isobutylene was added in terms of solid content of the reaction product (C-1) of p-cresol, dicyclopentadiene, and isobutylene with respect to 100 parts by mass of the graft copolymer (A1-1). The resulting graft copolymer latex was coagulated with 1.5 mass % sulfuric acid, then neutralized with sodium hydroxide, washed, centrifuged, and dried to obtain a powder graft copolymer (A1-1) (monomer ratio: styrene 25 mass %, methyl methacrylate 75 mass %). The refractive index of the acetone-insoluble component of the resulting graft copolymer (A1-1) was 1.516, and the difference in refractive index between the acetone-insoluble component and the rubbery polymer was 0.000. The graft ratio was 50%. The weight average molecular weight of the acetone-soluble component was 70,000.

Production Example 2, Graft Copolymer (A1-2)

A graft copolymer (A1-2) was obtained in the same manner as in Production Example 1 except that after completion of the polymerization, 1,053 ppm of an emulsion dispersion of the reaction product (C-1) of p-cresol, dicyclopentadiene, and isobutylene was added in terms of solid content of the reaction product (C-1) of p-cresol, dicyclopentadiene, and isobutylene with respect to 100 parts by mass of the graft copolymer (A1-1).

Production Example 3, Graft Copolymer (A1-3)

A graft copolymer (A1-3) was obtained in the same manner as in Production Example 1 except that after completion of the polymerization, 1,842 ppm of an emulsion dispersion of the reaction product (C-1) of p-cresol, dicyclopentadiene, and isobutylene was added in terms of solid content of the reaction product (C-1) of p-cresol, dicyclopentadiene, and isobutylene with respect to 100 parts by mass of the graft copolymer (A1-1).

Production Example 4, Graft Copolymer (A1-4)

A graft copolymer (A1-4) was obtained in the same manner as in Production Example 1 except that after completion of the polymerization, 2,368 ppm of an emulsion dispersion of the reaction product (C-1) of p-cresol, dicyclopentadiene, and isobutylene was added in terms of solid content of the reaction product (C-1) of p-cresol, dicyclopentadiene, and isobutylene with respect to 100 parts by mass of the graft copolymer (A1-1).

Production Example 5, Graft Copolymer (A1-5)

A graft copolymer (A1-5) was obtained in the same manner as in Production Example 1 except that after completion of the polymerization, 3,158 ppm of an emulsion dispersion of the reaction product (C-1) of p-cresol, dicyclopentadiene, and isobutylene was added in terms of solid content of the reaction product (C-1) of p-cresol, dicyclopentadiene, and isobutylene with respect to 100 parts by mass of the graft copolymer (A1-1).

Production Example 6, Graft Copolymer (A1-6)

A graft copolymer (A1-6) was obtained in the same manner as in Production Example 1 except that after completion of the polymerization, 132 ppm of an emulsion dispersion of the reaction product (C-1) of p-cresol, dicyclopentadiene, and isobutylene was added in terms of solid content of the reaction product (C-1) of p-cresol, dicyclopentadiene, and isobutylene with respect to 100 parts by mass of the graft copolymer (A1-1).

Production Example 7, Graft Copolymer (A1-7)

A reaction vessel having an internal volume of 25 m$^3$ and equipped with a stirring impeller was charged with 50 parts by mass (in terms of solid content) of polybutadiene latex (mass average particle size of rubber: 0.30 μm, refractive index: 1.516), 130 parts by mass of pure water, 0.4 parts by mass of sodium laurate, 0.2 parts by mass of glucose, 0.2 parts by mass of sodium pyrophosphate, and 0.01 parts by mass of ferrous sulfate, and after purging with nitrogen, the temperature was adjusted to 60° C. A monomer mixture of 3.6 parts by mass of styrene, 0.6 parts by mass of acrylonitrile, 10.8 parts by mass of methyl methacrylate, and 0.16 parts by mass of t-dodecyl mercaptan was initially added with stirring over 45 minutes.

Subsequently, an initiator mixture of 0.3 parts by mass of cumene hydroperoxide, 1.6 parts by mass of sodium laurate as an emulsifier, and 25 parts by mass of pure water was continuously added dropwise over 4 hours. At the same time, a monomer mixture of 8.4 parts by mass of styrene, 1.4 parts by mass of acrylonitrile, 25.2 parts by mass of methyl methacrylate, and 0.36 parts by mass of t-dodecyl mercaptan was continuously added dropwise over 3 hours. After the additional dropwise addition of the monomer mixture, only the initiator mixture was continuously added for 1 hour, and the polymerization was maintained for 1 hour without adding anything, and then the polymerization was terminated. After completion of the polymerization, 1,053 ppm of an emulsion dispersion of the reaction product (C-1) of p-cresol, dicyclopentadiene, and isobutylene was added in terms of solid content of the reaction product (C-1) of p-cresol, dicyclopentadiene, and isobutylene with respect to 100 parts by mass of the graft copolymer (A1-7). The resulting graft copolymer latex was coagulated with 1.5 mass % sulfuric acid, then neutralized with sodium hydroxide, washed, centrifuged, and dried to obtain a powder graft copolymer (A1-7) (monomer ratio: styrene 24 mass %, acrylonitrile 4 mass %, methyl methacrylate 72 mass %). The refractive index of the acetone-insoluble component of the resulting graft copolymer (A1-7) was 1.517, and the difference in refractive index between the acetone-insoluble component and the rubbery polymer was 0.001. The graft ratio was 47%. The weight average molecular weight of the acetone-soluble component was 72,000.

Production Example 8, Graft Copolymer (A1-8)

A graft copolymer (A1-8) was obtained in the same manner as in Production Example 1 except that after completion of the polymerization, 1,053 ppm of an emulsion dispersion of 2,2'-methylenebis-(4-ethyl-6-t-butylphenol) (C-2) was added in terms of solid content of 2,2'-methylenebis-(4-ethyl-6-t-butylphenol) (C-2) with respect to 100 parts by mass of the graft copolymer (A1-1).

Production Example 9, Graft Copolymer (A1-9)

A graft copolymer (A1-9) was obtained in the same manner as in Production Example 1 except that after completion of the polymerization, 1,053 ppm of an emulsion dispersion of octadecyl-3-(3,5-di-t-butyl-4-hydroxyphenyl) propionate (C-3) was added in terms of solid content of octadecyl-3-(3,5-di-t-butyl-4-hydroxyphenyl)propionate (C-3) with respect to 100 parts by mass of the graft copolymer (A1-1).

Production Example 10, Graft Copolymer (A1-10)

A graft copolymer (A1-10) was obtained in the same manner as in Production Example 1 except that after completion of the polymerization, 1,053 ppm of an emulsion dispersion of 1,3,5-tris(3',5')-di-t-butyl-4'-hydroxybenzyl-s-triazine2,4,6(1H, 2H, 3H)-trione (C-4) was added in terms of solid content of octadecyl-3-(3,5-di-t-butyl-4-hydroxyphenyl)propionate (C-3) with respect to 100 parts by mass of the graft copolymer (A1-1).

Production Example 11, Graft Copolymer (A1-11)

A graft copolymer (A1-11) was obtained in the same manner as in Production Example 1 except that after completion of the polymerization, 1,580 ppm of an emulsion dispersion of the reaction product (C-1) of p-cresol, dicyclopentadiene, and isobutylene was added in terms of solid content of the reaction product (C-1) of p-cresol, dicyclopentadiene, and isobutylene with respect to 100 parts by mass of the graft copolymer (A1-1).

Phenolic Compound (C):
  Reaction product of p-cresol, dicyclopentadiene, and isobutylene (average molecular weight: 650, average number of hydroxyl groups (OH) in one molecule: 2.7): Kumanox 5010L manufactured by Songwon International Japan K.K. (C-1)
2,2'-Methylenebis-(4-ethyl-6-t-butylphenol) (molecular weight: 369, number of hydroxyl groups (OH) in one molecule: 2): Yoshinox 425 manufactured by Mitsubishi Chemical Corporation (C-2)
Octadecyl-3-(3,5-di-t-butyl-4-hydroxyphenyl)propionate (molecular weight: 531, number of hydroxyl groups (OH) in one molecule: 1): ADK STAB AO-50 manufactured by Akeka Corporation (C-3)
1,3,5-Tris(3',5')-di-t-butyl-4'-hydroxybenzyl-s-triazine2,4,6 (1H, 2H, 3H)-trione (molecular weight: 784, number of hydroxyl groups (OH) in one molecule: 3): ADK STAB AO-20 manufactured by Akeka Corporation (C-4)

Dihydrooxaphosphaphenanthrene-Based Phosphorus Compound (D):
9,10-Dihydro-9-oxa-10-phosphaphenanthrene-10-oxide: HCA manufactured by Sanko Co., Ltd. (D-1)

Hindered Amine-Based Compound (E):
Bis(2,2,6,6-tetramethyl-4-piperidinyl)sebacate: "ADK STAB" LA-77 manufactured by Adeka Corporation (E-1)

The production conditions and measurement results of the graft copolymers (A1-1 to A1-11) are shown in Table 1.

TABLE 1

| Graft copolymer (A1) | Rubbery polymer (R1) Type | Rubbery polymer (R1) Content (mass %) | Vinyl copolymer Content (mass %) | (a1) (mass %) | (a2) (mass %) | (a3) (mass %) | Graft ratio (%) | Phenolic compound (C) Type | Phenolic compound (C) Added amount (ppm) |
|---|---|---|---|---|---|---|---|---|---|
| A1-1 | Polybutadiene rubber | 50 | 50 | 25 | 75 | 0 | 50 | C-1 | 395 |
| A1-2 | Polybutadiene rubber | 50 | 50 | 25 | 75 | 0 | 50 | C-1 | 1053 |
| A1-3 | Polybutadiene rubber | 50 | 50 | 25 | 75 | 0 | 50 | C-1 | 1842 |
| A1-4 | Polybutadiene rubber | 50 | 50 | 25 | 75 | 0 | 50 | C-1 | 2368 |
| A1-5 | Polybutadiene rubber | 50 | 50 | 25 | 75 | 0 | 50 | C-1 | 3158 |
| A1-6 | Polybutadiene rubber | 50 | 50 | 25 | 75 | 0 | 50 | C-1 | 132 |
| A1-7 | Polybutadiene rubber | 50 | 50 | 24 | 72 | 4 | 47 | C-1 | 1053 |
| A1-8 | Polybutadiene rubber | 50 | 50 | 25 | 75 | 0 | 50 | C-2 | 1053 |
| A1-9 | Polybutadiene rubber | 50 | 50 | 25 | 75 | 0 | 50 | C-3 | 1053 |
| A1-10 | Polybutadiene rubber | 50 | 50 | 25 | 75 | 0 | 50 | C-4 | 1053 |
| A1-11 | Polybutadiene rubber | 50 | 50 | 25 | 75 | 0 | 50 | C-1 | 1580 |

Example 1

A vinyl copolymer and a transparent thermoplastic resin composition were produced by the following method using a continuous bulk polymerization apparatus including: a 2 m³ complete mixing polymerization tank having a condenser for evaporation and dry distillation of the monomer vapor and a helical ribbon impeller; a single screw extruder-type preheater; a twin screw extruder-type monomer remover; and a twin screw extruder-type feeder for feeding from the side of the monomer remover, the feeder being connected to the barrel portion located ⅓ upstream of the downstream (outlet) end of the monomer remover.

First, a monomer mixture (b) containing 23.5 parts by mass of styrene, 4.5 parts by mass of acrylonitrile, 72 parts by mass of methyl methacrylate, 0.32 parts by mass of n-octyl mercaptan, and 0.015 parts by mass of 1,1-bis(t-butylperoxy)cyclohexane was continuously supplied to the complete mixing polymerization tank at 150 kg/hour, and subjected to continuous bulk polymerization while maintaining the polymerization temperature at 130° C. and the internal pressure in the tank at 0.08 MPa. The polymerization rate of the polymerization reaction mixture at the outlet of the complete mixing polymerization tank was controlled to 65±3%.

Next, the polymerization reaction mixture was preheated by the single screw extruder-type preheater and then supplied to the twin screw extruder-type monomer remover. The unreacted monomer was evaporated and recovered under reduced pressure through the vent port of the twin screw extruder-type monomer remover. The recovered unreacted monomer was continuously refluxed to the complete mixing polymerization tank. At a position ⅓ upstream (with respect to the total length) of the downstream end of the twin screw extruder-type monomer remover, 92 kg/hour (38 parts by mass) of a semi-molten state product of the graft copolymer (A1-1) produced in Production Example 1, 0.0266 kg/hour (110 ppm) of 9,10-dihydro-9-oxa-10-phosphaphenanthrene-10-oxide (D-1) as the dihydrooxaphosphaphenanthrene-based phosphorus compound (D), and 0.339 kg/hour (1,400 ppm) of distearyl-3,3'-thiodipropionate were supplied to 150 kg/hour (62 parts by mass) of a styrene/acrylonitrile/methyl methacrylate copolymer having an apparent polymerization rate of 99% or more by the twin screw extruder-type feeder. The supplied materials were melt-kneaded with the styrene/acryl-onitrile/methyl methacrylate copolymer in the twin screw extruder-type monomer remover. In the melt-kneading step, 2 kg/hour of water was supplied at a position ⅙ (with respect to the total length) upstream of the downstream end of the twin screw extruder-type monomer remover. The water and other volatile components were removed by evaporation under reduced pressure through the vent port provided further downstream of the twin screw extruder-type monomer remover. Thereafter, the melt-kneaded product was discharged in the form of a strand and cut with a cutter to obtain pellets of a transparent thermoplastic resin composition.

In addition, the supply from the twin screw extruder-type feeder was stopped, and a styrene/acrylonitrile/methyl methacrylate copolymer as the vinyl copolymer (B1) was discharged and sampled. The properties of the resulting styrene/acrylonitrile/methyl methacrylate copolymer and transparent thermoplastic resin composition were evaluated by the methods described above.

Example 2

Pellets of a transparent thermoplastic resin composition were obtained using the graft copolymer (A1-1) produced in Production Example 1 in the same manner as in Example 1 except that the supply amount of 9,10-dihydro-9-oxa-10-phosphaphenanthrene-10-oxide (D-1) as the dihydrooxa-phosphaphenanthrene-based phosphorus compound (D) was set to 0.0726 kg/hour (300 ppm), and 0.0605 kg/hour (250 ppm) of 2,2'-methylenebis-(4-ethyl-6-t-butylphenol) (C-2) as the phenolic compound (C) was further supplied.

Example 3

Pellets of a transparent thermoplastic resin composition were obtained in the same manner as in Example 1 except that the graft copolymer (A1-2) produced in Production Example 2 was used in place of the graft copolymer (A1-1) produced in Production Example 1, and the supply amount of 9,10-dihydro-9-oxa-10-phosphaphenanthrene-10-oxide (D-1) as the dihydro-oxaphosphaphenanthrene-based phosphorus compound (D) was set to 0.0726 kg/hour (300 ppm).

Example 4

Pellets of a transparent thermoplastic resin composition were obtained in the same manner as in Example 1 except that the graft copolymer (A1-2) produced in Production Example 2 was used in place of the graft copolymer (A1-1) produced in Production Example 1, and the supply amount of 9,10-dihydro-9-oxa-10-phosphaphenanthrene-10-oxide (D-1) as the dihydro-oxaphosphaphenanthrene-based phosphorus compound (D) was set to 0.121 kg/hour (500 ppm).

Example 5

Pellets of a transparent thermoplastic resin composition were obtained in the same manner as in Example 1 except that the graft copolymer (A1-2) produced in Production Example 2 was used in place of the graft copolymer (A1-1) produced in Production Example 1, and the supply amount of 9,10-dihydro-9-oxa-10-phosphaphenanthrene-10-oxide (D-1) as the dihydro-oxaphosphaphenanthrene-based phosphorus compound (D) was set to 0.0242 kg/hour (100 ppm).

Example 6

Pellets of a transparent thermoplastic resin composition were obtained in the same manner as in Example 1 except that the graft copolymer (A1-3) produced in Production Example 3 was used in place of the graft copolymer (A1-1) produced in Production Example 1, and the supply amount of 9,10-dihydro-9-oxa-10-phosphaphenanthrene-10-oxide (D-1) as the dihydro-oxaphosphaphenanthrene-based phosphorus compound (D) was set to 0.121 kg/hour (500 ppm).

Example 7

Pellets of a transparent thermoplastic resin composition were obtained in the same manner as in Example 1 except that the graft copolymer (A1-4) produced in Production Example 4 was used in place of the graft copolymer (A1-1) produced in Production Example 1, and the supply amount of 9,10-dihydro-9-oxa-10-phosphaphenanthrene-10-oxide (D-1) as the dihydro-oxaphosphaphenanthrene-based phosphorus compound (D) was set to 0.2177 kg/hour (900 ppm).

Example 8

Pellets of a transparent thermoplastic resin composition were obtained in the same manner as in Example 1 except that the graft copolymer (A1-4) produced in Production Example 4 was used in place of the graft copolymer (A1-1) produced in Production Example 1, and the supply amount of 9,10-dihydro-9-oxa-10-phosphaphenanthrene-10-oxide (D-1) as the dihydrooxaphosphaphenanthrene-based phosphorus compound (D) was set to 0.6774 kg/hour (2,800 ppm).

Example 9

Pellets of a transparent thermoplastic resin composition were obtained in the same manner as in Example 1 except that the graft copolymer (A1-2) produced in Production Example 2 was used in place of the graft copolymer (A1-1) produced in Production Example 1, the supply amount of 9,10-dihydro-9-oxa-10-phosphaphenanthrene-10-oxide (D-1) as the dihydrooxaphosphaphenanthrene-based phosphorus compound (D) was set to 0.0726 kg/hour (300 ppm), and 0.726 kg/hour (3,000 ppm) of bis(2,2,6,6-tetramethyl-4-piperidinyl)sebacate (E-1) was further supplied.

Example 10

Pellets of a transparent thermoplastic resin composition were obtained in the same manner as in Example 1 except that the graft copolymer (A1-7) produced in Production Example 7 was used in place of the graft copolymer (A1-1) produced in Production Example 1, and the supply amount of 9,10-dihydro-9-oxa-10-phosphaphenanthrene-10-oxide (D-1) as the dihydro-oxaphosphaphenanthrene-based phosphorus compound (D) was set to 0.121 kg/hour (500 ppm).

Example 11

Pellets of a transparent thermoplastic resin composition were obtained in the same manner as in Example 1 except that 64 kg/hour (30 parts by mass) of a semi-molten state product of the graft copolymer (A1-2) produced in Production Example 2 was supplied to 150 kg/hour (70 parts by mass) of the styrene/acrylonitrile/methyl methacrylate copolymer by a twin screw extruder-type feeder, the supply amount of 9,10-dihydro-9-oxa-10-phosphaphenanthrene-10-oxide (D-1) as the dihydrooxaphosphaphenanthrene-based phosphorus compound (D) was set to 0.1210 kg/hour (500 ppm), and 0.0203 kg/hour (84 ppm) of the reaction product (C-1) of p-cresol, dicyclopentadiene, and isobutylene as the phenolic compound (C) was further supplied.

Example 12

A vinyl copolymer and a transparent thermoplastic resin composition were produced by the following method using a continuous bulk polymerization apparatus including: a 2 m$^3$ complete mixing polymerization tank having a condenser for evaporation and dry distillation of the monomer vapor and a helical ribbon impeller; a single screw extruder-type preheater; a twin screw extruder-type monomer remover; and a twin screw extruder-type feeder for feeding from the side of the monomer remover, the feeder being connected to the barrel portion located ⅓ upstream of the downstream (outlet) end of the monomer remover.

First, a monomer mixture (b) containing 23 parts by mass of styrene, 8 parts by mass of acrylonitrile, 63 parts by mass of methyl methacrylate, 0.32 parts by mass of n-octyl mercaptan, and 0.015 parts by mass of 1,1-bis(t-butylperoxy)cyclohexane was continuously supplied to a complete mixing polymerization tank at 150 kg/hour, and subjected to continuous bulk polymerization while maintaining the polymerization temperature at 130° C. and the internal pressure in the tank at 0.08 MPa. The polymerization rate of the polymerization reaction mixture at the outlet of the complete mixing polymerization tank was controlled to 65±3%.

Next, the polymerization reaction mixture was preheated by the single screw extruder-type preheater and then supplied to the twin screw extruder-type monomer remover. The unreacted monomer was evaporated and recovered under reduced pressure through the vent port of the twin screw extruder-type monomer remover. The recovered unreacted monomer was continuously refluxed to the complete mixing polymerization tank. At a position ⅓ upstream (with respect to the total length) of the downstream end of the twin screw extruder-type monomer remover, 92 kg/hour (38 parts by mass) of a semi-molten state product of the graft copolymer (A1-2) produced in Production Example 2, 0.1210 kg/hour (500 ppm) of 9,10-dihydro-9-oxa-10-phosphaphenanthrene-10-oxide (D-1) as the dihydrooxaphosphaphenanthrene-based phosphorus compound (D), and 0.339 kg/hour (1,400 ppm) of distearyl-3,3'-thiodipropionate were supplied to 150 kg/hour (62 parts by mass) of a styrene/acrylonitrile/methyl methacrylate copolymer having an apparent polymerization rate of 99% or more by a twin screw extruder-type feeder. The supplied materials were melt-kneaded with the styrene/acrylonitrile/methyl methacrylate copolymer in the twin screw extruder-type monomer remover. In the melt-kneading step, 2 kg/hour of water was supplied at a position ⅙ (with respect to the total length) upstream of the downstream end of the twin screw extruder-type monomer remover. The water and other volatile components were removed by evaporation under reduced pressure through the vent port provided further downstream of the twin screw extruder-type monomer remover. Thereafter, the melt-kneaded product was discharged in the form of a strand and cut with a cutter to obtain pellets of a transparent thermoplastic resin composition.

In addition, the supply from the twin screw extruder-type feeder was stopped, and a styrene/acrylonitrile/methyl methacrylate copolymer as the vinyl copolymer (B1) was discharged and sampled. The properties of the resulting styrene/acrylonitrile/methyl methacrylate copolymer and transparent thermoplastic resin composition were evaluated by the methods described above.

Comparative Example 1

Pellets of a transparent thermoplastic resin composition were obtained in the same manner as in Example 1 except that the graft copolymer (A1-6) produced in Production Example 6 was used in place of the graft copolymer (A1-1) produced in Production Example 1, and the supply amount of 9,10-dihydro-9-oxa-10-phosphaphenanthrene-10-oxide (D-1) as the dihydro-oxaphosphaphenanthrene-based phosphorus compound (D) was set to 0.029 kg/hour (120 ppm).

Comparative Example 2

Pellets of a transparent thermoplastic resin composition were obtained in the same manner as in Example 1 except that the graft copolymer (A1-2) produced in Production Example 2 was used in place of the graft copolymer (A1-1) produced in Production Example 1, and 9,10-dihydro-9-oxa-10-phosphaphenanthrene-10-oxide (D-1) as the dihydrooxaphosphaphenanthrene-based phosphorus compound (D) was not supplied.

Comparative Example 3

Pellets of a transparent thermoplastic resin composition were obtained in the same manner as in Example 1 except that the graft copolymer (A1-2) produced in Production Example 2 was used in place of the graft copolymer (A1-1) produced in Production Example 1, and the supply amount of 9,10-dihydro-9-oxa-10-phosphaphenanthrene-10-oxide (D-1) as the dihydro-oxaphosphaphenanthrene-based phosphorus compound (D) was set to 0.006 kg/hour (25 ppm).

Comparative Example 4

Pellets of a transparent thermoplastic resin composition were obtained in the same manner as in Example 1 except that the graft copolymer (A1-2) produced in Production Example 2 was used in place of the graft copolymer (A1-1) produced in Production Example 1, and the supply amount of 9,10-dihydro-9-oxa-10-phosphaphenanthrene-10-oxide (D-1) as the dihydrooxaphosphaphenanthrene-based phosphorus compound (D) was set to 0.4839 kg/hour (2,000 ppm).

Comparative Example 5

Pellets of a transparent thermoplastic resin composition were obtained in the same manner as in Example 1 except that the graft copolymer (A1-5) produced in Production Example 5 was used in place of the graft copolymer (A1-1) produced in Production Example 1, and the supply amount of 9,10-dihydro-9-oxa-10-phosphaphenanthrene-10-oxide (D-1) as the dihydro-oxaphosphaphenanthrene-based phosphorus compound (D) was set to 0.2177 kg/hour (900 ppm).

Comparative Example 6

Pellets of a transparent thermoplastic resin composition were obtained in the same manner as in Example 1 except that the graft copolymer (A1-8) produced in Production Example 8 was used in place of the graft copolymer (A1-1) produced in Production Example 1, and 9,10-dihydro-9-oxa-10-phosphaphenanthrene-10-oxide (D-1) as the dihydrooxaphosphaphenanthrene-based phosphorus compound (D) was not supplied.

Comparative Example 7

Pellets of a transparent thermoplastic resin composition were obtained in the same manner as in Example 1 except that the graft copolymer (A1-9) produced in Production Example 9 was used in place of the graft copolymer (A1-1) produced in Production Example 1, and 9,10-dihydro-9-oxa-10-phosphaphenanthrene-10-oxide (D-1) as the dihydrooxaphosphaphenanthrene-based phosphorus compound (D) was not supplied.

Comparative Example 8

Pellets of a transparent thermoplastic resin composition were obtained in the same manner as in Example 1 except that the graft copolymer (A1-10) produced in Production Example 10 was used in place of the graft copolymer (A1-1) produced in Production Example 1, and 9,10-dihydro-9-oxa-10-phosphaphenanthrene-10-oxide (D-1) as the dihydrooxaphosphaphenanthrene-based phosphorus compound (D) was not supplied.

Comparative Example 9

Pellets of a transparent thermoplastic resin composition were obtained in the same manner as in Example 1 except that the graft copolymer (A1-7) produced in Production Example 7 was used in place of the graft copolymer (A1-1) produced in Production Example 1, and 9,10-dihydro-9-oxa- 10-phosphaphenanthrene-10-oxide (D-1) as the dihydrooxaphosphaphenanthrene-based phosphorus compound (D) was not supplied.

Comparative Example 10

Pellets of a transparent thermoplastic resin composition were obtained in the same manner as in Example 1 except that the graft copolymer (A1-11) produced in Production Example 11 was used in place of the graft copolymer (A1-1) produced in Production Example 1, and 9,10-dihydro-9-oxa-10-phosphaphenanthrene-10-oxide (D-1) as the dihydrooxaphosphaphenanthrene-based phosphorus compound (D) was not supplied. Tables 2 and 3 show the blended amounts of the transparent thermoplastic resin compositions of Examples 1 to 12 and Comparative Examples 1 to 10 and the properties of the resulting transparent thermoplastic resin compositions. Injection molding was performed using the pellets of Table 2 under the conditions described in each evaluation item to prepare test pieces for evaluation. The results of measuring the physical properties of these test pieces are shown in Table 4.

TABLE 2

| | Vinyl copolymer (B1) | | | | | | Graft copolymer (A1) | | |
| --- | --- | --- | --- | --- | --- | --- | --- | --- | --- |
| | (b1) (mass %) | (b2) (mass %) | (b3) (mass %) | Weight average molecular weight | Supply amount (kg/hour) | Number of parts (part by mass) | Type | Supply amount (kg/hour) | Number of parts (part by mass) |
| Example 1 | 23.5 | 72 | 4.5 | 140,000 | 150 | 62 | A1-1 | 92 | 38 |
| Example 2 | 23.5 | 72 | 4.5 | 140,000 | 150 | 62 | A1-1 | 92 | 38 |
| Example 3 | 23.5 | 72 | 4.5 | 140,000 | 150 | 62 | A1-2 | 92 | 38 |
| Example 4 | 23.5 | 72 | 4.5 | 140,000 | 150 | 62 | A1-2 | 92 | 38 |
| Example 5 | 23.5 | 72 | 4.5 | 140,000 | 150 | 62 | A1-2 | 92 | 38 |
| Example 6 | 23.5 | 72 | 4.5 | 140,000 | 150 | 62 | A1-3 | 92 | 38 |
| Example 7 | 23.5 | 72 | 4.5 | 140,000 | 150 | 62 | A1-4 | 92 | 38 |
| Example 8 | 23.5 | 72 | 4.5 | 140,000 | 150 | 62 | A1-4 | 92 | 38 |
| Example 9 | 23.5 | 72 | 4.5 | 140,000 | 150 | 62 | A1-2 | 92 | 38 |
| Example 10 | 23.5 | 72 | 4.5 | 140,000 | 150 | 62 | A1-7 | 92 | 38 |
| Example 11 | 23.5 | 72 | 4.5 | 140,000 | 150 | 70 | A1-2 | 64 | 30 |
| Example 12 | 23 | 63 | 8 | 140,000 | 150 | 62 | A1-2 | 92 | 38 |
| Comparative Example 1 | 23.5 | 72 | 4.5 | 140,000 | 150 | 62 | A1-6 | 92 | 38 |
| Comparative Example 2 | 23.5 | 72 | 4.5 | 140,000 | 150 | 62 | A1-2 | 92 | 38 |
| Comparative Example 3 | 23.5 | 72 | 4.5 | 140,000 | 150 | 62 | A1-2 | 92 | 38 |
| Comparative Example 4 | 23.5 | 72 | 4.5 | 140,000 | 150 | 62 | A1-2 | 92 | 38 |
| Comparative Example 5 | 23.5 | 72 | 4.5 | 140,000 | 150 | 62 | A1-5 | 92 | 38 |
| Comparative Example 6 | 23.5 | 72 | 4.5 | 140,000 | 150 | 62 | A1-8 | 92 | 38 |
| Comparative Example 7 | 23.5 | 72 | 4.5 | 140,000 | 150 | 62 | A1-9 | 92 | 38 |
| Comparative Example 8 | 23.5 | 72 | 4.5 | 140,000 | 150 | 62 | A1-10 | 92 | 38 |
| Comparative Example 9 | 23.5 | 72 | 4.5 | 140,000 | 150 | 62 | A1-7 | 92 | 38 |
| Comparative Example 10 | 23.5 | 72 | 4.5 | 140,000 | 150 | 62 | A1-11 | 92 | 38 |

| | Phenolic compound (C) *1 | | | Dihydrooxaphosphaphenanthrene-based phosphorus compound (D) | | Hindered amine-based compound (E) | | P/OH |
| --- | --- | --- | --- | --- | --- | --- | --- | --- |
| | Type | Supply amount (kg/hour) | Blended amount (ppm) | Supply amount (kg/hour) | Blended amount (ppm) | Supply amount (kg/hour) | Blended amount (ppm) | *2 molar ratio |
| Example 1 | C-1 | 0.0363 | 150 | 0.0266 | 110 | 0.0000 | 0 | 0.8 |
| Example 2 | C-1 | 0.0363 | 150 | 0.0726 | 300 | 0.0000 | 0 | 0.7 |
| | C-2 | 0.0605 | 250 | | | | | |
| Example 3 | C-1 | 0.0968 | 400 | 0.0726 | 300 | 0.0000 | 0 | 0.8 |
| Example 4 | C-1 | 0.0968 | 400 | 0.1210 | 500 | 0.0000 | 0 | 1.4 |
| Example 5 | C-1 | 0.0968 | 400 | 0.0242 | 100 | 0.0000 | 0 | 0.3 |
| Example 6 | C-1 | 0.1694 | 700 | 0.1210 | 500 | 0.0000 | 0 | 0.8 |
| Example 7 | C-1 | 0.2177 | 900 | 0.2177 | 900 | 0.0000 | 0 | 1.1 |
| Example 8 | C-1 | 0.2177 | 900 | 0.7742 | 3200 | 0.0000 | 0 | 4.0 |
| Example 9 | C-1 | 0.0968 | 400 | 0.0726 | 300 | 0.7258 | 3000 | 0.8 |
| Example 10 | C-1 | 0.0968 | 400 | 0.1210 | 500 | 0.0000 | 0 | 1.4 |
| Example 11 | C-1 | 0.0968 | 400 | 0.1210 | 500 | 0.0000 | 0 | 1.4 |
| Example 12 | C-1 | 0.0968 | 400 | 0.1210 | 500 | 0.0000 | 0 | 1.4 |
| Comparative Example 1 | C-1 | 0.0121 | 50 | 0.0290 | 120 | 0.0000 | 0 | 2.7 |

TABLE 2-continued

| | | | | | | | | |
|---|---|---|---|---|---|---|---|---|
| Comparative Example 2 | C-1 | 0.0968 | 400 | 0.0000 | 0 | 0.0000 | 0 | 0.0 |
| Comparative Example 3 | C-1 | 0.0968 | 400 | 0.0060 | 25 | 0.0000 | 0 | 0.1 |
| Comparative Example 4 | C-1 | 0.0968 | 400 | 0.4839 | 2000 | 0.0000 | 0 | 5.6 |
| Comparative Example 5 | C-1 | 0.2903 | 1200 | 0.2177 | 900 | 0.0000 | 0 | 0.8 |
| Comparative Example 6 | C-2 | 0.0968 | 400 | 0.0000 | 0 | 0.0000 | 0 | 0.0 |
| Comparative Example 7 | C-3 | 0.0968 | 400 | 0.0000 | 0 | 0.0000 | 0 | 0.0 |
| Comparative Example 8 | C-4 | 0.0968 | 400 | 0.0000 | 0 | 0.0000 | 0 | 0.0 |
| Comparative Example 9 | C-1 | 0.0968 | 400 | 0.0000 | 0 | 0.0000 | 0 | 0.0 |
| Comparative Example 10 | C-1 | 0.1452 | 600 | 0.0000 | 0 | 0.0000 | 0 | 0.0 |

*1: The amount of the phenolic compound (C) is the total of the supply amount of the phenolic compound (C) contained in the graft copolymer (A1) and the supply amount of the phenolic compound (C) added at the time of melt-kneading the graft copolymer (A1) and the vinyl copolymer (B1).
*2: P/OH (phosphorus atom of dihydrooxaphosphaphenanthrene-based phosphorus compound/hydroxyl group of phenol compound)

TABLE 3

| | (Meth)acrylic acid ester-based monomer-derived unit Mass % | Vinyl cyanide-based monomer-derived unit Mass % | Proportion of triad of vinyl cyanide-based monomer-derived units mol % | Amount of radicals generated after irradiation with γ-rays ×10$^{18}$/g |
|---|---|---|---|---|
| Example 1 | 58.9 | 2.8 | <0.1 | 1.6 |
| Example 2 | 58.9 | 2.8 | <0.1 | 1.6 |
| Example 3 | 58.9 | 2.8 | <0.1 | 1.5 |
| Example 4 | 58.9 | 2.8 | <0.1 | 1.5 |
| Example 5 | 58.9 | 2.8 | <0.1 | 1.6 |
| Example 6 | 58.9 | 2.8 | <0.1 | 1.6 |
| Example 7 | 58.9 | 2.8 | <0.1 | 1.7 |
| Example 8 | 58.9 | 2.8 | <0.1 | 1.6 |
| Example 9 | 58.9 | 2.8 | <0.1 | 1.5 |
| Example 10 | 58.3 | 3.6 | 5 | 1.5 |
| Example 11 | 61.7 | 3.2 | <0.1 | 1.8 |
| Example 12 | 53.3 | 5.7 | 0.5 | 1.5 |
| Comparative Example 1 | 58.9 | 2.8 | <0.1 | 1.6 |
| Comparative Example 2 | 58.9 | 2.8 | <0.1 | 1.7 |
| Comparative Example 3 | 58.9 | 2.8 | <0.1 | 1.7 |
| Comparative Example 4 | 58.9 | 2.8 | <0.1 | 1.5 |
| Comparative Example 5 | 58.9 | 2.8 | <0.1 | 1.5 |
| Comparative Example 6 | 58.9 | 2.8 | <0.1 | 1.5 |
| Comparative Example 7 | 58.9 | 2.8 | <0.1 | 1.7 |
| Comparative Example 8 | 58.9 | 2.8 | <0.1 | 1.7 |
| Comparative Example 9 | 58.3 | 3.6 | 5 | 1.6 |
| Comparative Example 10 | 58.9 | 2.8 | <0.1 | 1.7 |

TABLE 4

| | Total light transmittance (%) (T0) | Color tone (YI) | Total light Transmittance after lapse of 24 hours from irradiation with γ-rays (%) (T24) | Reduction rate of total light transmittance after irradiation with γ-rays (%) [(T0) − (T24)]/ T0 × 100 | Total light Transmittance after lapse of 600 hours from irradiation with γ-rays (%) (T600) |
|---|---|---|---|---|---|
| Example 1 | 89.0 | 3.5 | 84.0 | 5.6 | 87.5 |
| Example 2 | 89.0 | 4.0 | 83.5 | 6.2 | 87.5 |
| Example 3 | 89.0 | 3.5 | 84.2 | 5.4 | 88.5 |
| Example 4 | 89.0 | 3.2 | 83.7 | 6.0 | 88.3 |
| Example 5 | 89.0 | 3.7 | 83.5 | 6.2 | 88.0 |
| Example 6 | 88.5 | 4.0 | 83.0 | 6.2 | 86.0 |
| Example 7 | 88.0 | 3.8 | 82.5 | 6.3 | 86.0 |
| Example 8 | 88.5 | 3.0 | 82.5 | 6.8 | 86.0 |
| Example 9 | 89.0 | 3.2 | 84.3 | 5.3 | 88.7 |
| Example 10 | 88.2 | 4.2 | 82.3 | 6.7 | 86.5 |
| Example 11 | 90.0 | 4.0 | 83.9 | 6.8 | 87.8 |
| Example 12 | 87.8 | 4.0 | 81.8 | 6.8 | 85.8 |

TABLE 4-continued

| | | | | | |
|---|---|---|---|---|---|
| Comparative Example 1 | 89.5 | 11.0 | 86.0 | 3.9 | 88.5 |
| Comparative Example 2 | 88.0 | 5.5 | 81.5 | 7.4 | 84.0 |
| Comparative Example 3 | 88.0 | 5.3 | 81.7 | 7.2 | 84.3 |
| Comparative Example 4 | 90.0 | 4.0 | 81.0 | 10.0 | 86.0 |
| Comparative Example 5 | 86.0 | 8.0 | 79.0 | 8.1 | 83.0 |
| Comparative Example 6 | 87.5 | 5.7 | 81.0 | 7.4 | 83.5 |
| Comparative Example 7 | 87.8 | 5.6 | 81.3 | 7.4 | 83.8 |
| Comparative Example 8 | 88.0 | 5.2 | 81.7 | 7.2 | 84.3 |
| Comparative Example 9 | 88.0 | 6.0 | 81.7 | 7.2 | 83.5 |
| Comparative Example 10 | 87.7 | 5.4 | 81.1 | 7.5 | 83.5 |

| | Recovery rate of total light transmittance after irradiation with γ-rays (%) [(T600) − (T24)]/ [(T0 − T24)] × 100 | Total light transmittance after aging treatment after irradiation with γ-rays (%) (T15) | Recovery rate of total light transmittance after aging treatment after irradiation with γ-rays (%) [(T15) − (T24)]/ [(T0 − T24)] × 100 | Charpy impact strength (kJ/m$^2$) | Haze |
|---|---|---|---|---|---|
| Example 1 | 70 | 89.0 | 100 | 15 | 2.4 |
| Example 2 | 73 | 89.0 | 100 | 15 | 2.4 |
| Example 3 | 90 | 89.0 | 100 | 15 | 2.4 |
| Example 4 | 87 | 89.0 | 100 | 15 | 2.4 |
| Example 5 | 82 | 88.5 | 91 | 15 | 2.4 |
| Example 6 | 55 | 88.5 | 100 | 15 | 2.4 |
| Example 7 | 64 | 87.8 | 96 | 15 | 2.4 |
| Example 8 | 58 | 88.5 | 100 | 15 | 2.4 |
| Example 9 | 94 | 89.0 | 100 | 15 | 2.4 |
| Example 10 | 71 | 87.8 | 93 | 15 | 3.0 |
| Example 11 | 64 | 89.7 | 95 | 12 | 2.0 |
| Example 12 | 67 | 87.2 | 90 | 15 | 3.3 |
| Comparative Example 1 | 71 | 89.5 | 100 | 15 | 2.4 |
| Comparative Example 2 | 38 | 87.6 | 94 | 15 | 2.4 |
| Comparative Example 3 | 41 | 87.8 | 97 | 15 | 2.4 |
| Comparative Example 4 | 56 | 88.8 | 87 | 15 | 2.4 |
| Comparative Example 5 | 57 | 85.0 | 86 | 15 | 2.4 |
| Comparative Example 6 | 38 | 86.1 | 78 | 15 | 2.4 |
| Comparative Example 7 | 38 | 87.3 | 92 | 15 | 2.4 |
| Comparative Example 8 | 41 | 87.7 | 95 | 15 | 2.4 |
| Comparative Example 9 | 29 | 86.5 | 76 | 15 | 3.0 |
| Comparative Example 10 | 36 | 86.7 | 85 | 15 | 2.4 |

*γ-ray irradiation absorbed dose: 25 kGy

As shown in Example 1 to 12, the transparent thermoplastic resin composition can provide a molded article having both a high total light transmittance and a good color tone, and further having a good reduction rate of total light transmittance after irradiation with γ-rays and a good recovery rate therefrom. On the other hand, in Comparative Example 1 in which the content of the phenolic compound was less than 100 ppm, the color tone of the molded article was poor. In Comparative Example 2 which did not contain the dihydrooxaphosphaphenanthrene-based phosphorus compound (D), and Comparative Example 3 in which the molar ratio (P/OH) of the phosphorus atom (P) of the dihydrooxaphosphaphenanthrene-based phosphorus compound (D) to the hydroxyl group (OH) of the phenolic compound (C) was less than 0.2, the reduction rate of total light transmittance after irradiation with γ-rays and recovery rate therefrom of the molded article were poor. In Comparative Example 4 in which the molar ratio (P/OH) of the phosphorus atom (P) of the dihydrooxaphosphaphenanthrene-based phosphorus compound (D) to the hydroxyl group (OH) of the phenolic compound (C) was more than 5.0, the reduction rate of total light transmittance after irradiation with γ-rays was poor. In Comparative Example 5 in which the content of the phenolic compound (C) was more than 1,000 ppm, the total light transmittance, color tone, and reduction rate of total light transmittance after irradiation with γ-rays of the molded article were poor. In Comparative Examples 6 to 10 which did not contain the dihydrooxaphosphaphenanthrene-based phosphorus compound (D), the reduction rate of total light transmittance after irradiation with γ-rays and the recovery rate therefrom were poor.

On the other hand, in Comparative Examples 2, 3, 7, and 8, the dihydrooxaphosphaphenanthrene-based phosphorus compound (D) was not contained, or the molar ratio (P/OH) of the phosphorus atom (P) of the dihydrooxaphosphaphenanthrene-based phosphorus compound (D) to the hydroxyl group of the phenolic compound (C) was less than 0.2, and in the transparent thermoplastic resin composition, the graft copolymer (A1) substantially not containing a vinyl cyanide-based monomer-derived unit was used, and in the dimethyl sulfoxide-soluble component, the proportion of a triad where all monomer-derived units of the triad are vinyl cyanide-based monomer-derived units is less than 1 mol % relative to the total number of triads where the center of each of the triads is a vinyl cyanide-based monomer-derived unit, the value obtained by dividing the molecular weight of the phenolic compound (C) by the number of hydroxyl groups (OH groups) in one molecule was 200 or more, and the content thereof was 100 to 500 ppm with respect to 100 parts by mass of the transparent thermoplastic resin composition. Therefore, the recovery rate of total light transmittance after aging treatment after irradiation with γ-rays was improved to 90% or more.

Graft Copolymer (A2):

Production Example 13, Graft Copolymer (A2-1)

A 20 L reaction vessel was charged with a mixture of 50 parts by mass (in terms of solid content) of a latex of a styrene-butadiene-rubbery polymer ("J2898" manufactured by JSR Corporation) having a volume average particle size of 0.17 μm, a styrene unit content of 30 mass %, and a butadiene unit content of 70 mass %, 13.2 parts by mass of pure water, 0.48 parts by mass of anhydrous glucose, a mixture of 0.26 parts by mass of sodium pyrophosphate and 0.01 parts by mass of ferrous sulfate, a mixture of 0.4 parts by mass of potassium oleate and 12.5 parts by mass of pure water, and 104.3 parts by mass of pure water, and the temperature was raised to 60° C. A mixture (i) of 10.5 parts by mass of methyl methacrylate, 9.5 parts by mass of styrene, and 0.1 parts by mass of t-dodecyl mercaptan were initially added with stirring over 1 hour. Subsequently, an initiator mixture of 0.24 parts by mass of cumene hydroperoxide, 1.4 parts by mass of potassium oleate, and 10 parts by mass of pure water was continuously added dropwise over 4 hours. At the same time, a monomer mixture of 15.8 parts by mass of methyl methacrylate, 14.2 parts by mass of styrene, and 0.16 parts by mass of t-dodecyl mercaptan was continuously added over 3 hours. After the addition of the monomer mixture, the mixture was allowed to stand for 1 hour, and the polymerization was terminated. After completion of the polymerization, 0.12 parts by mass of an emulsion dispersion of the reaction product (C-1) of p-cresol, dicyclopentadiene, and isobutylene was added in terms of solid content of the reaction product (C-1) of p-cresol, dicyclopentadiene, and isobutylene with respect to 100 parts by mass of the graft copolymer latex. The resulting graft copolymer latex was coagulated with 1.5 mass % sulfuric acid, then neutralized with sodium hydroxide, washed, centrifuged, and dried to obtain a powder graft copolymer (A2-1).

Production Example 14, Graft Copolymer (A2-2)

A graft copolymer (A2-2) was obtained in the same manner as in Production Example 1 except for using a latex of a styrene-butadiene-rubbery polymer ("J2898" manufactured by JSR Corporation) having a volume average particle size of 0.23 μm and a styrene unit content of 30 mass %.

Production Example 15, Graft Copolymer (A2-3)

A graft copolymer (A2-3) was obtained in the same manner as in Production Example 1 except for using a latex of a styrene-butadiene-rubbery polymer ("J2898" manufactured by JSR Corporation) having a volume average particle size of 0.27 μm and a styrene unit content of 30 mass %.

Production Example 16, Graft Copolymer (A2-4)

A 20 L reaction vessel was charged with 50 parts by mass (in terms of solid content) of a latex of a styrene-butadiene-rubbery polymer ("J2108" manufactured by JSR Corporation) having a volume average particle size of 0.08 μm and a styrene unit content of 25 mass %, and 2 parts by mass of a 1.5 mass % aqueous solution of acetic acid was added thereto. The mixture was stirred at 25° C. for 5 minutes to enlarge the particles, thereby obtaining a latex with a volume average particle size of a rubbery polymer of 0.17 μm. Subsequently, a mixture of 13.2 parts by mass of pure water, 0.48 parts by mass of anhydrous glucose, 0.26 parts by mass of sodium pyrophosphate, and 0.01 parts by mass of ferrous sulfate, a mixture of 0.4 parts by mass of potassium oleate and 12.5 parts by mass of pure water, and 104.3 parts by mass of pure water were charged, and the temperature was raised to 60° C. A mixture (i) of 11.3 parts by mass of methyl methacrylate, 8.7 parts by mass of styrene, and 0.1 parts by mass of t-dodecyl mercaptan was initially added with stirring over 1 hour. Subsequently, an initiator mixture of 0.24 parts by mass of cumene hydroperoxide, 1.4 parts by mass of potassium oleate, and 10 parts by mass of pure water was continuously added dropwise over 4 hours. At the same time, a monomer mixture of 16.9 parts by mass of methyl methacrylate, 13.1 parts by mass of styrene, and 0.16 parts by mass of t-dodecyl mercaptan was continuously added over 3 hours. After the addition of the monomer mixture, the mixture was allowed to stand for 1 hour, and the polymerization was terminated. After completion of the polymerization, 0.12 parts by mass of an emulsion dispersion of the reaction product (C-1) of p-cresol, dicyclopentadiene, and isobutylene was added in terms of solid content of the reaction product (C-1) of p-cresol, dicyclopentadiene, and isobutylene with respect to 100 parts by weight of the graft copolymer latex. The resulting graft copolymer latex was coagulated with 1.5 mass % sulfuric acid, then neutralized with sodium hydroxide, washed, centrifuged, and dried to obtain a powder graft copolymer (A2-4). Production Example 17, Graft copolymer (A2-5)

A 20 L reaction vessel was charged with a mixture of 50 parts by mass (in terms of solid content) of a latex of a styrene-butadiene-rubbery polymer ("J2898" manufactured by JSR Corporation) having a volume average particle size of 0.17 μm and a styrene unit content of 30 mass %, 13.2 parts by mass of pure water, 0.48 parts by mass of anhydrous glucose, a mixture of 0.26 parts by mass of sodium pyrophosphate and 0.01 parts by mass of ferrous sulfate, a mixture of 0.4 parts by mass of potassium oleate and 12.5 parts by mass of pure water, and 104.3 parts by mass of pure water, and the temperature was raised to 60° C. A mixture (i) of 9.9 parts by mass of methyl methacrylate, 9.3 parts by mass of styrene, 0.8 parts by mass of acrylonitrile, and 0.1 parts by mass of t-dodecyl mercaptan were initially added with stirring over 1 hour. Subsequently, an initiator mixture of 0.24 parts by mass of cumene hydroperoxide, 1.4 parts by mass of potassium oleate, and 10 parts by mass of pure water was continuously added dropwise over 4 hours. At the same time, a monomer mixture of 14.9 parts by mass of methyl methacrylate, 13.9 parts by mass of styrene, 1.2 parts by mass of acrylonitrile, and 0.16 parts by mass of t-dodecyl mercaptan was continuously added over 3 hours. After the addition of the monomer mixture, the mixture was allowed to stand for 1 hour, and the polymerization was terminated. After completion of the polymerization, 0.12 parts by mass of an emulsion dispersion of the reaction product (C-1) of p-cresol, dicyclopentadiene, and isobutylene was added in terms of solid content of the reaction product (C-1) of p-cresol, dicyclopentadiene, and isobutylene with respect to 100 parts by mass of the graft copolymer latex. The resulting graft copolymer latex was coagulated with 1.5 wt % sulfuric acid, then neutralized with sodium hydroxide, washed, centrifuged, and dried to obtain a powder graft copolymer (A2-5).

Production Example 18, Graft Copolymer (A2-6)

A graft copolymer (A2-6) was obtained in the same manner as in Production Example 1 except for using a latex of a styrene-butadiene-rubbery polymer ("J2898" manufactured by JSR Corporation) having a volume average particle size of 0.08 μm and a styrene unit content of 30 mass %.

Production Example 19, Graft Copolymer (A2-7)

A graft copolymer (A2-7) was obtained in the same manner as in Production Example 1 except for using a latex of a styrene-butadiene-rubbery polymer ("J2898" manufactured by JSR Corporation) having a volume average particle size of 0.49 μm and a styrene unit content of 30 mass %.

Production Example 20, Graft Copolymer (A2-8)

A 20 L reaction vessel was charged with a mixture of 50 parts by mass (in terms of solid content) of a latex of a styrene-butadiene-rubbery polymer ("J0510" manufactured by JSR Corporation) having a volume average particle size of 0.25 μm and a styrene unit content of 35 mass %, 13.2 parts by mass of pure water, 0.48 parts by mass of anhydrous glucose, a mixture of 0.26 parts by mass of sodium pyrophosphate and 0.01 parts by mass of ferrous sulfate, a mixture of 0.4 parts by mass of potassium oleate and 12.5 parts by mass of pure water, and 104.3 parts by mass of pure water, and the temperature was raised to 60° C. A mixture (i) of 9.8 parts by mass of methyl methacrylate, 10.2 parts by mass of styrene, and 0.1 parts by mass of t-dodecyl mercaptan were initially added with stirring over 1 hour. Subsequently, an initiator mixture of 0.24 parts by mass of cumene hydroperoxide, 1.4 parts by mass of potassium oleate, and 10 parts by mass of pure water was continuously added dropwise over 4 hours. At the same time, a monomer mixture of 14.7 parts by mass of methyl methacrylate, 15.3 parts by mass of styrene, and 0.16 parts by mass of t-dodecyl mercaptan was continuously added over 3 hours. After the addition of the monomer mixture, the mixture was allowed to stand for 1 hour, and the polymerization was terminated. After completion of the polymerization, 0.12 parts by mass of an emulsion dispersion of the reaction product (C-1) of p-cresol, dicyclopentadiene, and isobutylene was added in terms of solid content of the reaction product (C-1) of p-cresol, dicyclopentadiene, and isobutylene with respect to 100 parts by mass of the graft copolymer latex. The resulting graft copolymer latex was coagulated with 1.5 mass % sulfuric acid, then neutralized with sodium hydroxide, washed, centrifuged, and dried to obtain a powder graft copolymer (A2-8).

Production Example 21, Graft Copolymer (A2-9)

A graft copolymer (A2-10) was obtained in the same manner as in Production Example 13 except that after completion of the polymerization, 0.0375 parts by mass of an emulsion dispersion of the reaction product (C-1) of p-cresol, dicyclopentadiene, and isobutylene was added in terms of solid content of the reaction product (C-1) of p-cresol, dicyclopentadiene, and isobutylene with respect to 100 parts by mass of the graft copolymer latex.

Production Example 22, Graft Copolymer (A2-10)

A graft copolymer (A2-10) was obtained in the same manner as in Production Example 13 except that after completion of the polymerization, 0.225 parts by mass of an emulsion dispersion of the reaction product (C-1) of p-cresol, dicyclopentadiene, and isobutylene was added in terms of solid content of the reaction product (C-1) of p-cresol, dicyclopentadiene, and isobutylene with respect to 100 parts by mass of the graft copolymer latex.

Production Example 23, Graft Copolymer (A2-11)

A graft copolymer (A2-11) was obtained in the same manner as in Production Example 13 except that after completion of the polymerization, 0.30 parts by mass of an emulsion dispersion of the reaction product (C-1) of p-cresol, dicyclopentadiene, and isobutylene was added in terms of solid content of the reaction product (C-1) of p-cresol, dicyclopentadiene, and isobutylene with respect to 100 parts by mass of the graft copolymer latex.

Production Example 24, Graft Copolymer (A2-12)

A graft copolymer (A2-12) was obtained in the same manner as in Production Example 13 except that after completion of the polymerization, 0.0125 parts by mass of an emulsion dispersion of the reaction product (C-1) of p-cresol, dicyclopentadiene, and isobutylene was added in terms of solid content of the reaction product (C-1) of p-cresol, dicyclopentadiene, and isobutylene with respect to 100 parts by mass of the graft copolymer latex.

Production Example 25, Graft Copolymer (A2-13)

A graft copolymer (A2-13) was obtained in the same manner as in Production Example 13 except that after completion of the polymerization, 0.12 parts by mass of an emulsion dispersion of 2,2'-methylenebis-(4-ethyl-6-t-butylphenol) (C-2) was added in terms of solid content of 2,2'-methylenebis-(4-ethyl-6-t-butylphenol) (C-2) with respect to 100 parts by mass of the graft copolymer latex.

Production Example 26, Graft Copolymer (A2-14)

A graft copolymer (A2-14) was obtained in the same manner as in Production Example 13 except that after completion of the polymerization, 0.12 parts by mass of an emulsion dispersion of octadecyl-3-(3,5-di-t-butyl-4-hydroxyphenyl)propionate (C-3) was added in terms of solid content of octadecyl-3-(3,5-di-t-butyl-4-hydroxyphenyl)propionate (C-3) with respect to 100 parts by mass of the graft copolymer latex.

Production Example 27, Graft Copolymer (A2-15)

A graft copolymer (A2-15) was obtained in the same manner as in Production Example 13 except that after completion of the polymerization, 0.12 parts by mass of an emulsion dispersion of 1,3,5-tris(3',5')-di-t-butyl-4'-hydroxybenzyl-s-triazine2,4,6(1H, 2H, 3H)-trione (C-4) was added in terms of solid content of 1,3,5-tris(3',5')-di-t-butyl-4'-hydroxybenzyl-s-triazine2,4,6(1H, 2H, 3H)-trione (C-4) with respect to 100 parts by mass of the graft copolymer latex.

Production Example 28, Graft Copolymer (A2-16)

A graft copolymer (A2-16) was obtained in the same manner as in Production Example 13 except that after completion of the polymerization, 0.15 parts by mass of an emulsion dispersion of the reaction product (C-1) of p-cresol, dicyclopentadiene, and isobutylene was added in terms of solid content of the reaction product (C-1) of p-cresol, dicyclopentadiene, and isobutylene with respect to 100 parts by mass of the graft copolymer latex.

The production conditions and measurement results of the graft copolymers (A2) are shown in Table 5.

TABLE 5

| Graft copolymer (A1) | Rubbery polymer (R2) | | | | Vinyl copolymer content (mass %) |
|---|---|---|---|---|---|
| | Butadiene unit content (mass %) | Styrene unit content (mass %) | Volume average particle size (μm) | Content (mass %) | |
| A2-1 | 70 | 30 | 0.17 | 50 | 50 |
| A2-2 | 70 | 30 | 0.23 | 50 | 50 |
| A2-3 | 70 | 30 | 0.27 | 50 | 50 |
| A2-4 | 75 | 25 | 0.17 | 50 | 50 |
| A2-5 | 70 | 30 | 0.17 | 50 | 50 |
| A2-6 | 70 | 30 | 0.08 | 50 | 50 |
| A2-7 | 70 | 30 | 0.49 | 50 | 50 |
| A2-8 | 65 | 35 | 0.25 | 50 | 50 |
| A2-9 | 70 | 30 | 0.17 | 50 | 50 |
| A2-10 | 70 | 30 | 0.17 | 50 | 50 |
| A2-11 | 70 | 30 | 0.17 | 50 | 50 |
| A2-12 | 70 | 30 | 0.17 | 50 | 50 |
| A2-13 | 70 | 30 | 0.17 | 50 | 50 |
| A2-14 | 70 | 30 | 0.17 | 50 | 50 |
| A2-15 | 70 | 30 | 0.17 | 50 | 50 |
| A2-16 | 70 | 30 | 0.17 | 50 | 50 |

| Graft copolymer (A1) | (a1) (mass %) | (a2) (mass %) | (a3) (mass %) | Phenolic compound (C) Type | Added amount (part by mass) |
|---|---|---|---|---|---|
| A2-1 | 47.4 | 52.6 | 0 | C-1 | 0.12 |
| A2-2 | 47.4 | 52.6 | 0 | C-1 | 0.12 |
| A2-3 | 47.4 | 52.6 | 0 | C-1 | 0.12 |
| A2-4 | 43.6 | 56.4 | 0 | C-1 | 0.12 |
| A2-5 | 46.4 | 49.6 | 4 | C-1 | 0.12 |
| A2-6 | 47.4 | 52.6 | 0 | C-1 | 0.12 |
| A2-7 | 47.4 | 52.6 | 0 | C-1 | 0.12 |
| A2-8 | 51.0 | 49.0 | 0 | C-1 | 0.12 |
| A2-9 | 47.4 | 52.6 | 0 | C-1 | 0.0375 |
| A2-10 | 47.4 | 52.6 | 0 | C-1 | 0.225 |
| A2-11 | 47.4 | 52.6 | 0 | C-1 | 0.30 |
| A2-12 | 47.4 | 52.6 | 0 | C-1 | 0.0125 |
| A2-13 | 47.4 | 52.6 | 0 | C-2 | 0.12 |
| A2-14 | 47.4 | 52.6 | 0 | C-3 | 0.12 |
| A2-15 | 47.4 | 52.6 | 0 | C-4 | 0.12 |
| A2-16 | 47.4 | 52.6 | 0 | C-1 | 0.15 |

Vinyl Copolymer (B2):

Production Example 30, Vinyl Copolymer (B2-1)

A reaction vessel was charged with 80 parts by mass of acrylamide, 20 parts by mass of methyl methacrylate, 0.3 parts by mass of potassium persulfate, and 1,800 parts by mass of pure water, the gas phase in the reaction vessel was replaced with nitrogen gas, and the temperature was maintained at 70° C. under stirring. The reaction was continued until monomers were completely converted to a polymer, and then 20 parts by mass of sodium hydroxide and 2,000 parts by mass of pure water were added. The mixture was stirred at 70° C. for 2 hours and then cooled to room temperature, to obtain an aqueous solution of a methyl methacrylate-acrylamide binary copolymer serving as a medium for suspension polymerization.

A solution obtained by dissolving 6 parts by mass of the aqueous solution of a methyl methacrylate-acrylamide binary copolymer in 165 parts by mass of pure water was placed in a 20 L autoclave, and stirred at 400 rotations/min. The inside of the system was purged with nitrogen gas. Next, a monomer mixture of 49.5 parts by mass of methyl methacrylate, 46.5 parts by mass of styrene, 4 parts by mass of acrylonitrile, 0.03 parts by mass of t-dodecyl mercaptan, and 0.32 parts by mass of azobisisobutyronitrile were initially added over 30 minutes while stirring the reaction system, and copolymerization reaction was started at 70° C. Subsequently, the temperature in the tank was raised to 100° C. over 150 minutes. After the temperature reached 100° C., the temperature was maintained at 100° C. for 30 minutes and then decreased. Then, separation, washing, and drying of the polymer were performed to obtain vinyl copolymer beads (B2-1).

Production Example 31, Vinyl Copolymer (B2-2)

A vinyl copolymer (B2-2) was produced in the same manner as in Production Example 30 except that the number of parts of methyl methacrylate added was changed to 52.8 parts by mass, the number of parts of styrene added was changed to 47.2 parts by mass, and the number of parts of acrylonitrile added was changed to 0 parts by mass.

Production Example 32, Vinyl Copolymer (B2-3)

A vinyl copolymer (B2-3) was produced in the same manner as in Production Example 30 except that the number of parts of methyl methacrylate added was changed to 53.1 parts by mass, the number of parts of styrene added was changed to 42.9 parts by mass, and the number of parts of acrylonitrile added was changed to 4 part by mass.

Production Example 33, Vinyl Copolymer (B2-4)

A vinyl copolymer (B2-4) was produced in the same manner as in Production Example 30 except that the number of parts of methyl methacrylate added was changed to 46.2 parts by mass, the number of parts of styrene added was changed to 45.8 parts by mass, and the number of parts of acrylonitrile added was changed to 8 part by mass.

Production Example 34, Vinyl Copolymer (B2-5)

A vinyl copolymer (B2-5) was produced in the same manner as in Production Example 30 except that the number of parts of methyl methacrylate added was changed to 45.5 parts by mass, the number of parts of styrene added was changed to 50.5 parts by mass, and the number of parts of acrylonitrile added was changed to 4 part by mass.

Production Example 35, Vinyl Copolymer (B2-6)

A vinyl copolymer (B2-6) was produced in the same manner as in Production Example 30 except that the number of parts of methyl methacrylate added was changed to 0 parts by mass, the number of parts of styrene added was changed to 72 parts by mass, the number of parts of acrylonitrile added was changed to 28 parts by mass, and the number of parts of t-dodecyl mercaptan added was changed to 0.1 parts by mass.

Production Example 36, Vinyl Copolymer (B2-7)

Methacrylic resin "SUMIPEX LG" manufactured by Sumitomo Chemical Co., Ltd. was used.

Examples 13 to 27, Comparative Examples 11 to 21

The graft copolymers (A2-1 to A2-16) prepared in Production Examples 13 to 28, the vinyl copolymers (B2-1 to B2-7) prepared in Production Examples 30 to 36, the phenolic compounds (C-1 to C-4), and the dihydrooxaphosphaphenanthrene-based phosphorus compound (D-1) were blended in the blend ratios shown in Table 6. Then, 0.14 parts by mass of distearyl-3,3'-thiodipropionate as an additive was further added and mixed at 23° C. with a Henschel mixer. The resulting mixture was extruded in a gut shape at an extrusion temperature of 230° C. by a 40 mmφ extruder, and the gut-shaped extrudate was formed into pellets. Thus, pellets of resin compositions of Examples 13 to 27 and Comparative Example 11 to 21 were prepared. In particular, in Example 18, 0.012 parts by mass of the phenolic compound (C-1) was further blended to 0.036 parts by mass of the phenolic compound (C-1) contained in the graft copolymer (A2-4) at the time of extrusion so that the total content of the phenolic compound (C-1) was 0.048 parts by mass.

Next, injection molding was performed using the resulting pellets under the conditions described in each evaluation item to prepare test pieces for evaluation. The results of measuring the physical properties of these test pieces are shown in Table 7.

TABLE 6

| | Vinyl copolymer (B2) | | | | Graft copolymer (A2) | |
|---|---|---|---|---|---|---|
| | Type | (b1) (mass %) | (b2) (mass %) | (b3) (mass %) | Number of parts (parts by mass) | Type | Number of parts (parts by mass) |
| Example 13 | B2-1 | 46.5 | 49.5 | 4 | 60 | A2-1 | 40 |
| Example 14 | B2-2 | 47.2 | 52.8 | 0 | 60 | A2-1 | 40 |
| Example 15 | B2-1 | 46.5 | 49.5 | 4 | 60 | A2-2 | 40 |
| Example 16 | B2-1 | 46.5 | 49.5 | 4 | 60 | A2-3 | 40 |
| Example 17 | B2-3 | 42.9 | 53.1 | 4 | 60 | A2-4 | 40 |
| Example 18 | B2-3 | 42.9 | 53.1 | 4 | 70 | A2-4 | 30 |
| Example 19 | B2-1 | 46.5 | 49.5 | 4 | 60 | A2-5 | 40 |
| Example 20 | B2-4 | 45.8 | 46.2 | 8 | 60 | A2-5 | 40 |
| Example 21 | B2-1 | 46.5 | 49.5 | 4 | 60 | A2-6 | 40 |
| Example 22 | B2-1 | 46.5 | 49.5 | 4 | 60 | A2-7 | 40 |
| Example 23 | B2-5 | 50.5 | 45.5 | 4 | 60 | A2-8 | 40 |
| Example 24 | B2-1 | 46.5 | 49.5 | 4 | 60 | A2-9 | 40 |
| Example 25 | B2-1 | 46.5 | 49.5 | 4 | 60 | A2-1 | 40 |
| Example 26 | B2-1 | 46.5 | 49.5 | 4 | 60 | A2-10 | 40 |
| Example 27 | B2-1 | 46.5 | 49.5 | 4 | 60 | A2-10 | 40 |
| Comparative Example 11 | B2-1 | 46.5 | 49.5 | 4 | 60 | A2-12 | 40 |
| Comparative Example 12 | B2-1 | 46.5 | 49.5 | 4 | 60 | A2-1 | 40 |
| Comparative Example 13 | B2-1 | 46.5 | 49.5 | 4 | 60 | A2-1 | 40 |
| Comparative Example 14 | B2-1 | 46.5 | 49.5 | 4 | 60 | A2-1 | 40 |
| Comparative Example 15 | B2-1 | 46.5 | 49.5 | 4 | 60 | A2-11 | 40 |
| Comparative Example 16 | B2-1 | 46.5 | 49.5 | 4 | 60 | A2-13 | 40 |
| Comparative Example 17 | B2-1 | 46.5 | 49.5 | 4 | 60 | A2-14 | 40 |
| Comparative Example 18 | B2-1 | 46.5 | 49.5 | 4 | 60 | A2-15 | 40 |
| Comparative Example 19 | B2-1 | 46.5 | 49.5 | 4 | 60 | A2-5 | 40 |
| Comparative Example 20 | B2-1 | 46.5 | 49.5 | 4 | 60 | A2-16 | 40 |

TABLE 6-continued

| | | | | | | | |
|---|---|---|---|---|---|---|---|
| Comparative Example 21 | B2-6 | 72 | 0 | 28 | 37 | A2-1 | 40 |
| | B2-7 | 0 | 100 | 0 | 23 | | |

| | Phenolic compound (C) *1 | | | Dihydrooxaphosphaphenanthrene-based phosphorus compound (D) | P/OH *2 Molar ratio | (Meth)acrylic acid ester-based monomer-derived unit Mass % | Vinyl cyanide-based monomer-derived unit Mass % | Proportion of triad of vinyl cyanide-based monomer-derived units Molar ratio | Amount of radicals generated after irradiation with γ-rays $\times 10^{18}$/g | Number average particle size μm |
|---|---|---|---|---|---|---|---|---|---|---|
| | Type | Number of parts (part by mass) | Number of parts (ppm) | Number of parts (part by mass) | | | | | | |
| Example 13 | C-1 | 0.048 | 480 | 0.05 | 1.2 | 40.2 | 2.4 | <0.1 | 1.0 | 0.16 |
| Example 14 | C-1 | 0.048 | 480 | 0.05 | 1.2 | 42.2 | 0.0 | <0.1 | 1.1 | 0.16 |
| Example 15 | C-1 | 0.048 | 480 | 0.05 | 1.2 | 40.2 | 2.4 | <0.1 | 1.1 | 0.22 |
| Example 16 | C-1 | 0.048 | 480 | 0.05 | 1.2 | 40.2 | 2.4 | <0.1 | 1.1 | 0.26 |
| Example 17 | C-1 | 0.048 | 480 | 0.05 | 1.2 | 43.1 | 2.4 | <0.1 | 1.3 | 0.16 |
| Example 18 | C-1 | 0.048 | 480 | 0.05 | 1.2 | 45.6 | 2.4 | <0.1 | 1.4 | 0.16 |
| Example 19 | C-1 | 0.048 | 480 | 0.05 | 1.2 | 39.6 | 3.2 | 5 | 1.3 | 0.15 |
| Example 20 | C-1 | 0.048 | 480 | 0.05 | 1.2 | 37.6 | 5.6 | 0.5 | 1.3 | 0.15 |
| Example 21 | C-1 | 0.048 | 480 | 0.05 | 1.2 | 40.2 | 2.4 | <0.1 | 1.1 | 0.07 |
| Example 22 | C-1 | 0.048 | 480 | 0.05 | 1.2 | 40.2 | 2.4 | <0.1 | 1.1 | 0.45 |
| Example 23 | C-1 | 0.048 | 480 | 0.05 | 1.2 | 37.1 | 2.4 | <0.1 | 1.0 | 0.24 |
| Example 24 | C-1 | 0.015 | 150 | 0.011 | 0.8 | 40.2 | 2.4 | <0.1 | 1.0 | 0.16 |
| Example 25 | C-1 | 0.048 | 480 | 0.012 | 0.3 | 40.2 | 2.4 | <0.1 | 1.0 | 0.16 |
| Example 26 | C-1 | 0.09 | 900 | 0.09 | 1.1 | 40.2 | 2.4 | <0.1 | 1.0 | 0.16 |
| Example 27 | C-1 | 0.09 | 900 | 0.28 | 3.5 | 40.2 | 2.4 | <0.1 | 0.9 | 0.16 |
| Comparative Example 11 | C-1 | 0.005 | 50 | 0.012 | 2.7 | 40.2 | 2.4 | <0.1 | 1.0 | 0.16 |
| Comparative Example 12 | C-1 | 0.048 | 480 | 0 | 0.0 | 40.2 | 2.4 | <0.1 | 1.1 | 0.16 |
| Comparative Example 13 | C-1 | 0.048 | 480 | 0.003 | 0.1 | 40.2 | 2.4 | <0.1 | 1.1 | 0.16 |
| Comparative Example 14 | C-1 | 0.048 | 480 | 0.24 | 5.6 | 40.2 | | | | |
| Comparative Example 15 | C-1 | 0.12 | 1200 | 0.09 | 0.8 | 40.2 | | | | |
| Comparative Example 16 | C-2 | 0.048 | 480 | 0 | 0.0 | 40.2 | | | | |
| Comparative Example 17 | C-3 | 0.048 | 480 | 0 | 0.0 | 40.2 | | | | |
| Comparative Example 18 | C-4 | 0.048 | 480 | 0 | 0.0 | 40.2 | | | | |
| Comparative Example 19 | C-1 | 0.048 | 480 | 0 | 0.0 | 39.6 | | | | |
| Comparative Example 20 | C-1 | 0.06 | 600 | 0 | 0.0 | 40.2 | | | | |
| Comparative Example 21 | C-1 | 0.048 | 480 | 0.05 | 1.2 | 33.5 | | | | |

TABLE 6-continued

| | | | | |
|---|---|---|---|---|
| Comparative Example 14 | 2.4 | <0.1 | 1.0 | 0.16 |
| Comparative Example 15 | 2.4 | <0.1 | 1.0 | 0.16 |
| Comparative Example 15 | 2.4 | <0.1 | 1.1 | 0.16 |
| Comparative Example 16 | 2.4 | <0.1 | 1.1 | 0.16 |
| Comparative Example 17 | 2.4 | <0.1 | 1.1 | 0.16 |
| Comparative Example 18 | 3.2 | 5 | 1.0 | 0.15 |
| Comparative Example 19 | 2.4 | <0.1 | 1.1 | 0.16 |
| Comparative Example 20 | 10.4 | <0.1 | 1.2 | 0.16 |

*1: The amount of the phenolic compound (C) is the total of the supply amount of the phenolic compound (C) contained in the graft copolymer (A2) and the supply amount of the phenolic compound (C) added at the time of melt-kneading the graft copolymer (A2) and the vinyl copolymer (B2). The blended amount was represented by (part by mass) and (ppm).

*2: P/OH (phosphorus atom of dihydrooxaphosphaphenanthrene-based phosphorus compound/hydroxyl group of phenol compound)

TABLE 7

| | Total light transmittance (%) (T0) | Color tone (YI) | Total light transmittance after lapse of 24 hours from irradiation with γ-rays (%) (T24) | Reduction rate of total light transmittance after irradiation with γ-rays (%) [(T0) − (T24)]/ T0 × 100 | Total light transmittance after lapse of 600 hours from irradiation with γ-rays (%) (T600) | Recovery rate of total light transmittance after irradiation with γ-rays (%) [(T600) − (T24)]/ [(T0) − (T24)] × 100 |
|---|---|---|---|---|---|---|
| Example 13 | 90 | 14.0 | 85.0 | 5.6 | 89.8 | 96 |
| Example 14 | 90 | 13.0 | 85.0 | 5.6 | 89.9 | 98 |
| Example 15 | 90 | 14.0 | 85.0 | 5.6 | 89.8 | 96 |
| Example 16 | 89 | 14.0 | 84.0 | 5.6 | 88.8 | 96 |
| Example 17 | 88 | 12.0 | 82.0 | 6.8 | 87.4 | 90 |
| Example 18 | 89 | 10.0 | 82.9 | 6.9 | 88.3 | 89 |
| Example 19 | 88 | 16.0 | 82.0 | 6.8 | 87.0 | 83 |
| Example 20 | 88 | 18.0 | 81.9 | 6.9 | 86.7 | 79 |
| Example 21 | 90 | 14.0 | 84.0 | 6.7 | 89.8 | 97 |
| Example 22 | 82 | 14.0 | 77.0 | 6.1 | 81.8 | 96 |
| Example 23 | 86 | 17.0 | 82.0 | 4.7 | 85.9 | 98 |
| Example 24 | 90 | 12.0 | 85.0 | 5.6 | 89.5 | 90 |
| Example 25 | 90 | 14.5 | 84.8 | 5.8 | 89.3 | 87 |
| Example 26 | 89 | 14.7 | 83.7 | 6.0 | 87.8 | 77 |
| Example 27 | 89 | 13.0 | 83.7 | 6.0 | 87.6 | 74 |
| Comparative Example 11 | 90 | 23.0 | 86.5 | 3.9 | 89.9 | 97 |
| Comparative Example 12 | 88 | 16.0 | 81.5 | 7.4 | 84.0 | 38 |
| Comparative Example 13 | 88 | 15.0 | 81.7 | 7.2 | 84.3 | 41 |
| Comparative Example 14 | 90 | 14.5 | 81.0 | 10.0 | 86.0 | 56 |
| Comparative Example 15 | 86 | 20.0 | 79.0 | 8.1 | 83.0 | 57 |
| Comparative Example 16 | 87 | 16.2 | 80.5 | 7.5 | 83.0 | 38 |
| Comparative Example 17 | 87 | 16.1 | 80.6 | 7.4 | 83.1 | 39 |
| Comparative Example 18 | 88 | 15.8 | 81.7 | 7.2 | 84.3 | 41 |
| Comparative Example 19 | 88 | 17.0 | 81.7 | 7.2 | 83.5 | 29 |
| Comparative Example 20 | 88 | 16.2 | 81.3 | 7.6 | 83.7 | 36 |
| Comparative Example 21 | 90 | 15.0 | 84.0 | 6.7 | 89.8 | 97 |

TABLE 7-continued

|  | Total light transmittance after aging treatment after irradiation with γ-rays (%) (T15) | Recovery rate of total light transmittance after aging treatment after irradiation with γ-rays (%) [(T15) − (T24)]/ [(T0) − (T24)] × 100 | Charpy impact strength (kJ/m$^2$) | Haze | Color tone (YI) after lapse of 24 hours from Irradiation with γ-rays |
|---|---|---|---|---|---|
| Example 13 | 89.8 | 96 | 11 | 2 | 26 |
| Example 14 | 89.9 | 98 | 10 | 2 | 25 |
| Example 15 | 89.8 | 96 | 12 | 2 | 26 |
| Example 16 | 88.8 | 96 | 13 | 3 | 26 |
| Example 17 | 87.4 | 90 | 12 | 3 | 27 |
| Example 18 | 88.5 | 92 | 9 | 3 | 26 |
| Example 19 | 87.5 | 92 | 11 | 4 | 29 |
| Example 20 | 87.5 | 92 | 12 | 4 | 30 |
| Example 21 | 89.8 | 97 | 3 | 2 | 26 |
| Example 22 | 81.8 | 96 | 16 | 8 | 26 |
| Example 23 | 85.9 | 98 | 3 | 5 | 28 |
| Example 24 | 89.7 | 94 | 11 | 2 | 26 |
| Example 25 | 89.5 | 90 | 11 | 2 | 25 |
| Example 26 | 88.8 | 96 | 11 | 2 | 21 |
| Example 27 | 88.8 | 96 | 11 | 2 | 23 |
| Comparative Example 11 | 89.9 | 97 | 11 | 2 | 27 |
| Comparative Example 12 | 87.6 | 94 | 11 | 2 | 33 |
| Comparative Example 13 | 87.8 | 97 | 11 | 2 | 31 |
| Comparative Example 14 | 88.7 | 86 | 11 | 2 | 27 |
| Comparative Example 15 | 85.0 | 86 | 11 | 2 | 18 |
| Comparative Example 16 | 85.5 | 77 | 11 | 2 | 33 |
| Comparative Example 17 | 86.5 | 92 | 11 | 2 | 33 |
| Comparative Example 18 | 87.7 | 95 | 11 | 2 | 33 |
| Comparative Example 19 | 86.5 | 76 | 12 | 3 | 36 |
| Comparative Example 20 | 87.0 | 85 | 11 | 2 | 30 |
| Comparative Example 21 | 89.0 | 83 | 4 | 3 | 27 |

*γ-ray irradiation absorbed dose: 37.5 kGy

As shown in Example 13 to 27, the transparent thermoplastic resin composition can provide a molded article having both a high total light transmittance and a good color tone, and further having a good reduction rate of total light transmittance after irradiation with γ-rays and a good recovery rate therefrom. On the other hand, in Comparative Example 11 in which the content of the phenolic compound was less than 100 ppm, the color tone of the molded article was poor. In Comparative Example 12 which did not contain the dihydrooxaphosphaphenanthrene-based phosphorus compound (D), and Comparative Example 13 in which the molar ratio (P/OH) of the phosphorus atom (P) of the dihydrooxaphosphaphenanthrene-based phosphorus compound (D) to the hydroxyl group (OH) of the phenolic compound (C) was less than 0.2, the reduction rate of total light transmittance after irradiation with γ-rays and recovery rate therefrom of the molded article were poor. In Comparative Example 14 in which the molar ratio (P/OH) of the phosphorus atom (P) of the dihydrooxaphosphaphenanthrene-based phosphorus compound (D) to the hydroxyl group (OH) of the phenolic compound (C) was more than 5.0, the reduction rate of total light transmittance after irradiation with γ-rays was poor. In Comparative Example 15 in which the content of the phenolic compound (C) was more than 1,000 ppm, the total light transmittance, color tone, and reduction rate of total light transmittance after irradiation with γ-rays of the molded article were poor. In Comparative Examples 16 to 20 which did not contain the dihydrooxaphosphaphenanthrene-based phosphorus compound (D), the reduction rate of total light transmittance after irradiation with γ-rays and the recovery rate therefrom were poor.

On the other hand, in Comparative Examples 12, 13, 17, and 18, the dihydrooxaphos-phaphenanthrene-based phosphorus compound (D) was not contained, or the molar ratio (P/OH) of the phosphorus atom (P) of the dihydrooxaphosphaphenanthrene-based phosphorus compound (D) to the hydroxyl group of the phenolic compound (C) was less than 0.2, and in the transparent thermoplastic resin composition, the graft copolymer (A2) substantially not containing a vinyl cyanide-based monomer-derived unit was used, and in the dimethyl sulfoxide-soluble component, the proportion of a triad where all monomer-derived units of the triad are vinyl cyanide-based monomer-derived units is less than 1 mol % relative to the total number of triads where the center of each of the triads is a vinyl cyanide-based monomer-derived unit, the value obtained by dividing the molecular weight of the phenolic compound (C) by the number of hydroxyl groups (OH groups) in one molecule was 200 or more, and the content thereof was 100 to 500 ppm with respect to 100 parts by mass of the transparent thermoplastic resin composition.

Therefore, the recovery rate of total light transmittance after aging treatment after irradiation with γ-rays was improved to 90% or more.

INDUSTRIAL APPLICABILITY

The transparent thermoplastic resin composition and the molded article of this disclosure can be widely used for applications such as home electric appliances, communication-related devices, general goods, and medical devices, particularly for medical devices.

The invention claimed is:

1. A transparent thermoplastic resin composition comprising:
   based on 100 parts by mass of the transparent thermoplastic resin composition,
   10 to 60 parts by mass of a graft copolymer (A) obtained by graft copolymerizing a monomer mixture (a) containing at least an aromatic vinyl-based monomer (a1) and a (meth)acrylic acid ester-based monomer (a2) in the presence of a rubbery polymer (R);
   40 to 90 parts by mass of a vinyl copolymer (B) obtained by copolymerizing a monomer mixture (b) containing at least an aromatic vinyl-based monomer (b1) and a (meth)acrylic acid ester-based monomer (b2);
   100 to 1,000 ppm of a phenolic compound (C); and
   a dihydrooxaphosphaphenanthrene-based phosphorus compound (D),
   wherein a molar ratio (P/OH) of a phosphorus atom (P) of the dihydrooxaphosphaphenanthrene-based phosphorus compound (D) to a hydroxyl group (OH) of the phenolic compound (C) is 0.2 to 5.0, and
   a content of a (meth)acrylic acid ester-based monomer-derived unit is 30 mass % or more and 75 mass % or less, based on 100 mass % of a total of a diene-based monomer-derived unit, a (meth)acrylic acid ester-based monomer-derived unit, an aromatic vinyl-based monomer-derived unit, a vinyl cyanide-based monomer-derived unit, and another vinyl-based monomer-derived unit contained in the transparent thermoplastic resin composition.

2. The transparent thermoplastic resin composition according to claim 1, wherein
   the monomer mixture (a) contains at least 20 to 40 mass % of the aromatic vinyl-based monomer (a1) and 60 to 80 mass % of the (meth)acrylic acid ester-based monomer (a2) based on 100 mass % of the monomer mixture (a);
   the rubbery polymer (R) is polybutadiene rubber (R1);
   the graft copolymer (A) is a graft copolymer (A1) obtained by graft copolymerizing 60 to 40 mass % of the monomer mixture (a) based on 100 mass % of a total amount of the rubbery polymer (R1) and the monomer mixture (a) in the presence of 40 to 60 mass % of the rubbery polymer (R1);
   the vinyl copolymer (B) is a vinyl copolymer (B1) obtained by copolymerizing the monomer mixture (b) containing at least 20 to 40 mass % of the aromatic vinyl-based monomer (b1) and 60 to 80 mass % of the (meth)acrylic acid ester-based monomer (b2) based on 100 mass % of the monomer mixture (b); and
   the transparent thermoplastic resin composition contains 10 to 60 parts by mass of the graft copolymer (A1) and 40 to 90 parts by mass of the vinyl copolymer (B1) based on 100 parts by mass of a total of the graft copolymer (A1) and the vinyl copolymer (B1).

3. The transparent thermoplastic resin composition according to claim 1, wherein
   the rubbery polymer (R) is a rubbery polymer (R2) containing more than 65 mass % and less than 80 mass % of a diene-based monomer (r1) and more than 20 mass % and less than 35 mass % of an aromatic vinyl-based monomer (r2) based on 100 mass % of a total of the diene-based monomer (r1) and the aromatic vinyl-based monomer (r2), and
   a number average particle size of particles of the graft copolymer in thermoplastic resin composition is 0.15 to 0.30 μm.

4. The transparent thermoplastic resin composition according to claim 1, wherein a content of a vinyl cyanide-based monomer-derived unit is 5 mass % or less based on 100 mass % of a total of a diene-based monomer-derived unit, a (meth)acrylic acid ester-based monomer-derived unit, an aromatic vinyl-based monomer-derived unit, a vinyl cyanide-based monomer-derived unit, and another vinyl-based monomer-derived unit contained in the transparent thermoplastic resin composition.

5. The transparent thermoplastic resin composition according to claim 1, wherein the graft copolymer (A) does not substantially contain a vinyl cyanide-based monomer-derived unit.

6. The transparent thermoplastic resin composition according to claim 1, wherein
   a dimethyl sulfoxide-soluble component of the thermoplastic resin composition contains a vinyl cyanide-based monomer-derived unit, and
   in the dimethyl sulfoxide-soluble component, a proportion of a triad where all monomer-derived units of the triad are vinyl cyanide-based monomer-derived units is less than 1 mol % relative to a total number of triads where the center of each of the triads is a vinyl cyanide-based monomer-derived unit.

7. The transparent thermoplastic resin composition according to claim 1, wherein in the thermoplastic resin composition, an amount of radicals generated after irradiation with γ-rays is less than $1.3 \times 10^{18}$/g.

8. The transparent thermoplastic resin composition according to claim 1, further comprising a hindered amine-based compound (E).

9. A method of producing a transparent thermoplastic resin composition, comprising:
   obtaining 10 to 60 parts by mass of a graft copolymer (A) obtained by graft copolymerizing a monomer mixture (a) containing at least an aromatic vinyl-based monomer (a1) and a (meth)acrylic acid ester-based monomer (a2) in the presence of a rubbery polymer (R);
   obtaining 40 to 90 parts by mass of a vinyl copolymer (B) obtained by copolymerizing a monomer mixture (b) containing at least an aromatic vinyl-based monomer (b1) and a (meth)acrylic acid ester-based monomer (b2);
   where a total of the graft copolymer (A) and the vinyl copolymer (B) is 100 parts by mass, and
   mixing at least the graft copolymer (A), the vinyl copolymer (B), a phenolic compound (C), and a dihydrooxaphosphaphenanthrene-based phosphorus compound (D).

10. The method according to claim 9, comprising mixing the graft copolymer (A) and the phenolic compound (C) in advance.

11. A molded article obtained by molding the transparent thermoplastic resin composition according to claim 1.

12. A method of producing a molded article, comprising molding the transparent thermoplastic resin composition obtained by the production method according to claim 9.

\* \* \* \* \*